(12) United States Patent
Vollath

(10) Patent No.: US 7,432,853 B2
(45) Date of Patent: Oct. 7, 2008

(54) AMBIGUITY ESTIMATION OF GNSS SIGNALS FOR THREE OR MORE CARRIERS

(75) Inventor: Ulrich Vollath, Unterfoehring (DE)

(73) Assignee: Trimble Navigation Limited, Sunnyvale, CA (US)

( * ) Notice: Subject to any disclaimer, the term of this patent is extended or adjusted under 35 U.S.C. 154(b) by 736 days.

(21) Appl. No.: 10/696,528

(22) Filed: Oct. 28, 2003

(65) Prior Publication Data
US 2005/0101248 A1 May 12, 2005

(51) Int. Cl.
*G01S 5/14* (2006.01)
(52) U.S. Cl. .................................. 342/357.04
(58) Field of Classification Search ............. 342/357.04
See application file for complete search history.

(56) References Cited

U.S. PATENT DOCUMENTS

| | | | |
|---|---|---|---|
| 5,519,620 A | 5/1996 | Talbot et al. | |
| 5,602,741 A | 2/1997 | Talbot et al. | |
| 5,757,646 A | 5/1998 | Talbot et al. | |
| 5,828,336 A | 10/1998 | Yunck et al. | |
| 5,890,091 A | 3/1999 | Talbot et al. | |
| 2005/0080560 A1* | 4/2005 | Hatch ......................... | 701/213 |

OTHER PUBLICATIONS

G. Bierman, Factorization Methods for Discrete Sequential Estimation, Academic Press, 1977 (pp. 1-241).
N. Carlson, Federated Square Root Filter for Decentralized Parallel Processing, IEEE Transactions on Aerospace and Electronic Systems, vol. AES-26, No. 3, May 1990, pp. 517-525.
S. Cliatt, GPS Modernization, Proceedings of the GNSS 2003, Apr. 22-25, 2003, Graz Austria (15 pages).
K. de Jong, Integrated GPS/Galileo ambiguity resolution, Proceedings of NaviTec 2001, 1st ESA workshop on satellite navigation user equipment technologies, Dec. 2001, pp. 318-325 (8 pages).
K. de Jong, Future GPS and Galileo signals, Geo-Informatics, Sep. 2002, 2 pp.

(Continued)

*Primary Examiner*—Thomas H. Tarcza
*Assistant Examiner*—Fred H. Mull
(74) *Attorney, Agent, or Firm*—Bruce D. Riter

(57) ABSTRACT

Methods and apparatus are provided for factorized processing of a set of GNSS signal data derived from signals having at least three carriers. A geometry filter is applied to the set of GNSS signal data using a geometry carrier-phase combination to obtain an array of ambiguity estimates for the geometry carrier-phase combination and associated statistical information. A bank of ionosphere filters is applied to the set of GNSS signal data using a geometry-free ionosphere carrier-phase combination to obtain an array of ambiguity estimates for the ionosphere carrier-phase combination and associated statistical information. At least one bank of Quintessence filters is applied to the set of GNSS signal data using a geometry-free and ionosphere-free carrier-phase combination to obtain an array of ambiguity estimates for the geometry-free and ionosphere-free carrier-phase combination and associated statistical information. At least one code filter is applied to the set of GNSS signal data using a plurality of geometry-free and ionosphere-free code-carrier combinations to obtain an array of ambiguity estimates for the code-carrier combinations and associated statistical information. The resulting arrays are combined to obtain a combined array of ambiguity estimates for all carrier phase observations and associated statistical information.

49 Claims, 35 Drawing Sheets

OTHER PUBLICATIONS

P. de Jonge, The LAMBDA method for Integer ambiguity Estimation: implementation aspects, LGR-Series No. 12, Delft Geodetic Computing Center, Delft University of Technology, The Netherlands, Aug. 1996, 49 pp.

P. de Jong, Computational aspects of the LAMBDA method for GPS ambiguity resolution, Proceedings ION GPS-96, 9th International Technical Meeting of the Satellite Division of the Institute of Navigation, Kansas City, Missouri, Sep. 17-20, pp. 935-944.

H.-J. Euler et al., Fast GPS ambiguity resolution on-the-fly for real-time applications, Proceedings of Sixth International Geodetic Symposium on Satellite Positioning, Columbus, OH, Mar. 17-20, pp. 650-659.

A. Gelb (ed.), Applied Optimal Estimation, The M.I.T. Press, 1992. pp. 107-113 and pp. 133-136.

E. Grafarend et al., Generating Classes of Equivalent Linear Models by Nuisance Parameter Elimination- Applications to GPS Observations, Manuscripta Geodetica 11 (1986), pp. 262-271.

M. Grewal et al., Kalman filtering: theory and practice using MATLAB, second edition, 2001, John Wiley & Sons, New York (401 pages).

R. Hatch, The synergism of GPS code and carrier phase ambiguities, Proceedings of the 3rd International Geodetic Symposium on Satellite Doppler Positioning, Las Cruces, New Mexico, Feb. 1982, vol. 2, pp. 1213-1232.

R. Hatch, Ambiguity resolution in the fast lane. Proceedings of ION GPS-89, Colorado Springs, CO, Sep. 27-29, pp. 45-50.

R. Hatch, Instantaneous ambiguity resolution, IAG Symposium No. 107 'Kinematic Systems in Geodesy, Surveying, and Remote Sensing', Banff, Canada, Sep. 10-13 (KIS'90), Springer Verlag, pp. 299-308.

R. Hatch, Comparison of several AROF kinematic techniques, Proceedings of ION GPS-94, Salt Lake City, UT, Sep. 20-23, pp. 363-370.

R. Hatch, The Promise of a Third Frequency, GPS World, May 1996, pp. 55-58.

R. Hatch, GPS Carrier-Phase Ambiguity Resolution, Institute for Mathematics and its Applications (IMA) "Hot Topics" Workshop: Mathematical Challenges in Global Positioning Systems (GPS), Aug. 16-18, 2000, 57 pp.

G. Hein et al., Galileo Frequency & Signal Design, GPS World, Jun. 2003, pp. 30-37.

B. Hofmann-Wellenhof et al., GPS Theory and Practice, Springer-Verlag, Fifth Edition, 2001, pp. 213-248.

P. Joosten et al., GNSS There Carrier Phase Ambiguity Resolution using the LAMBDA-method, Proceedings of the GNSS 1999 (6 pages).

H. Landau et al., On-the-fly ambiguity resoultion for precise differential positioning, Proceedings of ION GPS-92, Albuquerque, NM, Sep. 16-18, pp. 607-613.

A. Leick, GPS Satellite Surveying, Second Edition, John Wiley & Sons, Inc., 1995 (560 pages).

P. Misra et al., Global Positioning System: Signals, Measurements, and Performance, Ganja-Jamuna Press, 2001, Chapter 6, pp. 209-254.

D. Odijk, Triple-Frequency Ionosphere-Free Phase Combinations for Ambiguity Resolution, Proc. of the ENC-GNSS 2002 proceedings; The European Navigation Conference, Copenhagen, Denmark, May 27-30, 2002, 10 pp.

L. Sjöberg, The best linear combinations of L1 and L2 frequency observables in the application of Transit/Doppler and GPS, Manuscripta Geodetica 15, 1990, pp. 17-22.

P. Teunissen, The least-squares ambiguity decorrelation adjustment: a method for fast GPS integer ambiguity estimation, Journal of Geodesy, 1-2, 1995, pp. 65-82.

P. Teunissen et al., Integer least-squares estimation of the GPS phase ambiguities,. Proceedings of International Symposium on Kinematic Systems in Geodesy, Geomatics and Navigation KIS'94, Banff, Canada, Aug. 30-Sep. 2, Department of Geomatics Engineering, The University of Calgary, pp. 221-231.

P.G. Teunissen et al., Ambiguity dilution of precision: Definition, Properties and Application, Proceedings of the ION GPS-97, Sep. 16-19, 1997, Kansas City, USA, pp. 891-899.

P. Teunissen, The GPS integer least-squares statistics, Phys. Chem. Earth, 25(A9-A11), 673-677.

P. Teunissen, Statistical GNSS Carrier Phase Ambguity Resolution: A Review, IEEE Workshop on Statistical Signal Processing Proceedings 2001 (9 pages).

P. Teunissen, The success rate and precision of GPS ambiguities, J. Geod., 74(3/4), 2000, pp. 321-326.

U. Vollath et al., Analysis of Three-Carrier Ambiguity Resolution (TCAR) Technique for Precise Relative Positioning in GNSS-2, Proceedings of the ION-GPS 1998, Nashville, Sep. 15-18, The Institute of Navigation, Alexandria, VA, pp. 417-426.

U. Vollath et al., Ambiguity Resolution using Three Carriers, Performance Analysis using "Real" Data, Proceedings of the GNSS-2001 conference, Seville, May 2001,__ pp.

U. Vollath et al., Network RTX Versus Single Base RTK—Understanding the Error Characteristics, Proceedings of the GNSS-2002 Conference, May 2002, pp. 2774-2780.

J. Wang et al., A discrimination test procedure for ambiguity resolution on-the-fly, Journal of Geodesy (1998) 72, pp. 644-653.

"Trimble Total Control Software" Technical Notes, Product Brochure of Trimble Navigation Limited, May 2 (8 pages).

* cited by examiner

ESA

| Number of Filters (*ns* filters per Bank) | 2 frequencies | 3 frequencies | 4 frequencies |
|---|---|---|---|
| Geometry | 1 Filter | 1 Filter | 1 Filter |
| Ionosphere | 1 Bank | 1 Bank | 1 Bank |
| Quintessence | None | 1 Bank | 2 Banks |
| Code | Up to 2 Banks | Up to 3 Banks | Up to 4 Banks |

Fig. 9

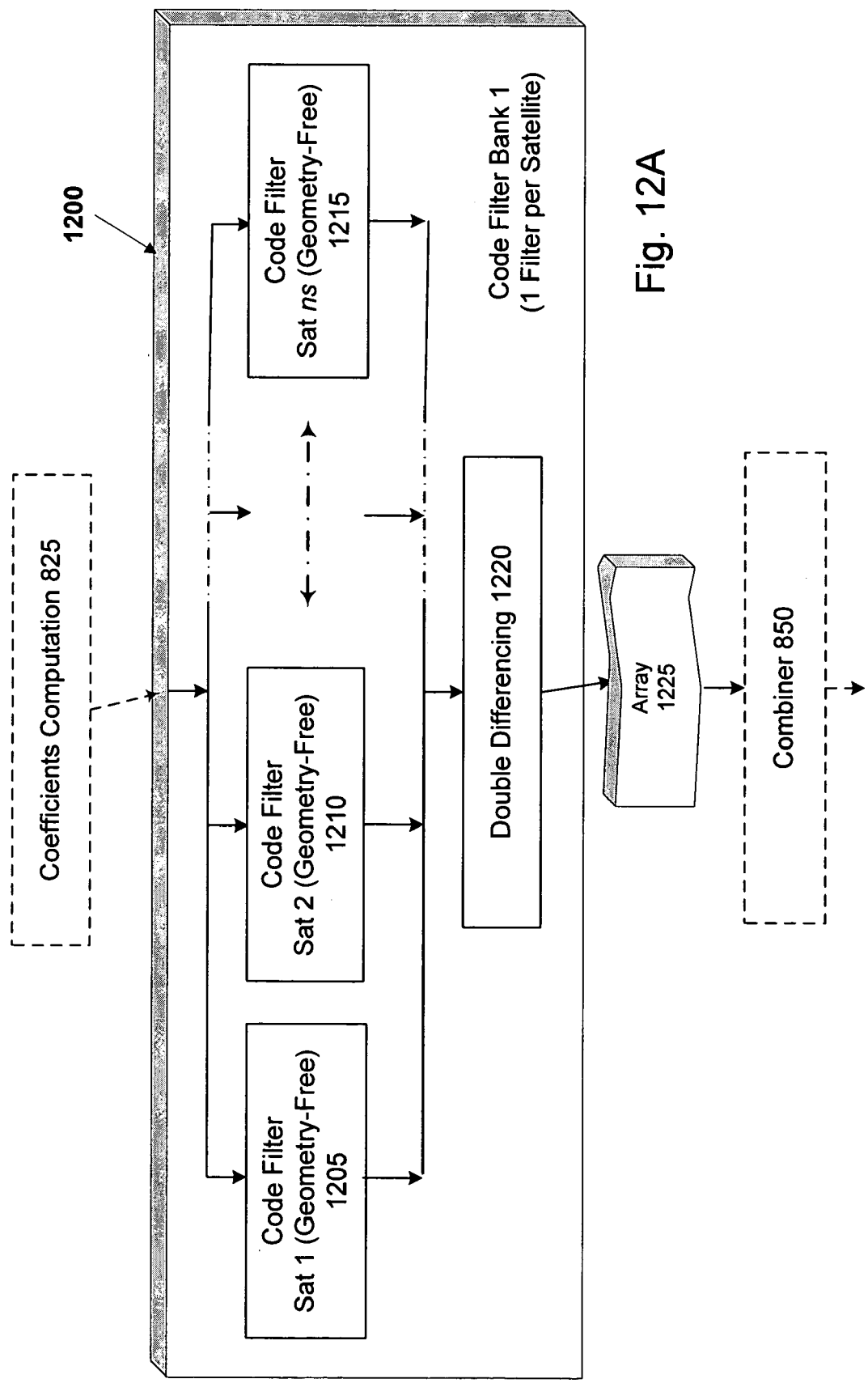

AMBIGUITY ESTIMATION OF GNSS SIGNALS FOR THREE OR MORE CARRIERS

FIELD OF THE INVENTION

The present invention relates to the field of Global Navigation Satellite Systems. More particularly, the present invention relates to ambiguity estimation of GNSS signals for three or more carriers.

BACKGROUND

Global Navigation Satellite Systems (GNSS) include the Global Positioning System (GPS), Glonass, and the proposed Galileo system.

Each GPS satellite transmits continuously using two radio frequencies in the L-band, referred to as L1 and L2, at respective frequencies of 1575.42 MHz and 1227.60 MHz. Two signals are transmitted on L1, one for civil users and the other for Department of Defense (DoD) authorized users. One signal is transmitted on L2, intended only for DoD authorized users. Each GPS signal has a carrier at the L1 or L2 frequency, pseudo-random noise (PRN) codes, and satellite navigation data. Two different PRN codes are transmitted by each satellite: a coarse/acquisition (C/A) code and a precision (P/Y code) which is encrypted. Each C/A code is a unique sequence of 1023 bits, which is repeated each millisecond.

FIG. 1 schematically illustrates a typical prior-art two-carrier-frequency scenario. Receiver 100 receives GPS signals from any number of satellites in view, such as SV1, SV2 and SVm, shown respectively at 110, 120 and 130. The signals pass through the earth's atmosphere (ionosphere and troposphere), shown schematically at 140. Each signal has two frequencies, L1 and L2. Receiver 100 determines from the signals a respective pseudo-range, PR1, PR2, PRm, to each of the satellites. Atmospheric and multipath effects cause variations in the signal path, as indicated schematically at 150, which distort the pseudo-range determinations.

As the C/A code can be measured with an error of about one meter, a civil receiver not using the military-only P/Y code determines position with an error in the range of meters. However, the phase of the L1 and L2 carriers can be measured with an accuracy of 0.01-0.05 cycle (2 mm-1 cm), so relative positions can be more precisely estimated with errors in the range of millimeters to centimeters. Techniques for precise positioning employ L1 and L2 carrier phase and integer ambiguity resolution, a widely researched area of precise satellite positioning.

Many techniques have been developed to reliably and rapidly determine the cycle ambiguity in carrier phase signals observed by satellite positioning equipment. Ambiguity resolution techniques normally involve the use of unambiguous code observations, and observations on multiple satellites to reduce the potential carrier phase ambiguities until a decision can be made to accept a single candidate. Observations of coherently-generated carrier phase signals further enhances the speed and reliability of ambiguity resolution.

The process of ambiguity resolution encompasses three steps:
1. Estimation of approximate values for the ambiguity on each satellite and carrier-phase band,
2. Statistical search over the potential ambiguity candidates to find an ordered list of the best candidates, and
3. Validation of the top ambiguity candidate.

Obtaining good ambiguity estimates greatly reduces the effort required for statistical search and validation.

The classical approach to estimation of the carrier phase ambiguities is to construct a global filter (estimator) that includes states (unknown parameters) for:
1. Rover station coordinates (x, y, z),
2. Carrier phase ambiguity terms for each satellite and each carrier frequency band,
3. Nuisance parameters for the ionospheric bias (one per satellite),
4. Clock and residual tropospheric bias parameters (although these states are often ignored when double differencing of observations is used).

FIG. 2 shows such a prior-art solution in which all ambiguities for all observed satellites and both frequencies are estimated using a single, large state vector. Raw GPS data 200 for L1 and L2 observations of multiple satellites is prepared at 210 and supplied as a prepared data set 220 to a global Kalman filter 230. Filter 230 supplies ambiguity estimates for the L1 and L2 observations.

Currently with the Global Positioning System (GPS), up to 12 satellites can be tracked above a user's local horizon at once. Each GPS satellite transmits on two carrier frequencies. Hence the number of states that must be updated in the filter equals, for example, 41:
 3 rover coordinate states (x, y, z)
 12*2 ambiguity states (for dual-frequency phase observations),
 12 ionospheric bias parameters,
 1 clock and 1 tropospheric bias state.

The number of floating point operations for updating an n-state Kalman filter equals approximately $n^3$ (M. GREWAL et al., KALMAN FILTERING: THEORY AND PRACTICE USING MATLAB, second edition, 2001, John Wiley & Sons, New York, ISBN: 0-471-39254-5).

Hence, for computational speed and efficiency it is desirable to minimize the number of states included in a single Kalman filter.

Once the European Galileo satellite system becomes available, up to 30 satellites (nSat=30) may be available at once. The Galileo satellites are expected to transmit on three, or possibly four, carrier frequencies. With GPS modernization, three carrier frequencies (nFreq=3) will be available. See, for example, K. DE JONG, *Future GPS and Galileo Signals*, GEOINFORMATICS, September 2002 (two pages); G. HEIN et al., *Galileo Frequency & Signal Design*, GPS WORLD, June 2003, pp. 30-37; S. CLIATT, *GPS Modernization*, PROCEEDINGS OF THE GNSS 2003, Apr. 22-25 2003, Graz Austria. If data from two reference stations (nRef=2) for three carrier frequencies are processed at once, then the number of states that would need to be updated in a single-filter may equal, for example:

$$3+(nSat*nFreq*nRef)+(nSat*nRef)+(3*nRef)=249 \text{ states}$$

Even with expected enhancements to embedded computer power, it is quite possible that the computational burden of a single filter will be too great. For many applications, such as real-time position determination, it is critical to obtain a reliable estimate within a given time interval, such as once per epoch of data. Moreover, increased processing generally means increased power consumption in receiver equipment, which is an important consideration for some types of equipment such battery-powered, portable units.

One approach to reducing the computational burden of a large filtering problem is to use decentralized filters. However, mathematical approaches for decentralized Kalman filtering as proposed by N. Carlson, *Federated Square Root Filter for Decentralized Parallel Processing*, IEEE Transactions on Aerospace and Electronic Systems, Vol. AES-26, No.

3, May 1990, do not address the intricacies of applying the technique to carrier-phase ambiguity resolution problems.

Though decentralized filtering has been used in the past in control systems and estimation problems, and in carrier-phase ambiguity resolution for the existing two-frequency GPS signals, there is a need for techniques which will address future GNSS systems having three or more frequencies, such as Galileo and modernized GPS.

Code and carrier phase have been used in satellite-by-satellite filters. R. Hatch proposed using L1/L2 narrow-lane code in combination with the wide-lane, dual-frequency carrier phase combination. See R. HATCH, *The synergism of GPS code and carrier phase ambiguities*, PROCEEDINGS OF THE 3RD INTERNATIONAL GEODETIC SYMPOSIUM ON SATELLITE DOPPLER POSITIONING, Las Cruces, N. Mex., February 1982, Vol. 2, pp 1213-1232, and P. MISRA et al., GLOBAL POSITIONING SYSTEM: SIGNALS, MEASUREMENTS, AND PERFORMANCE, GANJA-JAMUNA PRESS, 2001, pp. 230-233.

Minimum-error phase combination is also known, in which measurement noise is balanced against ionospheric bias in a minimum error sense. Detailed theory for deriving the minimum error phase combination is found in L. SJÖBERG, *The best linear combinations of L1 and L2 frequency observables in the application of Transit/Doppler and GPS*, MANUSCRIPTA GEODETICA 15, 1990, pp. 17-22.

FIG. 3 shows a prior-art solution for processing of the current two-carrier GPS signal data, as implemented for post-processing of two-frequency data in products of Trimble Navigation Limited having software package TTC 2.7. Receiver 300 supplies a GPS signal data set 305 having observations of L1 and L2 for multiple satellites. A process 310 computes coefficients 315 from GPS signal data set 305. GPS signal data set 305 and coefficients 315 are supplied to three filter processes: a geometry filter process 320, a geometry-free ionosphere filter process 330, and a geometry-free and ionosphere-free code filter process 340. Geometry filter process 320 uses a geometry carrier-phase combination to obtain an array 325 of ambiguity estimates for the geometry carrier-phase combination and associated statistical information. Ionosphere filter process 330 uses a geometry-free ionosphere carrier-phase combination to obtain an array 335 of ambiguity estimates for the ionosphere carrier-phase combination and associated statistical information. Code filter process 340 uses geometry-free and ionosphere-free code-carrier combinations to obtain an array 345 of ambiguity estimates for the geometry-free and ionosphere-free code-carrier combinations and associated statistical information. Arrays 325, 335 and 345 are supplied to a combining process 350 to obtain an array 355 of ambiguity estimates for all carrier-phase observations and associated statistical information. Array 355 is supplied to a float-solution computation process 360 to compute a position 365. Code filter 340 is a single, wide-lane filter which includes multipath modeling but does not include noise modeling. This prior-art solution is not suited to GNSS with three or more carrier frequencies, such as Galileo.

FIG. 4 schematically illustrates a three-carrier-frequency scenario, such as proposed for Galileo and for modernized GPS. Receiver 400 receives GNSS signals from any number of satellites in view, such as SV1, SV2 and SVm, shown respectively at 410, 420 and 430. The signals pass through the earth's atmosphere, shown schematically at 440. Each signal has three or more frequencies, f1, f2, . . . fk. Receiver 400 determines from the signals a respective pseudo-range, PR1, PR2, PRm, to each of the satellites. Atmospheric and multi-path effects cause variations in the signal path, as indicated schematically at 450, which distort the pseudo-range determinations.

FIG. 5 shows a prior-art solution intended for the proposed Galileo system with three carrier frequencies. Receiver 500 supplies a Galileo signal data set 505 having observations of three carriers for multiple satellites. A process 510 computes coefficients 515 from Galileo signal data set 505. Galileo signal data set 505 and coefficients 515 are supplied to two filter processes: a geometry filter process 520 and a single bank of geometry-free filter processes 530. Geometry filter process 520 uses a geometry carrier-phase combination to obtain an array 525 of ambiguity estimates for the geometry carrier-phase combination and associated statistical information. The single bank of geometry-free filter processes 530 employs a geometry-free filter per satellite, producing for all geometry-free information a single output array 535 of ambiguity estimates for the geometry-free combinations and associated statistical information. Arrays 525 and 535 are supplied to a combining process 540 to obtain an array 545 of ambiguity estimates for all carrier-phase observations and associated statistical information. Array 545 is supplied to a computation process 550 to compute a fixed position 555 using integer least squares, validation, and position computation. Details of the geometry-free filters are found in Laboratory Experiment On Carrier Phase Positioning Techniques for GNSS-2 (TCAR-Test), Technical Note WP 2100: Use of Physical Space Information, ESA/ESTEC Contract No. 12.406/77/NL/DS Rider 1, a Confidential Report of Spectra Precision Terrasat GmbH dated December 1999. A deficiency of this proposed approach to three-carrier ambiguity resolution (TCAR) is that all errors are handled as noise, making it computationally less efficient than desired and producing ambiguity estimates which are worse than desired.

Improved methods and systems are needed for ambiguity resolution of GNSS signals having three or more carriers.

SUMMARY OF THE INVENTION

Embodiments in accordance with the invention address the need for carrier-phase ambiguity resolution in future GNSS systems having three or more frequencies, e.g., Galileo and enhanced GPS.

Computationally efficient techniques are employed for obtaining good approximations of the carrier phase ambiguities for three or more frequency bands, greatly reducing the effort required for statistical search and validation is greatly reduced.

Advantages of embodiments in accordance with the invention as compared to existing multi-carrier ambiguity resolution techniques include high computational efficiency for the filter components (float solution) and the ability to obtain a better knowledge of the error properties of individual measurements and measurement combinations. This efficiency offers one or more benefits. Less-performant processing components are required, enabling construction of receivers at lower cost and/or which consume less power. Even if the processing power is available, most modern CPUs allow saving power by reducing the processor clock and/or putting the processing unit in a kind of sleep mode while no computations are pending. This is an important cost, weight and run-time factor. And for a given processing power, embodiments in accordance with the invention enable use of better computational models than is possible with prior techniques, leading to improved system performance.

BRIEF DESCRIPTION OF THE DRAWING

FIG. 9 shows a summary of the numbers of individual filters and filter banks in accordance with embodiments of the invention;

FIG. 12A shows structure of a single, geometry-free code filter bank in accordance with embodiments of the invention;

DETAILED DESCRIPTION

In the context of the present invention, the following terms are intended to have the meanings indicated, unless otherwise indicated by the context:

GALILEO comprises the Galileo satellite navigation system planned for deployment by the European Space Agency.

GLONASS comprises the Glonass satellite navigation system deployed by the Soviet Union.

GNSS (Global Navigation Satellite System) comprises generically the GPS, GLONASS and GALILEO systems, similar satellite-based navigation systems which may from time to time become operational, and pseudolite systems.

GPS comprises the NAVSTAR Global Positioning System deployed by the United States Department of Defense, as it currently exists and as it may exist with future modernization.

A pseudolite, also called a pseudo-satellite, is a transmitter of GNSS-like signals. A pseudolite is typically terrestrial.

A reference receiver (or reference station) is a GNSS receiver at a fixed location.

A rover is a mobile GNSS receiver.

A satellite is a transmitter of GNSS signals, and is intended to include a pseudolite.

A user is a rover or reference receiver.

The following notations are used in the description below:

| Notation | Interpretation |
| --- | --- |
| $\lambda_i$ | Wavelength of $i^{th}$ carrier [m] |
| $\sigma\phi_i$ | Standard deviation of $i^{th}$ carrier measurement [cycles] |
| $\sigma\rho_i$ | Standard deviation of $i^{th}$ code measurement [m] |
| $\sigma_{io}$ | Standard deviation of ionospheric residual [m] |
| $\sigma u_{k}^2$ | Variance of uncorrelated noise at epoch k |
| $\sigma c_{k}^2$ | Variance of correlated noise at epoch k |
| $tc_k$ | Time constant of correlated noise at epoch k |
| nf | Number of carriers [−] |
| ns | Number of satellites tracked [−] |
| ne | Number of epochs of data [−] |
| $\phi_i$ | Carrier phase measurement for frequency i [cycles] |
| $\rho_i$ | Code measurement for frequency i [m] |
| $A^T$ | Transposition of Matrix A |
| $A^{-1}$ | Inverse of quadratic Matrix A |
| $\vec{V}$ | Column vector |
| $X_{sol}^2$ | $X^2$ Statistics of solution sol |
| I | Identity matrix, size defined by the formula context |
| $|x|$ | Absolute value of x |

| Notation | Interpretation |
|---|---|
| E[x] | Expectation value of x |
| e | Base of the natural logarithm |

Overview

Figure 1:
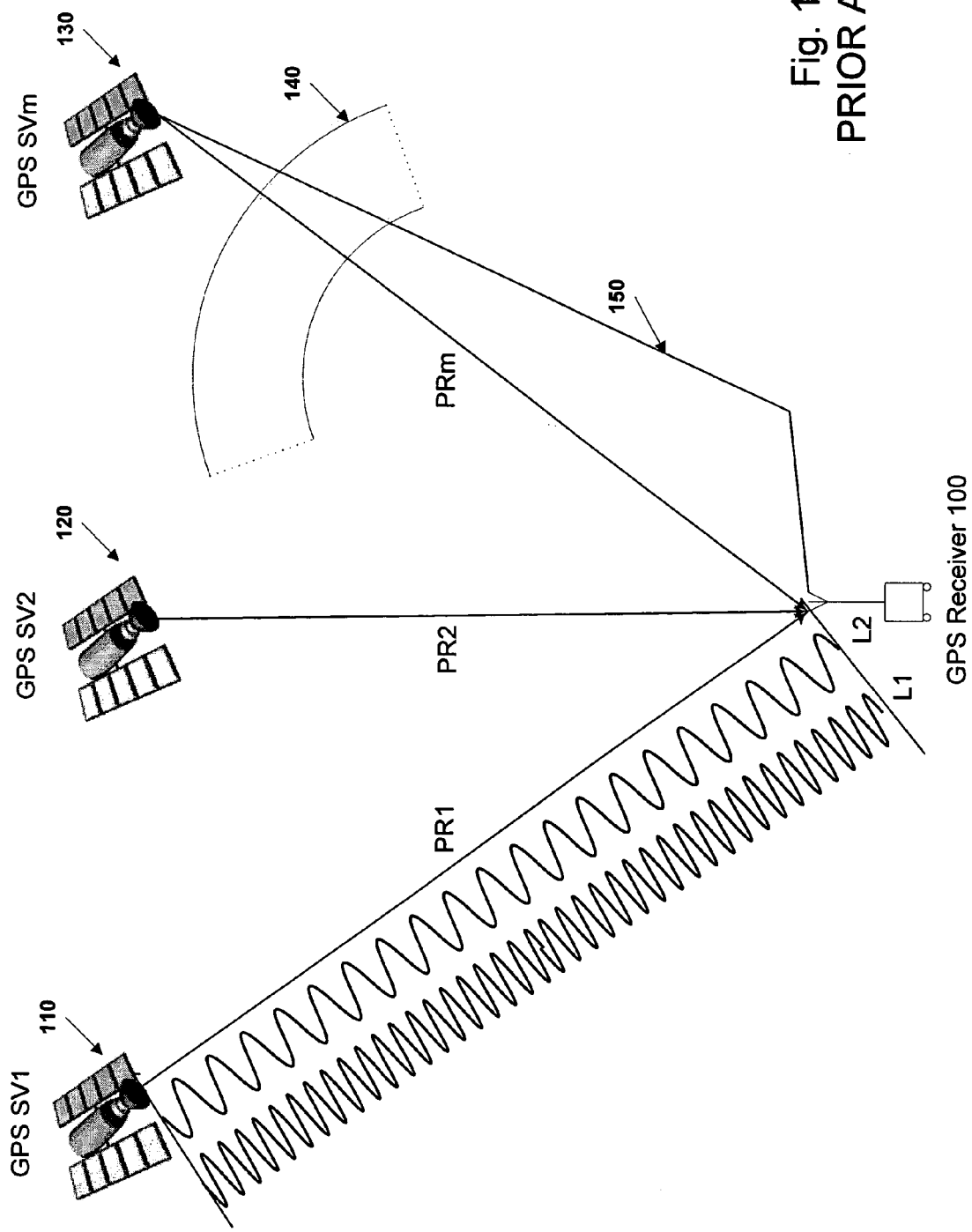
FIG. 1 schematically illustrates a typical prior-art two-carrier-frequency scenario.
Figure 2:
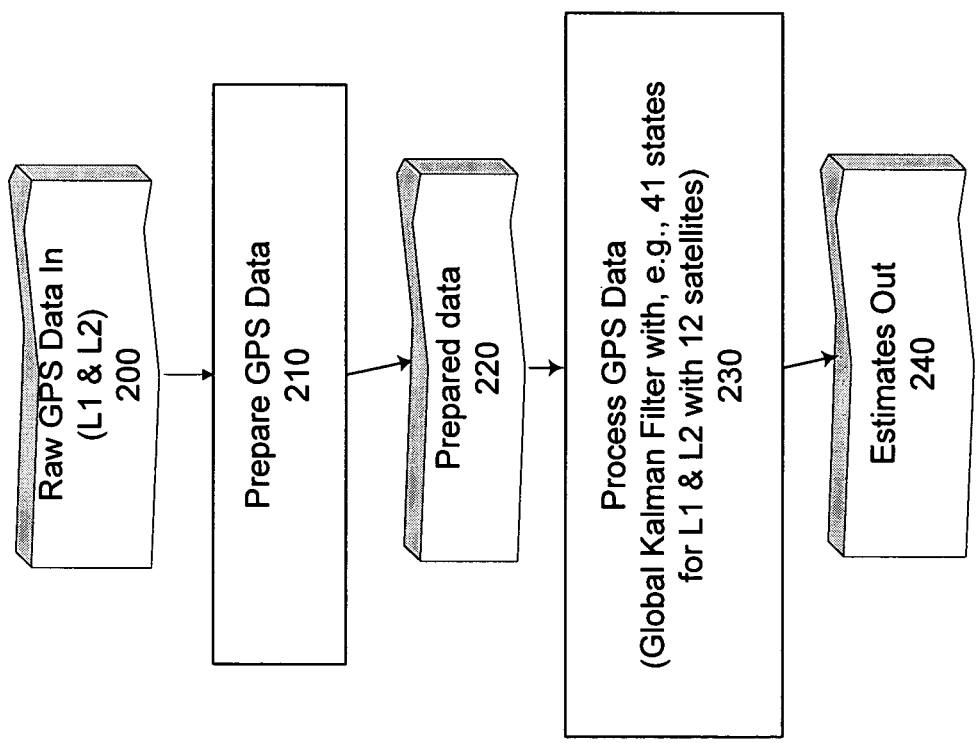
FIG. 2 shows a prior-art approach to processing of two-carrier-frequency GPS signal data.
Figure 3:
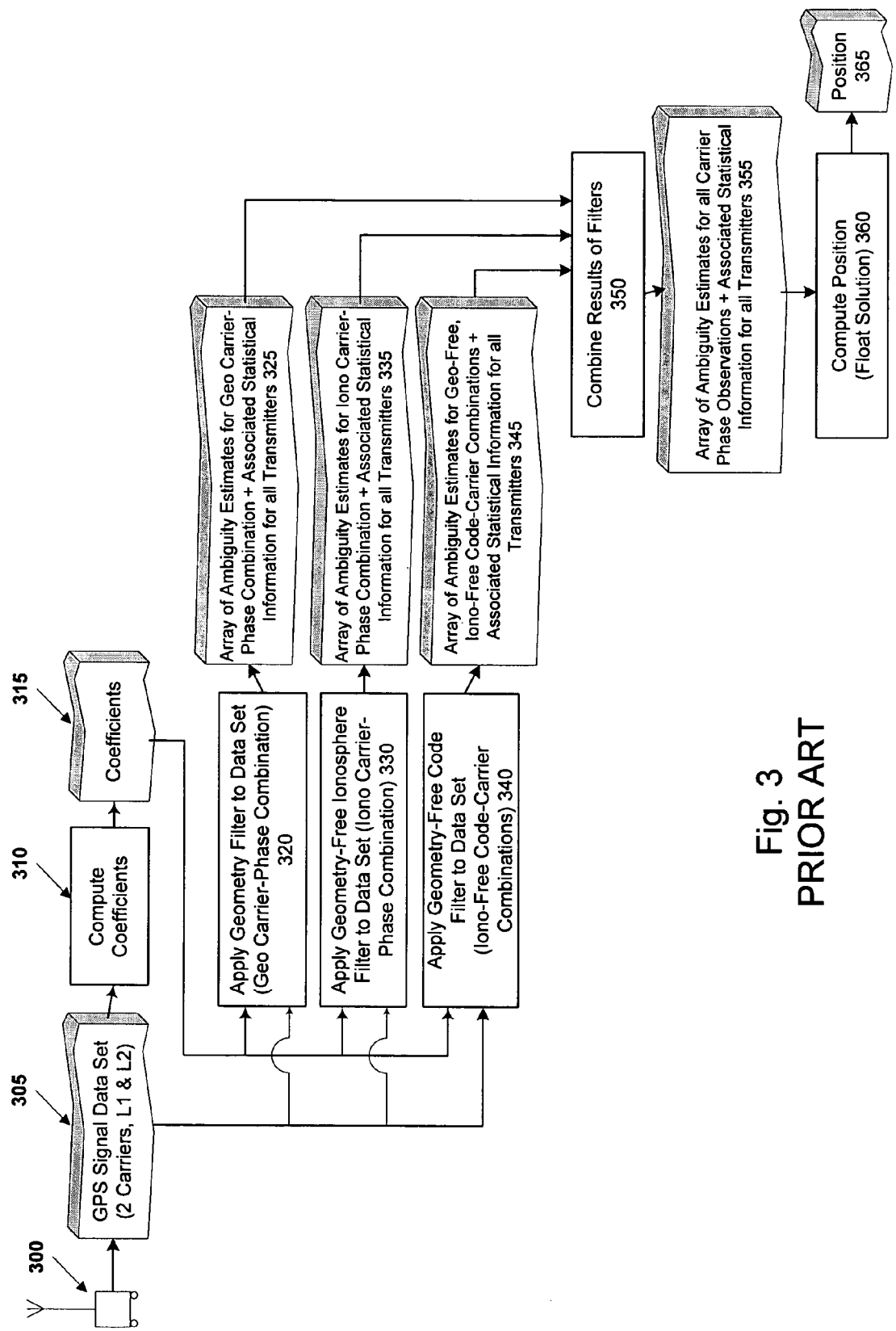
FIG. 3 shows a further prior-art approach to processing of two-carrier-frequency GPS signal data.
Figure 4:
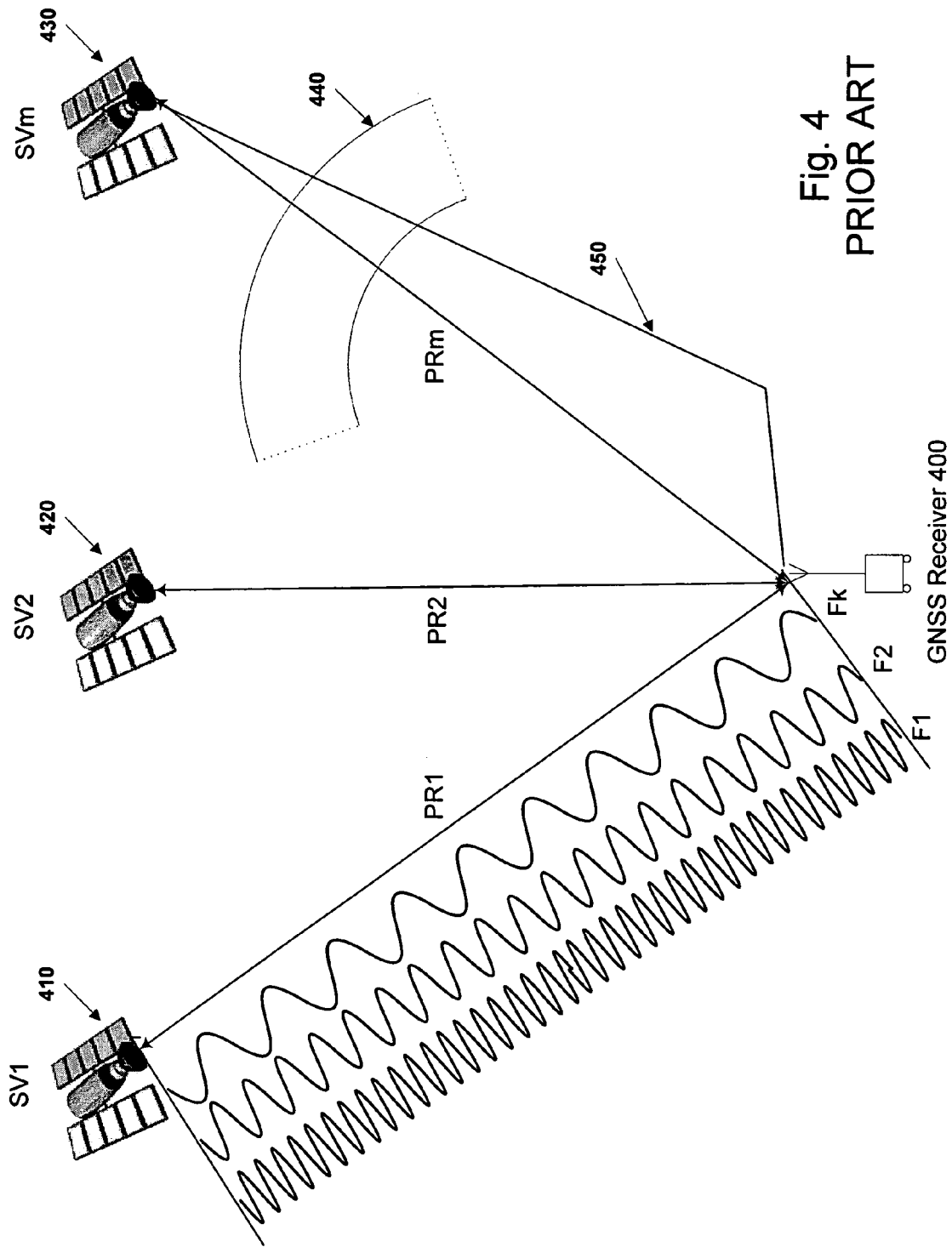
FIG. 4 schematically illustrates a proposed three-carrier-frequency scenario of the prior art.
Figure 5:
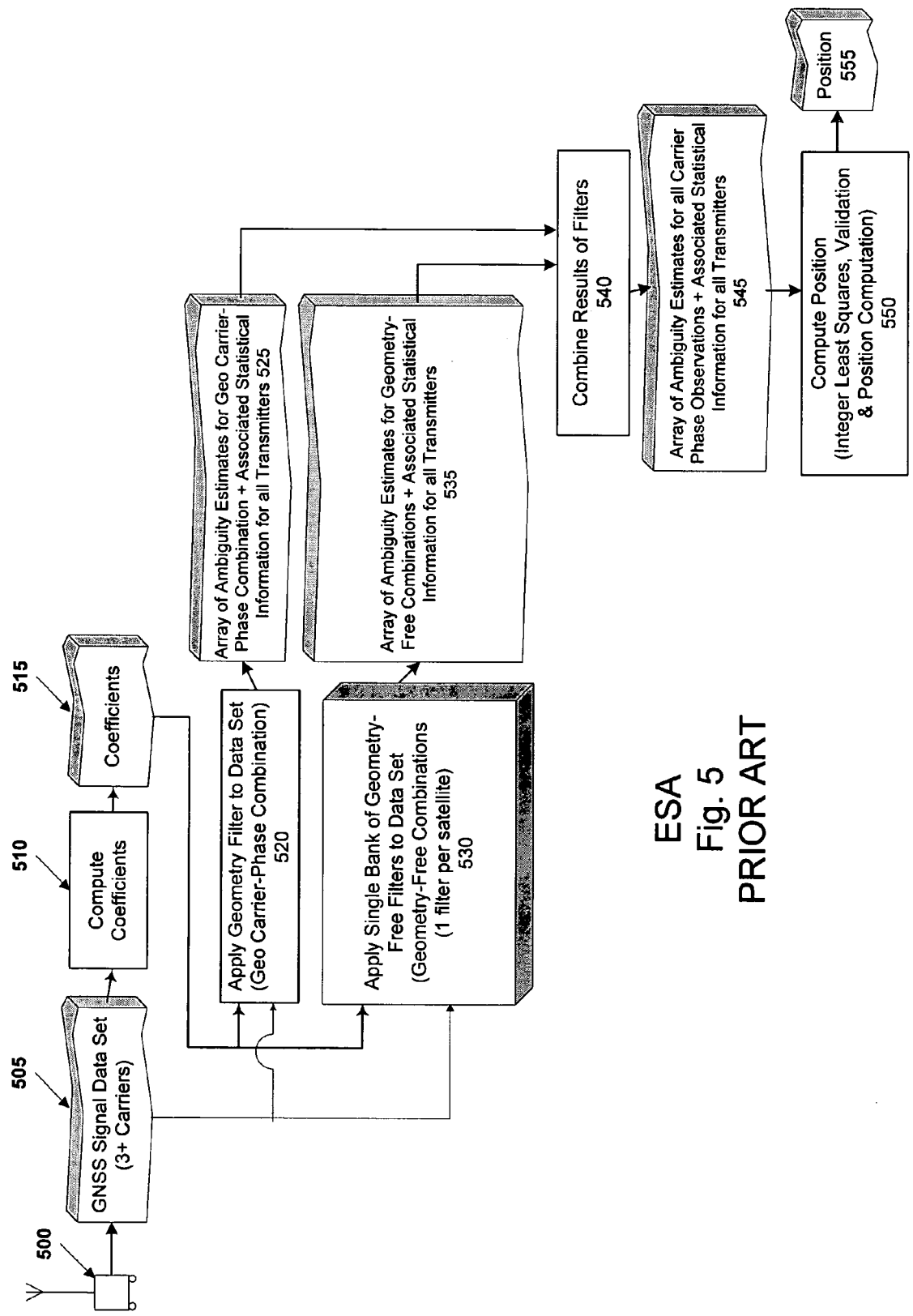
FIG. 5 shows a prior-art solution intended for the proposed Galileo system with three carrier frequencies.
Figure 6:
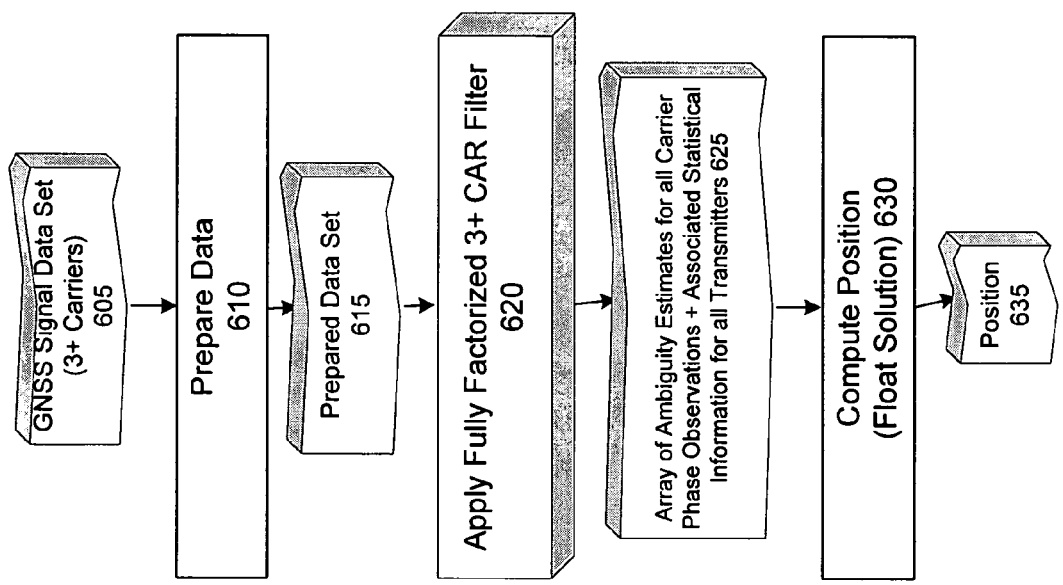
FIG. 6 shows an architecture for GNSS position determination in accordance with an embodiment of the invention.

FIG. 6 is a flowchart illustrating an architecture for computing GNSS position employing factorized ambiguity resolution of GNSS signals for three or more carriers in accordance with an embodiment of the invention. A GNSS signal data set 605 is a set of observations obtained by receiving signals of multiple satellites at a receiver. GNSS signal data set 605 is supplied to an element 610 which prepares the data for filtering, and the resulting prepared data 615 is then supplied to an element 620 which applies a fully-factorized carrier-ambiguity-resolution (CAR) filter to the prepared data.

Features and variations of the fully-factorized carrier-ambiguity-resolution (CAR) filter element 620 are described in detail below. The result of applying filter element 620 to the prepared data is an array 625 of ambiguity estimates for all carrier-phase observations and associated statistical information for all transmitters (e.g. for all observed GNSS satellites and/or pseudolites). Array 625 is supplied to a position-computation element 630 which computes a receiver position 635 for the time of the observations. In the example of FIG. 6, element 630 computes position 635 as a float solution.

Figure 7:
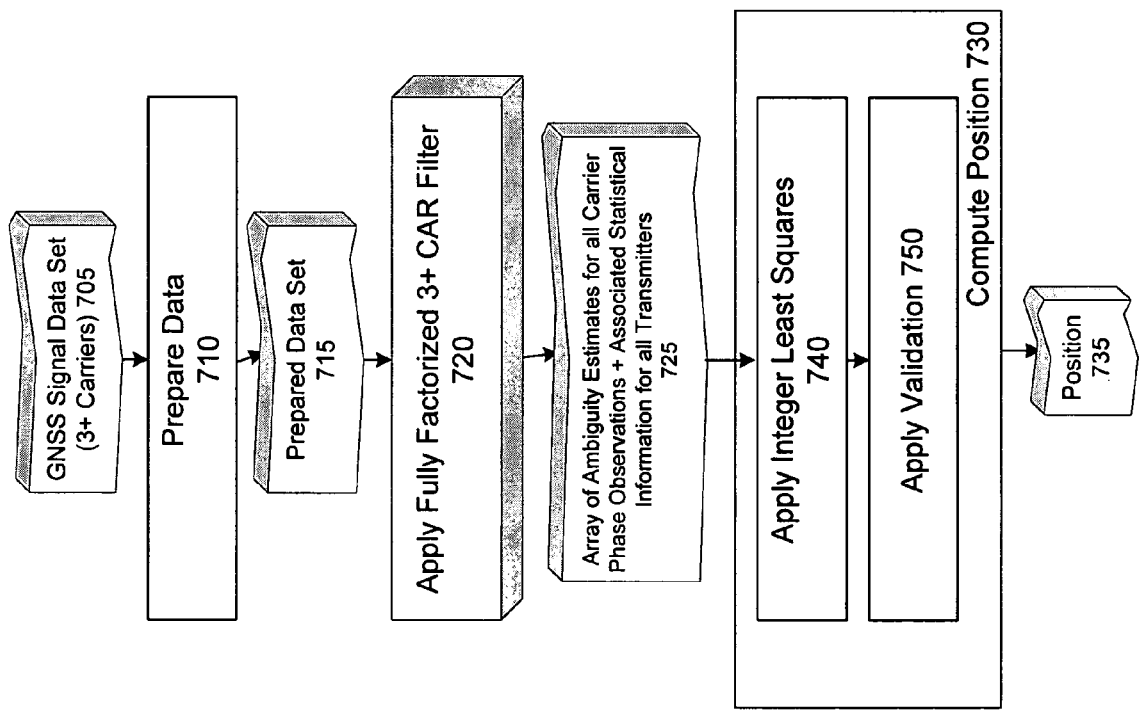
FIG. 7 shows a further architecture for GNSS position determination in accordance with an embodiment of the invention.

FIG. 7 is a flowchart illustrating a further architecture for GNSS positioning employing factorized ambiguity resolution of GNSS signals for three or more carriers in accordance with an embodiment of the invention. A GNSS signal data set 705 is a set of observations obtained by receiving signals of multiple satellites at a receiver. Data set 705 is supplied to an element 710 which prepares the data for filtering, and the resulting prepared data 715 is then supplied to an element 720 which applies a fully-factorized carrier-ambiguity-resolution (CAR) filter to the prepared data.

Features and variations of the fully-factorized carrier-ambiguity-resolution (CAR) filter of element 720 are described in detail below. The result of applying filter element 720 to the prepared data is an array 725 of ambiguity estimates for all carrier-phase observations and associated statistical information for all transmitters (e.g. for all observed GNSS satellites and/or pseudolites). Array 725 is supplied to a position-computation element 730 which computes a receiver position 735 for the time of the observations. In the example of FIG. 7, element 730 computes position 735 by applying an integer least squares process 740 to array 725 and applying a validation process 750.

Figure 8:
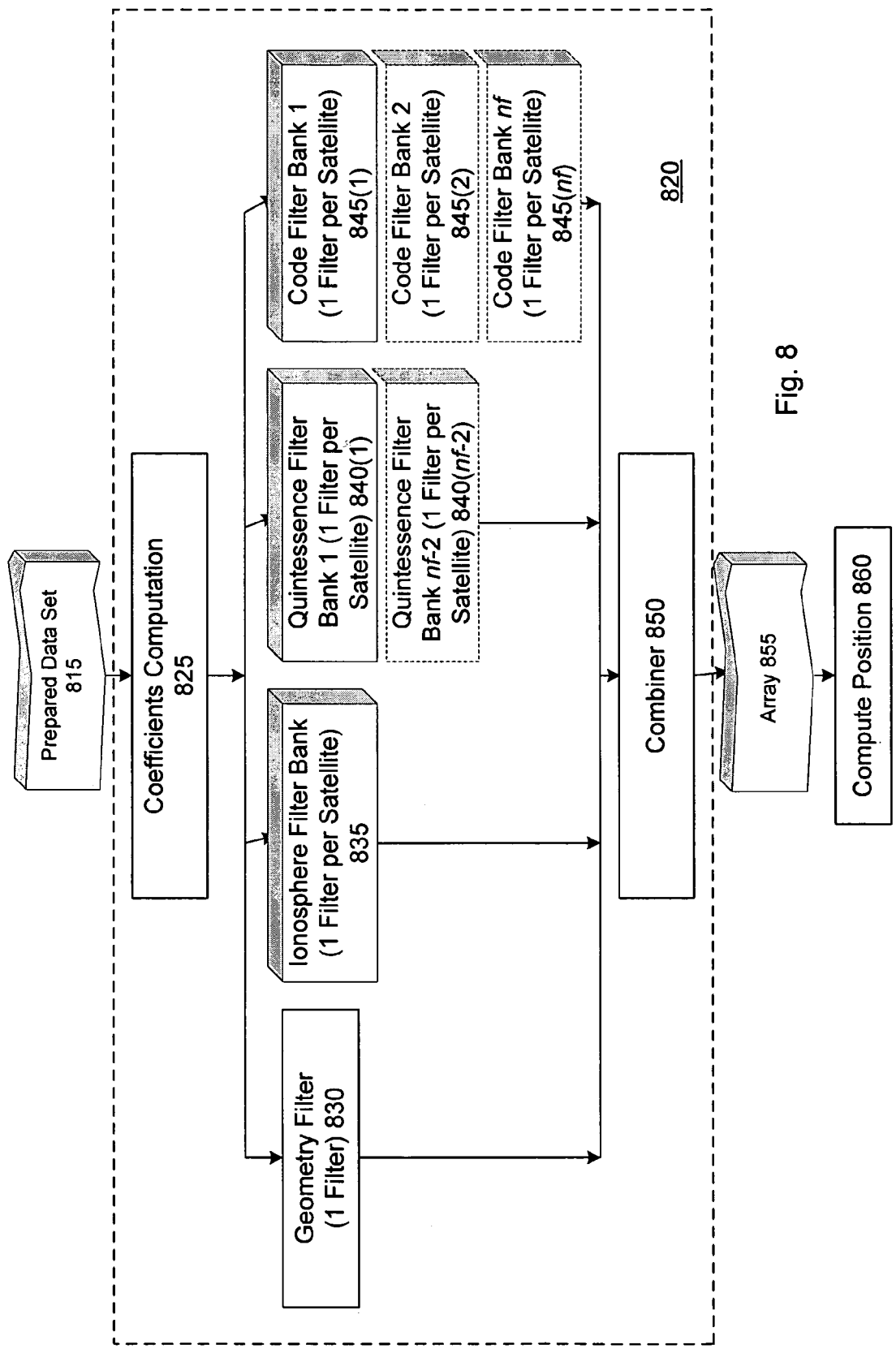
FIG. 8 shows elements of of a fully-factorized 3+ carrier ambiguity resolution filter in accordance with embodiments of the invention.

FIG. 8 shows the structure of a fully-factorized 3+ carrier ambiguity resolution filter 820 in accordance with embodiments of the invention, suitable for carrying out filter processes 620 and 720. A prepared GNSS signal data set 815, such as prepared GNSS signal data set 615 or 715, is supplied to filter 820, which contains a number of elements for carrying out sub-processes. Element 825 computes coefficients from the prepared data set and passes the prepared data set with computed coefficients to a plurality of sub-filters. These sub-filters include: a single geometry filter 830; a geometry-free ionosphere filter bank 835 having one filter per observed satellite; one or more Quintessence filter banks 840(1) to 840(nf–2) in which each filter bank has one filter per observed satellite; and one or more code filter banks 845(1) to 845(nf) in which each filter bank has one filter per observed satellite. Arrays produced by the sub-filters are supplied to a combiner 850 which provides a combined array 855 of ambiguity estimates for all carrier phase observations with associated statistical information. Array 855, corresponding to arrays 625 and 725, is supplied to an element 860 for position computation corresponding to processes 630 and 730.

The number of Quintessence filter banks is two less than the number nf of carrier frequencies of the GNSS signal data set 815, as two combinations are used by geometry filter 830 and ionosphere-filter bank 835. For example, a single bank of Quintessence filters is provided for a GNSS system having three carrier frequencies, and two banks of Quintessence filters are provided for a GNSS system having four carrier frequencies. At least one combined code filter bank is provided; if desired, a plurality of code filter banks may be provided up to the number nf of carrier frequencies of the GNSS signal data set 815. For example, any number from one to three code filter banks is provided for a GNSS system having three carrier frequencies, and any number from one to four code filter banks is provided for a GNSS system having four carrier frequencies. FIG. 9 shows a summary of the number of individual filters and filter banks in accordance with embodiments of the invention, each filter bank having one filter per satellite.

Figure 10:
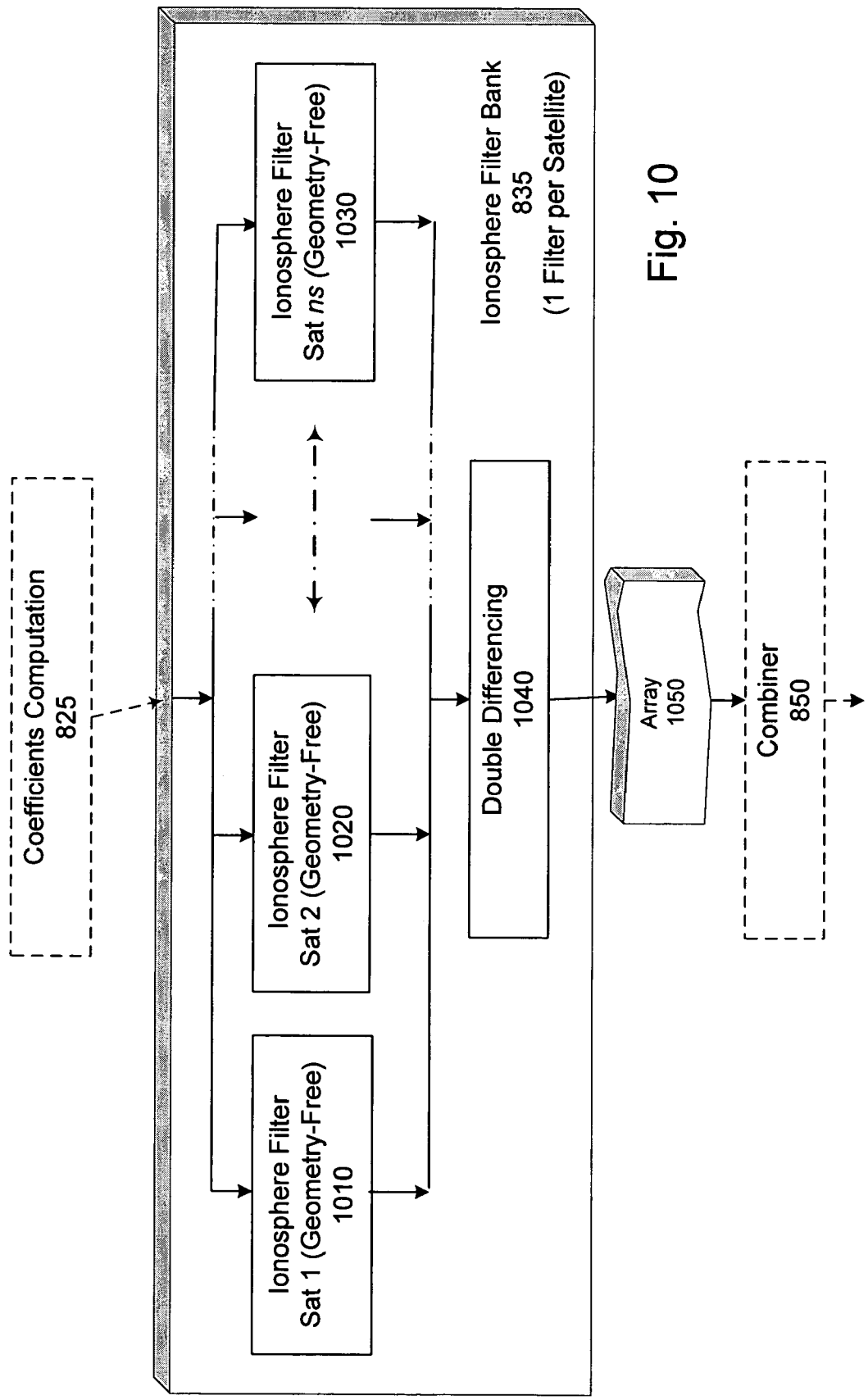
FIG. 10 shows structure of a geometry-free ionosphere filter bank in accordance with embodiments of the invention.

FIG. 10 shows structure of a geometry-free ionosphere filter bank 835 in accordance with embodiments of the invention, for a number ns of observed satellites. Ionosphere filter bank 835 includes a respective geometry-free ionosphere filter 1010, 1020, . . . 1030, each filter corresponding respectively to one of the observed satellites Sat1, Sat2, . . . Satns. Each filter is applied to the GNSS signal data for the corresponding satellite and supplies the result to a double-differencing element 1040 to obtain an array 1050 of ambiguity estimates for the ionosphere carrier-phase combination and associated statistical information. Array 1050 is supplied to a combiner, such as combiner 850, for combination with arrays from other sub-filters of a fully-factorized CAR filter such as filter 820.

Figure 11A:
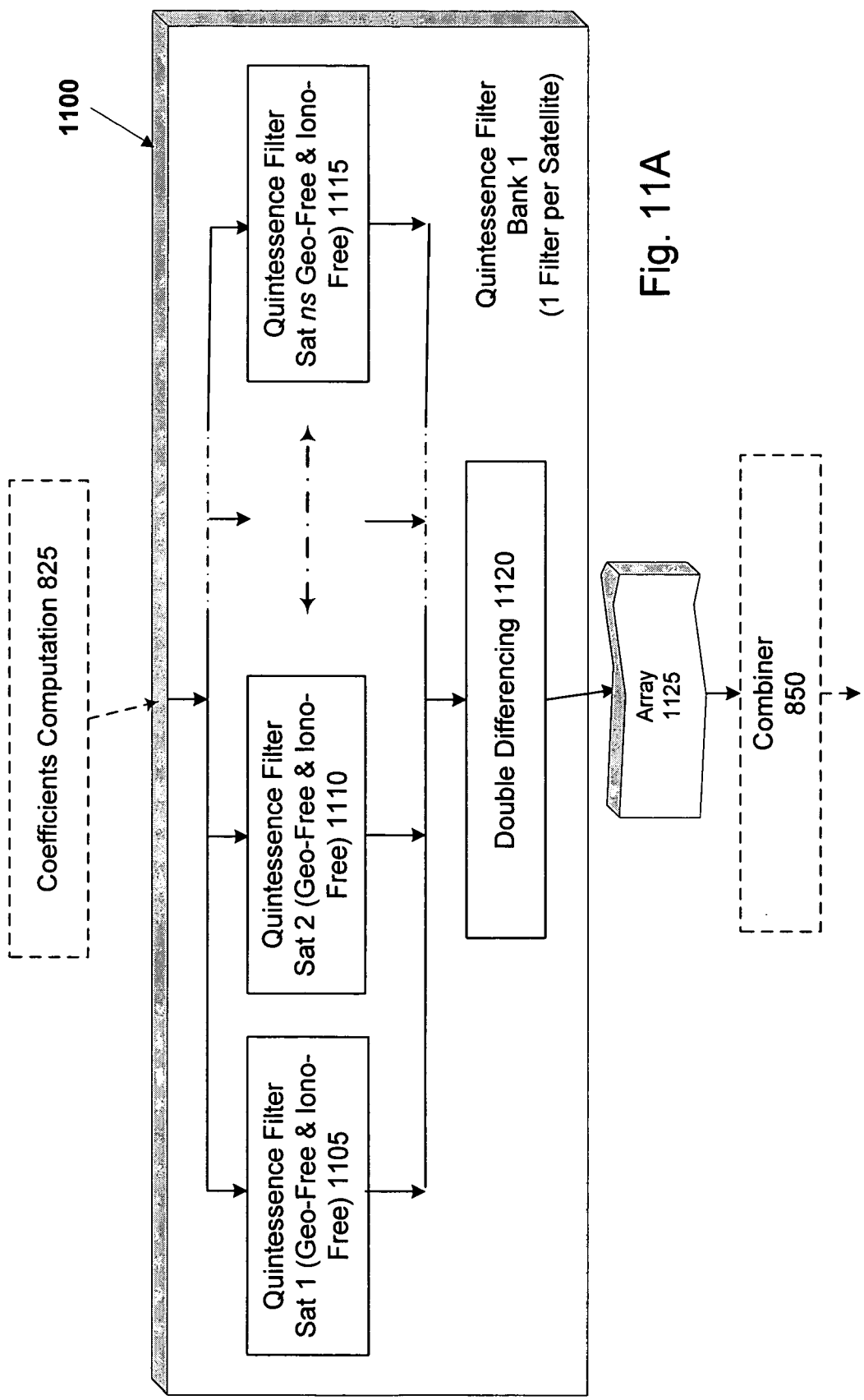
FIG. 11A shows structure of a Quintessence filter bank in accordance with embodiments of the invention.

FIG. 11A shows structure of a Quintessence filter bank 1100 in accordance with embodiments of the invention, for a number ns of observed satellites. Quintessence filter bank 1100 includes a respective geometry-free and ionosphere-free filter 1105, 1110, . . . 1115, each filter corresponding respectively to one of the observed satellites Sat1, Sat2, . . . Satns. Each filter is applied to the GNSS signal data for the corresponding satellite and supplies the result to a double-differencing element 1120 to obtain an array 1125 of ambiguity estimates for the geometry-free and ionosphere-free carrier-phase combination and associated statistical information. Array 1125 is supplied to a combiner, such as combiner 850, for combination with arrays from other sub-filters of a fully-factorized CAR filter such as filter 820.

In accordance with an embodiment of the invention shown in FIG. 11A, a single Quintessence filter bank 1100 is provided when the GNSS system has three carrier frequencies. In accordance with another embodiment of the invention shown in FIG. 11B, a number nf–2 of Quintessence filter banks is provided where nf is the number of GNSS carrier frequencies. For example, two Quintessence filter banks are provided in the case of four carrier frequencies.

Figure 11B:
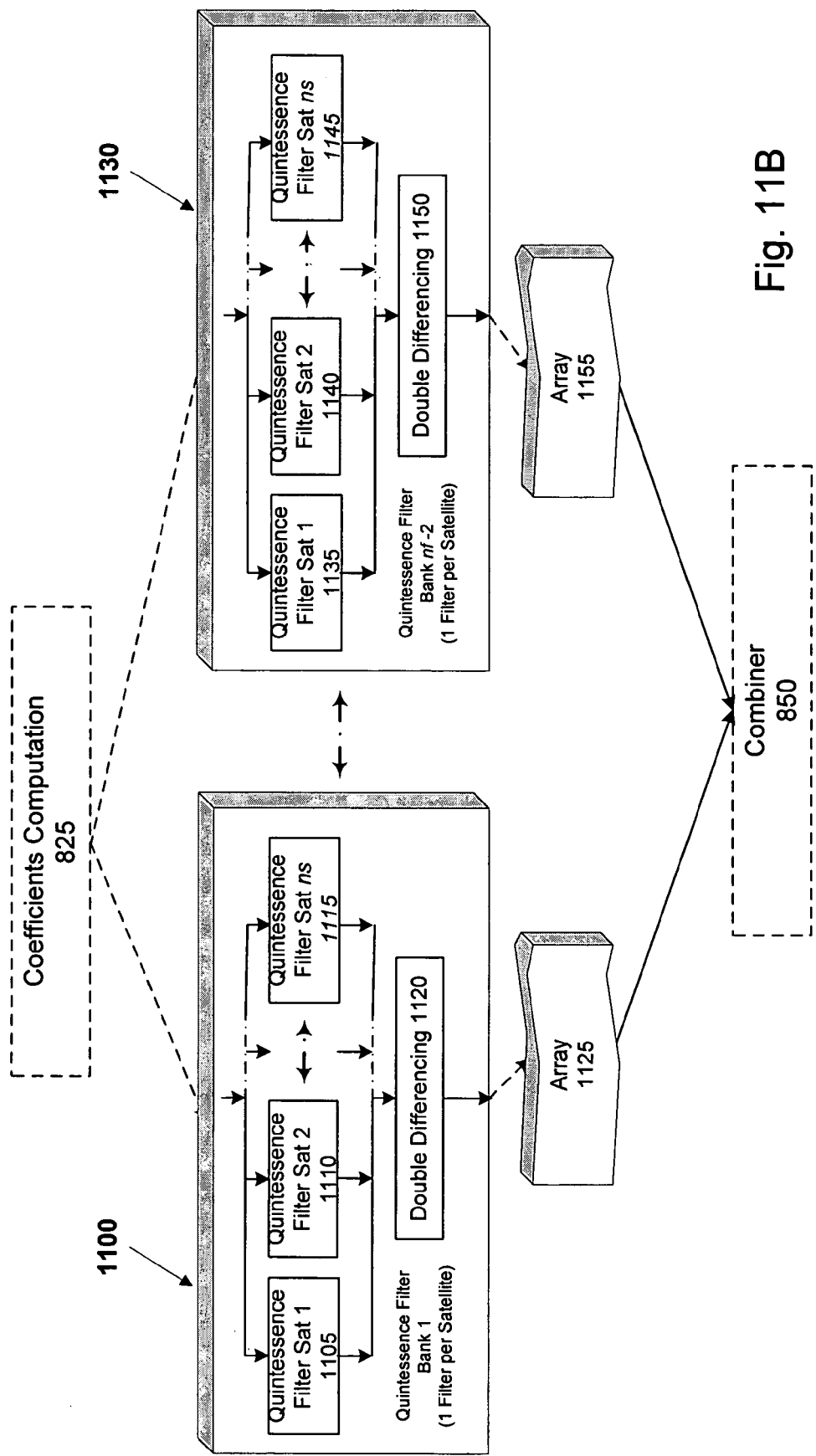
FIG. 11B shows a generalized structure in which a plurality of Quintessence filter banks is provided in accordance with embodiments of the invention.

FIG. 11B shows a generalized structure in which a plurality of Quintessence filter banks 1100, 1130 is provide in accordance with embodiments of the invention for a number ns of observed satellites. Quintessence filter bank 1100 is as shown in FIG. 11A. Quintessence filter bank 1130 includes geometry-free and ionosphere-free filters 1135, 1140, . . . 1145, each filter corresponding respectively to one of the observed satellites Sat1, Sat2, . . . Satns. Each filter is applied to the GNSS signal data for the corresponding satellite and supplies the result to a double-differencing element 1150 to obtain an array 1155 of ambiguity estimates for the geometry-free and ionosphere-free carrier-phase combination and associated statistical information. Array 1155 is supplied to a combiner, such as combiner 850, for combination with arrays from other sub-filters of a fully-factorized CAR filter such as filter 820.

FIG. 12A shows structure of a single, geometry-free code filter bank 1200 in accordance with embodiments of the invention, for a number ns of observed satellites. Code filter bank 1200 includes geometry-free, but not totally ionosphere-free, filters 1205, 1210, . . . 1215, each filter corresponding respectively to one of the observed satellites Sat1, Sat2, . . . Satns. Each filter is applied to the GNSS signal data for the corresponding satellite and supplies the result to a double-differencing element 1220 to obtain an array 1225 of ambiguity estimates for the geometry-free and ionosphere-free code-carrier combination and associated statistical information. Array 1225 is supplied to a combiner, such as combiner 850, for combination with arrays from other sub-filters of a fully-factorized CAR filter such as filter 820.

Figure 12B:
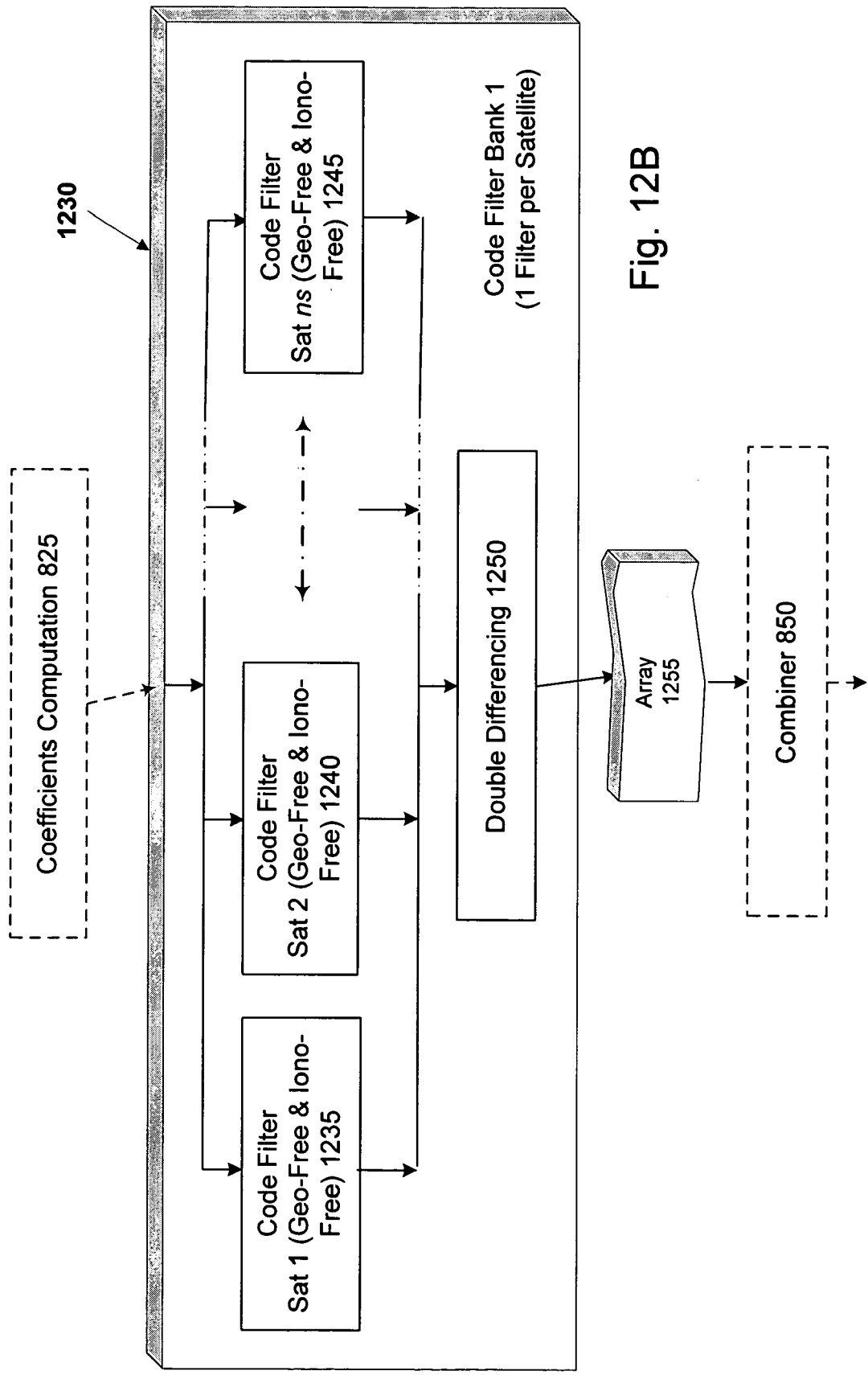
FIG. 12B shows structure of a single, geometry-free and ionosphere-free code filter bank in accordance with embodiments of the invention.

FIG. 12B shows structure of a single, geometry-free and ionosphere-free code filter bank 1230 in accordance with embodiments of the invention, for a number ns of observed satellites. Code filter bank 1230 includes geometry-free and ionosphere-free filters 1235, 1240, . . . 1245, each filter corresponding respectively to one of the observed satellites Sat1, Sat2, . . . Satns. Each filter is applied to the GNSS signal data for the corresponding satellite and supplies the result to a double-differencing element 1250 to obtain an array 1255 of ambiguity estimates for the geometry-free and ionosphere-free code-carrier combination and associated statistical information. Array 1225 is supplied to a combiner, such as combiner 850, for combination with arrays from other sub-filters of a fully-factorized CAR filter such as filter 820.

Figure 13:
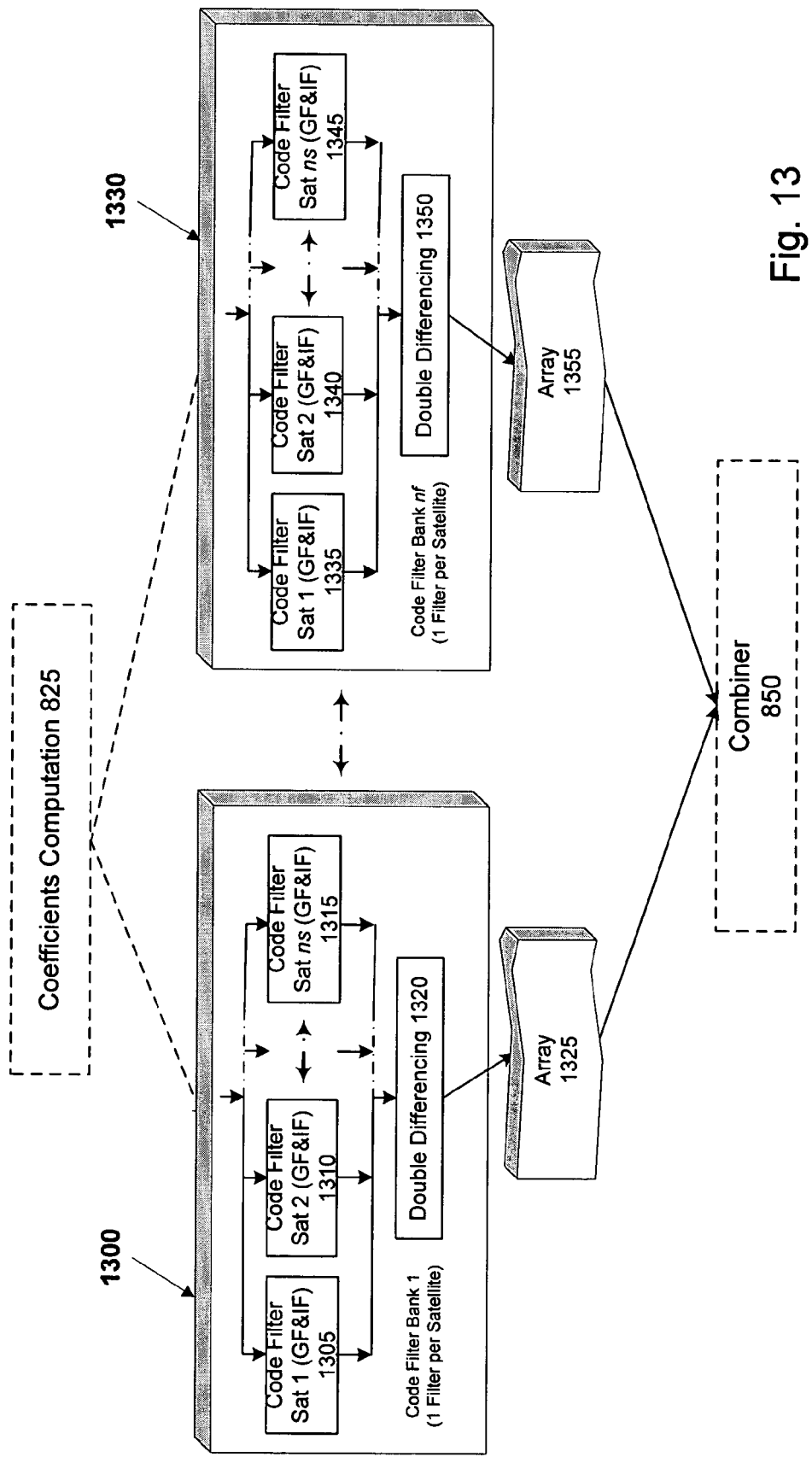
FIG. 13 shows structure of a number of geometry-free and ionosphere-free code filter banks in accordance with embodiments of the invention.

FIG. 13 shows structure of a number of geometry-free and ionosphere-free code filter banks 1300, . . . 1330 in accordance with embodiments of the invention, for a number ns of observed satellites. The number of code filter banks 1300, . . . 1330 is any number up to the number nf of GNSS carrier frequencies. For example, a GNSS system having three carrier frequencies can have up to three code filter banks, and a GNSS system having four carrier frequencies can have up to four code filter banks.

Referring to FIG. 13, filter bank 1300 includes geometry-free and ionosphere-free filters 1305, 1310, . . . 1315, each filter corresponding respectively to one of the observed satellites Sat1, Sat2, . . . Satns. Each filter is applied to the GNSS signal data for the corresponding satellite and supplies the result to a double-differencing element 1320 to obtain an array 1325 of ambiguity estimates for the geometry-free and ionosphere-free code-carrier combination and associated statistical information. Array 1325 is supplied to a combiner, such as combiner 850, for combination with arrays from other sub-filters of a fully-factorized CAR filter such as filter 820.

Referring still to FIG. 13, filter bank 1330 includes geometry-free and ionosphere-free filters 1335, 1340, . . . 1345, each filter corresponding respectively to one of the observed satellites Sat1, Sat2, . . . Satns. Each filter is applied to the GNSS signal data for the corresponding satellite and supplies the result to a double-differencing element 1350 to obtain an array 1355 of ambiguity estimates for the geometry-free and ionosphere-free code-carrier combination and associated statistical information. Array 1355 is supplied to a combiner, such as combiner 850, for combination with arrays from other sub-filters of a fully-factorized CAR filter such as filter 820.

Figure 14:
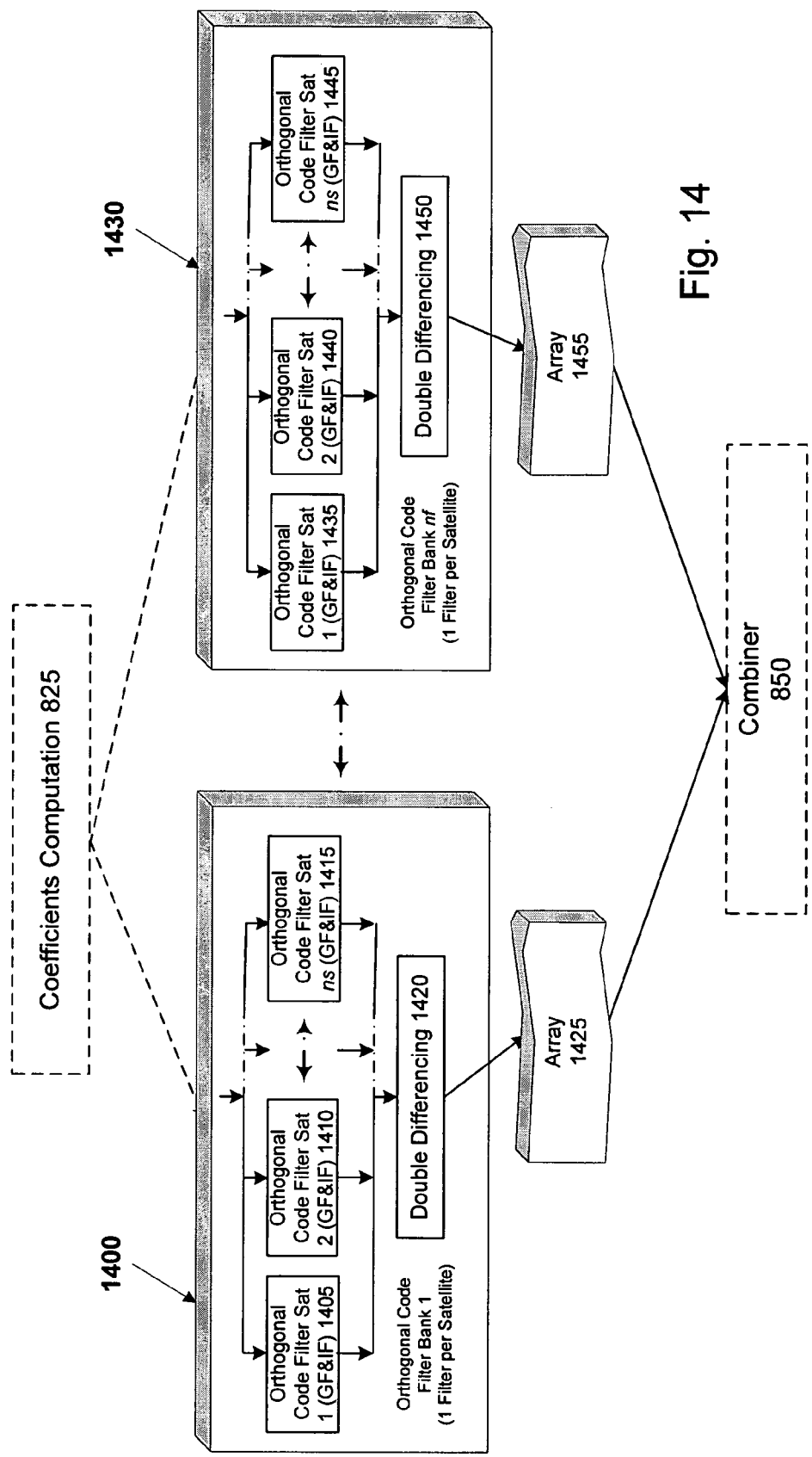
FIG. 14 shows structure of a number of mutually-orthogonal, geometry-free and ionosphere-free code filter banks in accordance with embodiments of the invention.

FIG. 14 shows structure of a number of geometry-free and ionosphere-free code filter banks 1400, . . . 1430 specified as being mutually orthogonal in accordance with embodiments of the invention, for a number ns of observed satellites. The number of mutually-orthogonal code filter banks 1400, . . . 1430 is any number up to the number nf of GNSS carrier frequencies. For example, a GNSS system having three carrier frequencies can have up to three code filter banks, and a GNSS system having four carrier frequencies can have up to four code filter banks.

Referring to FIG. 14, filter bank 1400 includes mutually-orthogonal geometry-free and ionosphere-free filters 1405, 1410, . . . 1415, each filter corresponding respectively to one of the observed satellites Sat1, Sat2, . . . Satns. Each filter is applied to the GNSS signal data for the corresponding satellite and supplies the result to a double-differencing element 1420 to obtain an array 1425 of ambiguity estimates for the geometry-free and ionosphere-free code-carrier combination and associated statistical information. Array 1425 is supplied to a combiner, such as combiner 850, for combination with arrays from other sub-filters of a fully-factorized CAR filter such as filter 820.

Referring still to FIG. 14, filter bank 1430 includes geometry-free and ionosphere-free filters 1435, 1440, . . . 1445, each filter corresponding respectively to one of the observed satellites Sat1, Sat2, . . . Satns. Each filter is applied to the GNSS signal data for the corresponding satellite and supplies the result to a double-differencing element 1450 to obtain an array 1455 of ambiguity estimates for the geometry-free and ionosphere-free code-carrier combination and associated statistical information. Array 1455 is supplied to a combiner, such as combiner 850, for combination with arrays from other sub-filters of a fully-factorized CAR filter such as filter 820.

Figure 15:
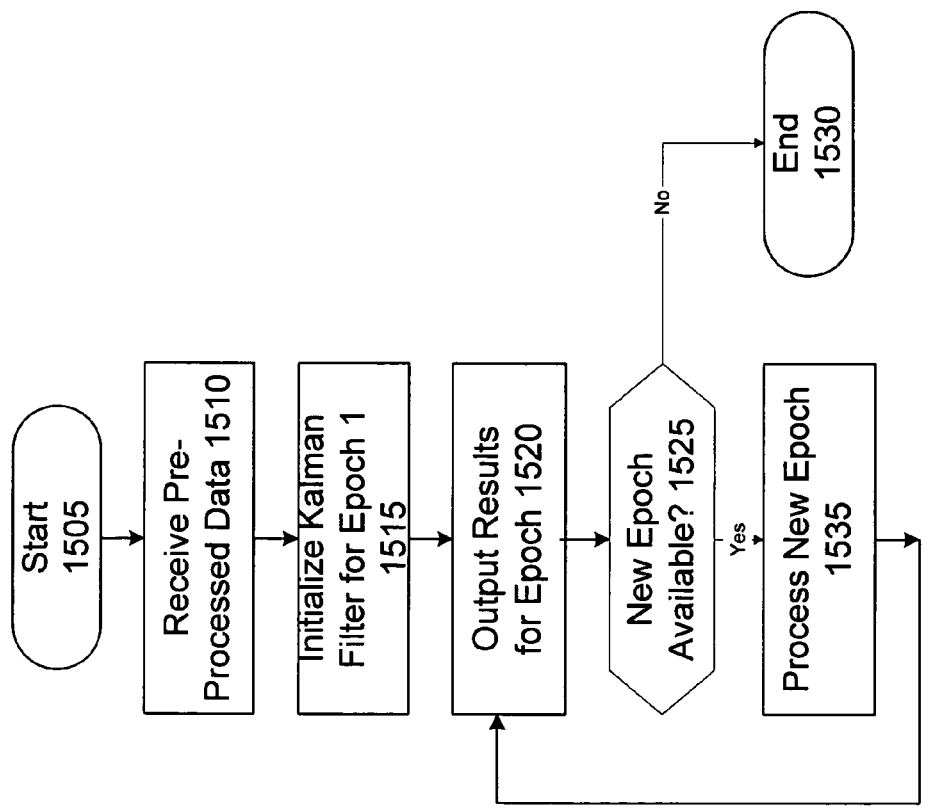
FIG. 15 is a flow chart illustrating a high-level processing method in accordance with embodiments of the invention.

FIG. 15 is a flow chart illustrating a high-level processing method in accordance with embodiments of the invention. Starting at 1505, pre-processed GNSS data is received at 1510. A fully-factorized 3+ carrier ambiguity resolution filter, such as filter 820, is initialized at 1515 for a first epoch and processes the data for the first epoch. Results of processing for the first epoch are provided as output at 1520. A check made at 1525 whether a pre-processed data set is available for a new epoch. If no, the process ends at 1530. If yes, the data set for the new epoch is processed at 1535 and the results of the processing the new epoch are provided as output at 1520. The method repeats from 1525 as indicated.

Figure 16:
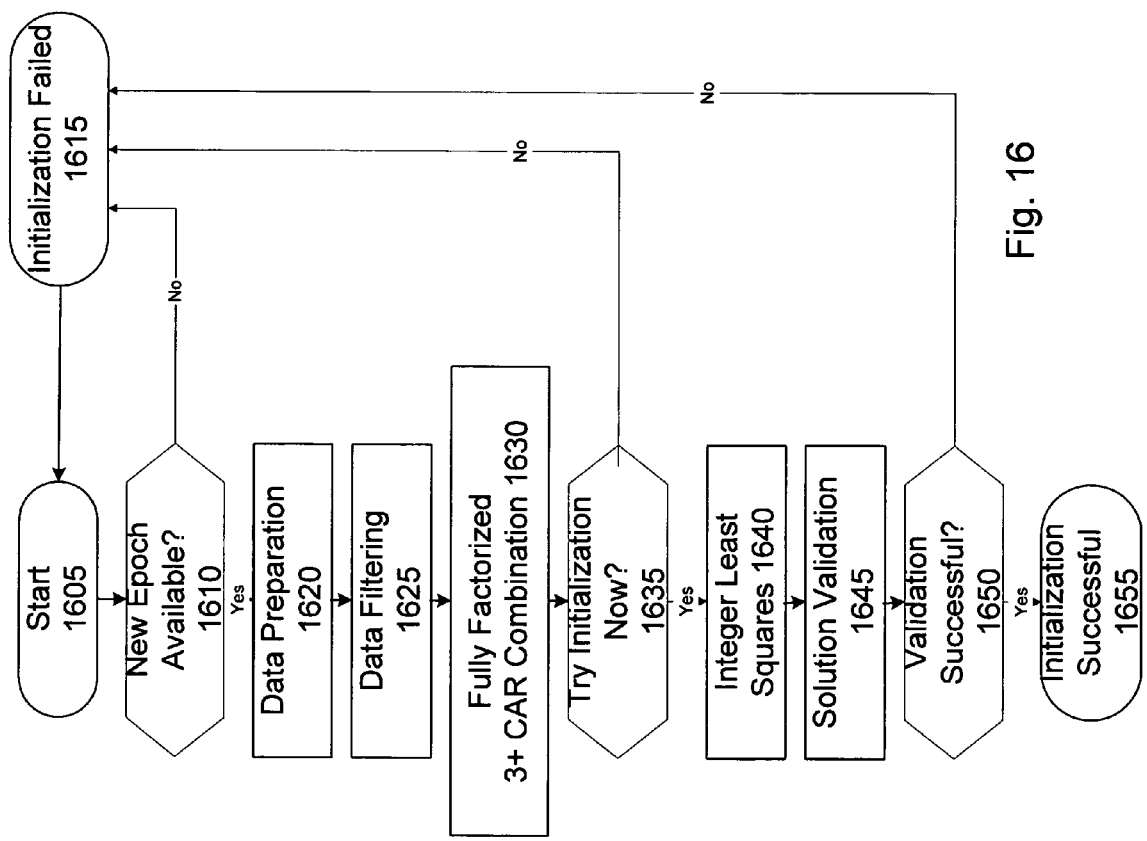
FIG. 16 is a flow chart illustrating an example of system initialization in accordance with embodiments of the invention.

FIG. 16 is a flow chart illustrating one of many possible examples of system initialization in accordance with embodiments of the invention. Starting at 1605, a check is made at 1610 whether a raw GNSS data set is available for a new epoch. If no, initialization is considered to have failed and control returns via 1615 to restart the process at 1605. If yes, the raw GNSS data set is prepared at 1620 and filtered at 1625. A fully-factorized 3+ carrier ambiguity resolution combination, such as combination 820, is applied to the prepared and filtered data set at 1630. If the ambiguity estimates have not sufficiently converged, initialization is considered to have failed and control returns via 1615 to restart the process at 1605. If the ambiguity estimates have sufficiently converged, initialization is considered successful and a position is computed, such as by an integer least squares calculation at 1640. What constitutes sufficient convergence of the ambiguity estimates to consider initialization successful is a matter of design choice which may be, for example, plus or minus five or ten cycles of a carrier. If the ambiguity estimates are not converging, the processing resources to compute an integerleast-squares solution can be spared by restarting and awaiting a fresh data set. In any event, the ambiguity estimates will converge after a few epochs. A solution validation is performed at 1645 and a check is made at 1650 whether the validation was successful. If no, initialization is considered to have failed and control returns via 1615 to restart the process at 1605. If yes, initialization is deemed successful at 1655.

Figure 17:
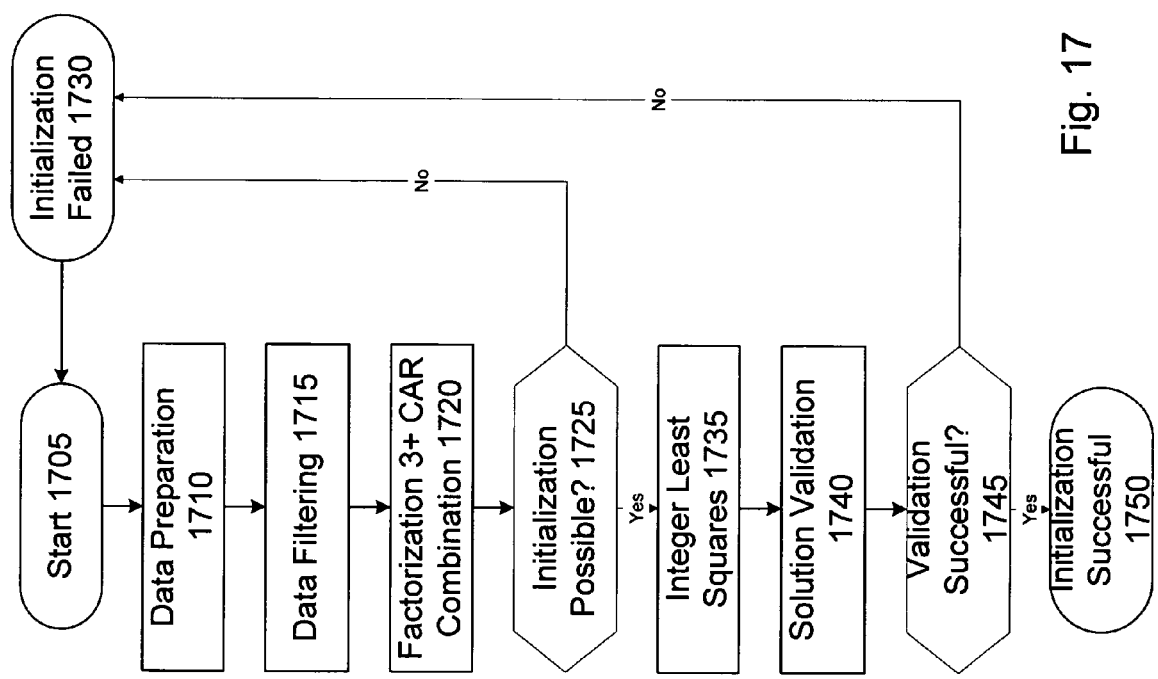
FIG. 17 is a flow chart illustrating an example of system initialization within a single epoch in accordance with embodiments of the invention.

FIG. 17 is a flow chart illustrating one of many possible examples of instantaneous system initialization within a single epoch in accordance with embodiments of the invention. Starting at 1705, the raw GNSS data set is prepared at 1710 and filtered at 1715. A fully-factorized 3+ carrier ambiguity resolution combination, such as combination 820, is applied to the prepared and filtered data set at 1720. A check is made at 1725 whether initialization is possible with the available data. If no, initialization is considered to have failed and control returns via 1730 to restart the process at 1705. If yes, integer ambiguities are determined, such as by an integer least squares calculation at 1735. A solution validation is performed at 1740 and a check is made at 1745 whether the validation was successful. If no, initialization is considered to have failed and control returns via 1730 to restart the process at 1705. If yes, initialization is deemed successful at 1750.

Figure 18:
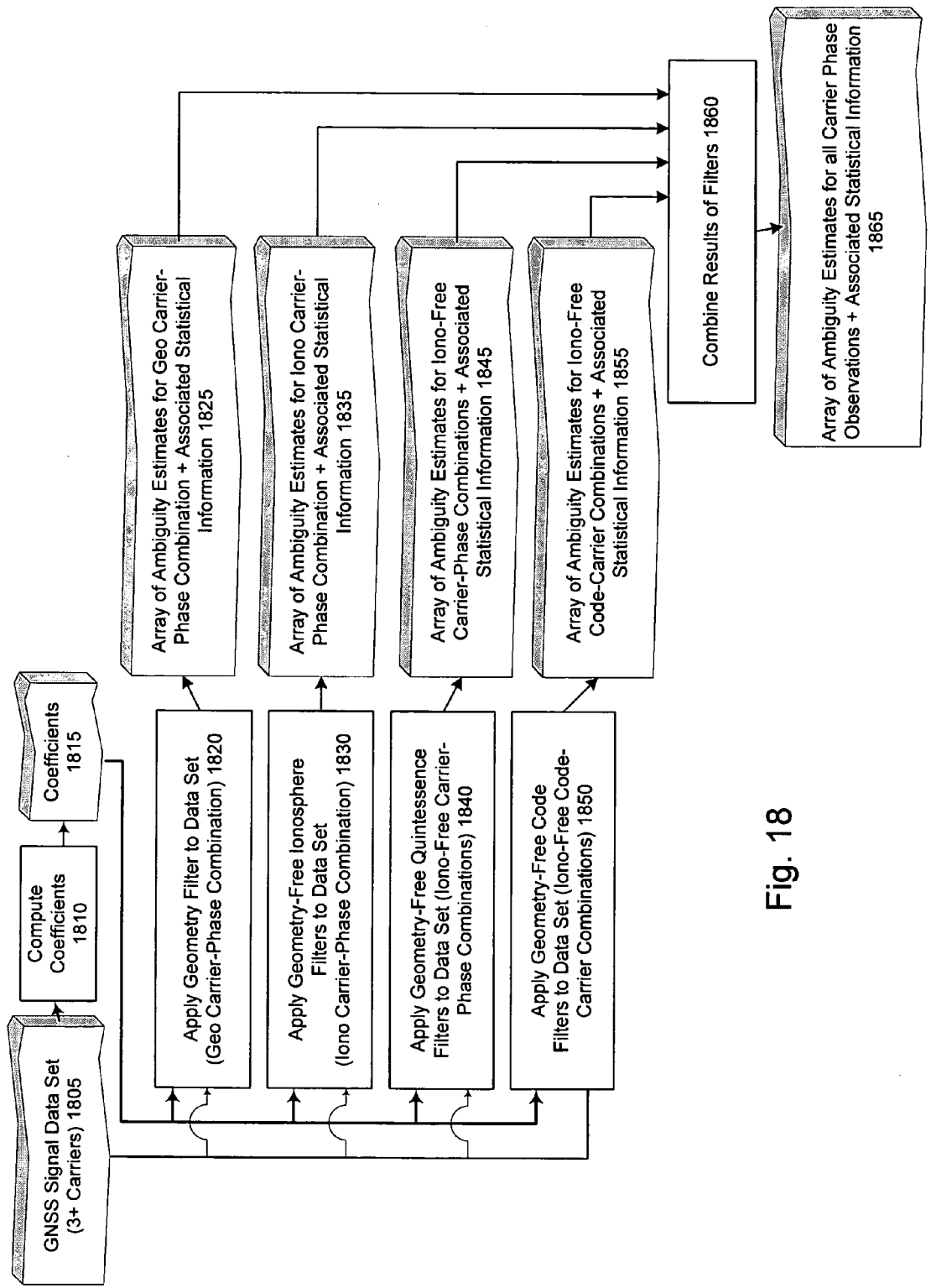
FIG. 18 schematically illustrates a method in accordance with embodiments of the invention for processing a GNSS signal data set with three or more carriers.

FIG. 18 schematically illustrates a method in accordance with embodiments of the invention for processing a GNSS signal data set 1805 with three or more carriers. GNSS signal data set 1805 is optionally processed at 1810 to compute coefficients 1815 for use in the sub-filters of a fully-factorized 3+ carrier ambiguity resolution filter, such as filter 820; coefficients 1815 may alternatively be computed in the subfilters at the cost of somewhat greater processing burden. The coefficients are interrelated and are orthogonal as they are computed to minimize error as discussed in more detail below. Sub-filter process 1820 applies to data set 1805 a geometry filter such as geometry filter 830 using a geometry carrier-phase combination to obtain an array 1825 of ambiguity estimates for the geometry carrier-phase combination and associated statistical information. Sub-filter process 1830 applies to data set 1805 a bank of ionosphere filters such as ionospher filter bank 835 using a geometry-free ionosphere carrier-phase combination to obtain an array 1835 of ambiguity estimates for the ionosphere carrier-phase combination and associated statistical information.

Sub-filter process 1840 applies to data set 1805 at least one bank of Quintessence filters such as Quintessence filter banks 840(1) . . . 840(nf−2) using a geometry-free and ionosphere-free carrier-phase combination to obtain an array 1845 of ambiguity estimates for the geometry-free and ionosphere-free carrier-phase combination and associated statistical information. The number of Quintessence filter banks is dependent on the number of carrier frequencies as discussed above with reference to FIGS. 9 and 11B. Sub-filter process 1850 applies to data set 1805 at least one code filter bank such as code filter bank 1200 or 1230 or code filter banks 1300 . . . 1330 or 1400 . . . 1430, using a plurality of geometry-free code-carrier combinations to obtain an array 1855 of ambiguity estimates for the code-carrier combinations and associated statistical information for the plurality of transmitters. The number and characteristics of the code filter banks are described above with reference to FIGS. 9, 12A, 12B, 13 and 14. Arrays 1825, 1835, 1845 and 1855 are combined at 1860 to obtain a combined array 1865 of ambiguity estimates for all carrier phase observations and associated statistical information. Sub-filter processes 1820, 1830, 1840, 1850 may be carried out in parallel, for example in separate threads within a processor or in separate processors, as desired to optimize considerations such as computational efficiency, processor power consumption and/or overall processing time to position fix from availability of data set 1805.

Figure 19:
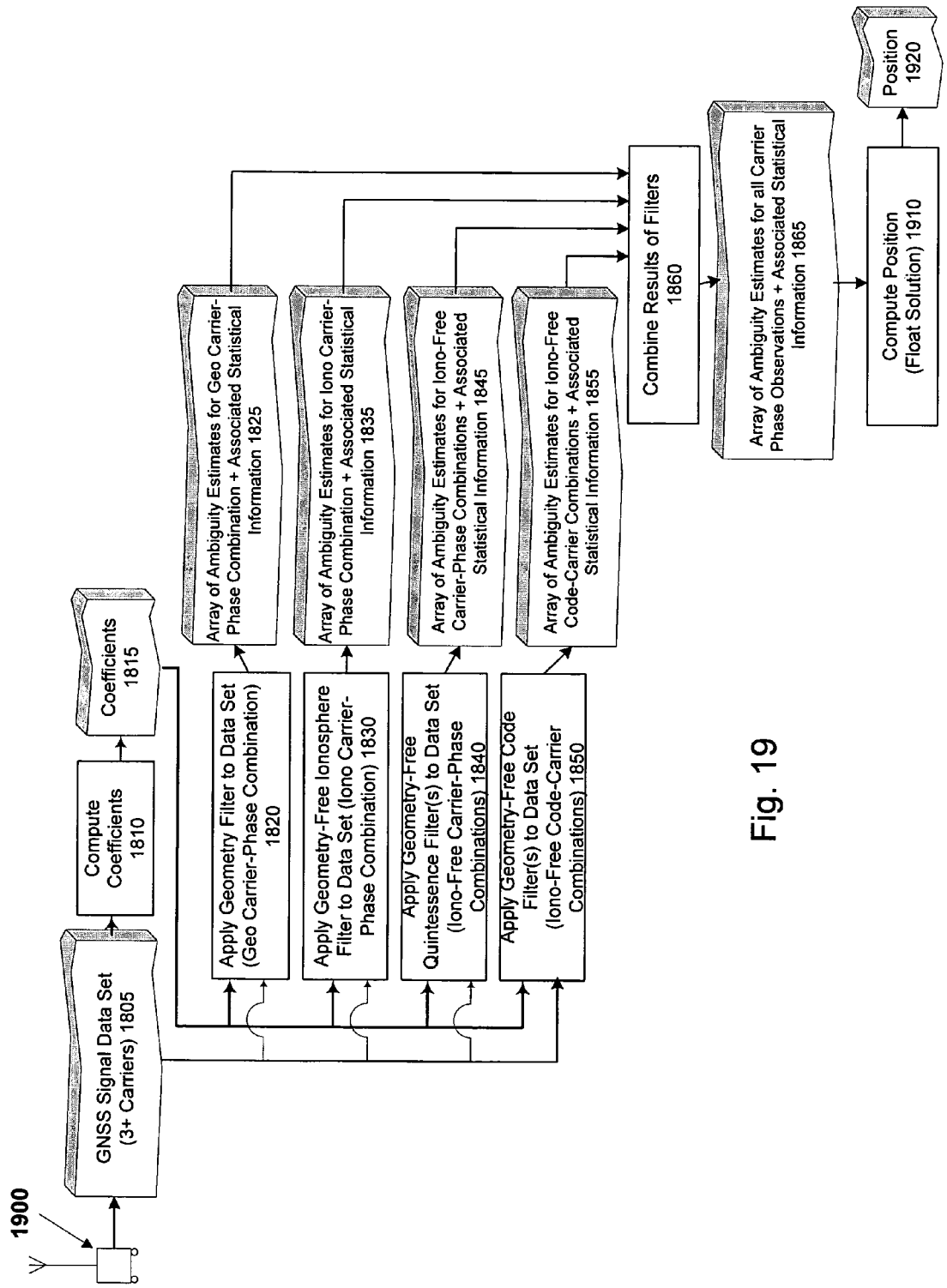
FIG. 19 shows an application of the method of FIG. 18 to obtain a computed position for a 3+ carrier-frequency GNSS receiver.

FIG. 19 shows an application of the method of FIG. 18 to obtain a computed position for a 3+ carrier-frequency GNSS receiver 1900. GNSS signal data set 1805 is prepared by receiver 1900 from observables of 3+ carrier-frequency GNSS signals. Array 1865 is supplied to a process 1910 which computes a float-solution position of receiver 1900 corresponding to the time of acquisition of data set 1805 and provides the computed position 1920 as an output.

Figure 20:
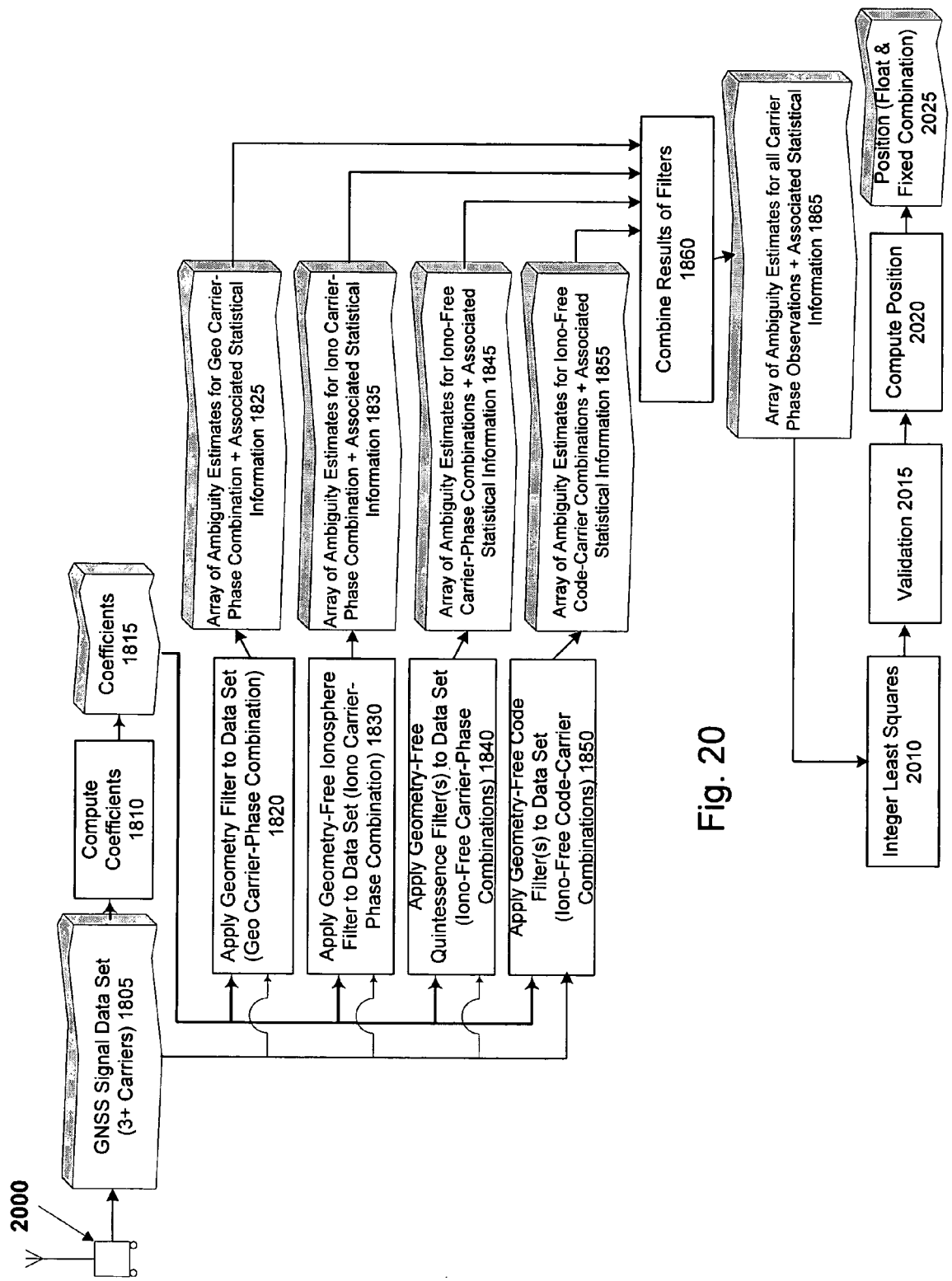
FIG. 20 shows a further application of the method of FIG. 18 to obtain a computed position for a 3+ carrier-frequency GNSS receiver.

FIG. 20 shows a further application of the method of FIG. 18 to obtain a computed position for a 3+ carrier-frequency GNSS receiver 2000. GNSS signal data set 1805 is prepared by receiver 2000 from observables of 3+ carrier-frequency GNSS signals. Array 1865 is supplied to a process 2010 which determines integer ambiguities by computing an integer-least-squares solution. A validation process 2015 checks validity of the solution, which is used in a process 2020 to compute position 2025 of receiver 2000.

Figure 21:
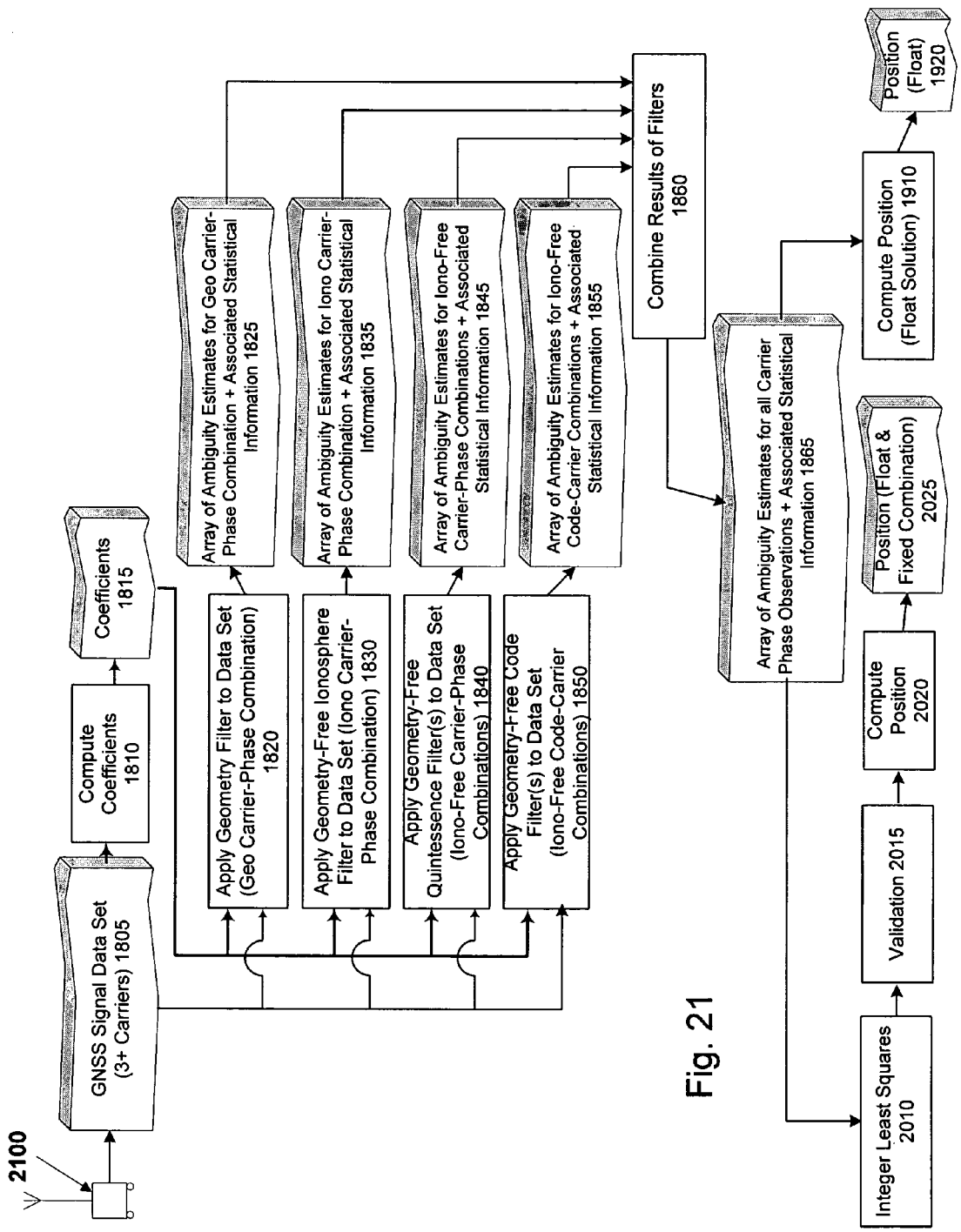
FIG. 21 shows a further application of the method of FIG. 18 to obtain computed positions for a 3+ carrier-frequency GNSS receiver.

FIG. 21 shows a further application of the method of FIG. 18 to obtain both a float-solution computed position 1920 and a float-and-fixed-combination computed position 2020 for a 3+ carrier-frequency GNSS receiver 2100. GNSS signal data set 1805 is collected by receiver 2100 from observables of 3+ carrier-frequency GNSS signals. Array 1865 is supplied to a process 1910 which computes a float-solution position of receiver 1900 corresponding to the time of acquisition of data set 1805 and provides the computed position 1920 as an output. Though unverified and potentially less precise than a validated integer-least-squares solution, the float-solution position is computed more quickly and can be supplemented with a validated integer-least-squares solution when available. Array 1865 is also supplied to a process 2010 which determines integer ambiguities by computing an integer-least-squares solution. A validation process 2015 checks validity of the solution. A process 2020 computes position from the validated solution. The computed position 2025 supplied as an output is a validated, combination float and fixed solution.

Decentralized estimation of carrier-phase ambiguities in accordance with embodiments of the invention employs the following filters:

A geometry filter, such as filter 830, which processes a minimum-error carrier-phase combination to estimate a single (combined) ambiguity term for each satellite, plus position states for the receiver;

A bank of ionosphere filters, such as bank 835, which estimate the ionospheric bias on the satellite signals using a minimum-error ionospheric carrier-phase combination;

At least one bank of Quintessence filters which process a geometry-free and ionosphere-free carrier-phase combination to estimate carrier-phase ambiguities directly; and One or more banks of code filters, up to one bank for each code band, which process phase combinations formed such that their ionospheric bias is equal to or near to that of the code.

When multiple reference stations are processed at once, the most computationally-efficient approach is to implement a separate block of filters for each reference station. That is, geometry filter 830, ionosphere filter bank 835, one or more Quintessence filter banks 840(1) . . . 840(nf−2), and one or more code filter banks 845(1), 845(2) . . . 845(nf) may be duplicated for each of a multiplicity of reference stations if desired for computational efficiency.

The output from the bank of filters is combined, in a minimum error sense, whenever estimates of the carrier phase ambiguities are required. Normally this would be done every measurement update epoch (say once per second), but if the processing platform has limited throughput, a slower update range can be used to propagate the filters and perform the combination.

When multiple reference stations are involved, each reference station data stream can be multiplexed into the estimator to help reduce the computational load.

A Priori Error Models

A method will now be described which a priori knowledge of the error characteristics of the measurements used. The variance of the uncorrelated error component (noise) is employed together with the correlated error variance and its correlation time constant. See U. VOLLATH et al., *Network RTK Versus Single Base RTK—Understanding the Error Characteristics*, PROCEEDINGS OF THE GNSS-2002 CONFERENCE, May 2002, pp. 2774-2780.

This is implemented by the analysis of representative data sets. The errors are typically dependent on the elevation of the individual satellites and/or the carrier-to-noise ratio computed by the receiver tracking loops. Many methods are available in the literature.

One method is the elevation mapping function approach deriving the variance $\sigma_\alpha^2$ at elevation $\alpha$ from the variance $\sigma_{90°}^2$ at elevation 90°.

$$\sigma_\alpha^2 = \frac{\sigma_{90°}^2}{\sin^2 \alpha} \quad (0.1)$$

For the time correlated errors, an exponential temporal correlation with correlation time tc is assumed:

$$\frac{E[x(t) \cdot x(t + \Delta t)]}{E[x(t)^2] - E[x(t)]^2} = e^{-\frac{\Delta t}{tc}} \quad (0.2)$$

In the following, $\sigma u_k^2$ will denote the variance of an uncorrelated (white noise) error at epoch k. $\sigma c_k^2$ is the variance of a time correlated error at epoch k with the associated time constant $tc_k$.

Double Differences Versus Single Differences

A question of ongoing debate is the use of double differences or single differences in GNSS data processing. The equivalence of both approaches has been proven under the realistic assumption that no precise model of the receiver clocks is available. See E. GRAFAREND et al., *Generating Classes of Equivalent Linear Models by Nuisance Parameter Elimination-Applications to GPS Observations*, MANUSCRIPTA GEODETICA 11 (1986), pp. 262-271. The main reason for selecting one approach or the other is the arrangement of the algorithms (software design).

The method presented here uses single differences for the geometry-free filters, and can use single or double differences for the geometry filters. The ambiguity resolution step requires double differences for operation.

Reference Satellite

Though the ambiguity resolution process itself is not dependent on the reference satellite choice, a reference satellite must be selected to be able to fix ambiguities in the double differences. Any satellite represented in the data set can be used. Two methods of reference-satellite selection are common in the literature:
1. The highest elevation satellite is used;
2. The satellite with the lowest expected error in the measurements is selected; for example, the satellite with the highest signal-to-noise ratio.

For data analysis, these reference satellite choices can provide more insights into the data errors.

Data Preparation

Data preparation is an optional process which pre-computes everything not dependent on the rover position. Operation is possible without the data preparation step at the price of increased processing burden in the following processes and more data to be transferred.

To create the preprocessed carrier data for a satellite s, the frequency f and the reference station position $\vec{x}_{ref}$, the following formula is used:

$$\phi_f^s = \phi_f^{s,(rov)} - \phi_f^{s,(ref)} - \frac{1}{\lambda_f} \cdot \left(R_{\vec{x}_{ref}}^s + T_{\vec{x}_{ref}}^s - T_{\vec{x}_{user}}^s\right) \quad (0.3)$$

If a priori information about the ionosphere is also available from a model, pre-processing can take that into account:

$$\phi_f^s = \phi_f^{s,(rov)} - \phi_f^{s,(ref)} - \frac{1}{\lambda_f} \cdot \left(R_{\vec{x}_{ref}}^s + T_{\vec{x}_{ref}}^s - T_{\vec{x}_{user}}^s\right) - \frac{\lambda_f}{\lambda_1^2} \cdot \left(I_{\vec{x}_{ref}}^s - I_{\vec{x}_{user}}^s\right) \quad (0.4)$$

Here, $R_{\vec{x}_{ref}}^s$ is the geometric range between the satellite and the reference receiver position $\vec{x}_{ref}$ and $T_{\vec{x}_{ref}}^s$ is the tropospheric delay between the satellite and the reference receiver position $\vec{x}_{ref}$ derived from some tropospheric model. $T_{\vec{x}_{user}}^s$ is the tropospheric delay between the satellite and a good estimate (e.g., differential GNSS position) of the user position $\vec{x}_{user}$ derived from the same tropospheric model.

Similarly, the preprocessed pseudorange measurement is:

$$\rho_f^s = \rho_f^{s,(rov)} - \rho_f^{s,(ref)} - (R_{\vec{x}_{ref}}^s + T_{\vec{x}_{ref}}^s - T_{\vec{x}_{user}}^s) \quad (0.5)$$

or, using an ionosphere model, $$\rho_f^s = \rho_f^{s,(rov)} - \rho_f^{s,(ref)} - \left(R_{\vec{x}_{ref}}^s + T_{\vec{x}_{ref}}^s - T_{\vec{x}_{user}}^s\right) + \frac{\lambda_f^2}{\lambda_1^2} \cdot \left(I_{\vec{x}_{ref}}^s - I_{\vec{x}_{user}}^s\right) \quad (0.6)$$

In the following, all formulas refer to the preprocessed measurements.

If no data preparation is performed, the following method descriptions have an implicit differencing between measurements taken at the reference receiver and the user receiver using the above formula.

Geometry Filter

The geometry filter, such as geometry filter 830, is a classical float solution using the minimum-error carrier-phase combination $\vec{a}_{geo}$ (see discussion below entitled minimum-error geometric carrier-phase combination). The float solution can include a state for tropospheric residual error modeling. This is a well-known standard technique for high precision satellite navigation system positioning using ambiguity resolution.

The float solution can be formulated in single or double differences. In the former case, the double difference operator (see discussion below entitled double-difference operator) is applied before passing the results on to the combination operation (see discussion below entitled Combination).

In embodiments of the invention, modeling of the correlated errors in the minimum-error carrier-phase combination is done by the state augmentation technique or, in the absence of significant noise, by the whitening-of-noise technique.

Geometry-Free Filters

Geometry-free filters used for the ionosphere, Quintessence and code filter banks, such as filter banks 835, 840(1) ... 840(nf−2) and 845(1), 845(2) ... 845(nf), will now be described. They implement estimating the ambiguity of a given geometry-free observable combination $\vec{a}$ accounting for uncorrelated noise and correlated noise with a given correlation time.

Kalman Filter Formulation

A geometry-free filter in accordance with embodiments of the invention is implemented as a Kalman filter with two states. The first state ($N_f$) is the ambiguity state to be estimated. The second state ($vc_k$ where k is the current epoch) models the time-correlated error component (state augmentation) with an exponential time-correlation (Gauss-Markov (1) process).

The defining formulas for the Kalman filter (according to A. GELB (ed.), *Applied Optimal Estimation*, The M.I.T. Press, 1992. pp. 107-113) are:

State vector:

$$x_k = \begin{pmatrix} N_f \\ vc_k \end{pmatrix} \quad (0.7)$$

State Transition Matrix:

$$\Phi_k = \begin{pmatrix} 1 & 0 \\ 0 & \frac{\sigma_k}{\sigma_{k-1}} \cdot \left(1 - e^{-\frac{t_k - t_{k-1}}{tc_k}}\right)^2 \end{pmatrix} \quad (0.8)$$

in which the upper left term 1 indicates the ambiguity is constant from epoch to epoch, k is the epoch number of the current epoch, k−1 is the epoch number of the previous epoch, $tc_k$ is the time constant of correlated noise at epoch k, and the exponential term is the assumed exponential temporal correlation (equation 0.2 above).

System Driving Noise Matrix:

$$Q_k = \begin{pmatrix} 0 & 0 \\ 0 & \sigma c_k^2 \end{pmatrix} \quad (0.9)$$

in which the upper left term 0 indicates that the ambiguity state (state 1) is constant statistically, and the lower right term $\sigma c_k^2$ is the variance of correlated noise (variance of state 2) at epoch k.

Design Matrix:

$$H_K = (1\ 1) \quad (0.10)$$

in which the values 1 and 1 indicate the measurement contains the sum of the ambiguity state (state 1) and the correlated noise (state 2).

Measurement Noise Matrix:

$$R_k = (\sigma u_k^2) \quad (0.11)$$

is the variance of uncorrelated noise (white noise) at epoch k.

Observation $$z_k = \Phi_f \quad (0.12)$$

is the carrier-phase measurement of epoch k for frequency f to be filtered.

Filter Initialization:

$$\hat{x}_1^+ = \begin{pmatrix} \phi_1 \\ 0 \end{pmatrix} \quad (0.13)$$

$$P_1^+ = \begin{pmatrix} \sigma u_1^2 + \sigma c_1^2 & -\sigma c_1^2 \\ -\sigma c_1^2 & \sigma c_1^2 \end{pmatrix}$$

in which the subscript 1 indicates starting with epoch number 1.

Standard Kalman filter algorithm (for 1<k≦ne):

$$\hat{x}_k^- = \Phi_{k-1} \cdot \hat{x}_{k-1}^+$$

$$P_k^- = \Phi_{k-1} \cdot P_{k-1}^+ \cdot \Phi_{k-1}^T + Q_{k-1}$$

$$K_k = P_k^- \cdot H_k^T (H_k \cdot P_k^- \cdot H_k^T + R_k)^{-1}$$

$$\hat{x}_k^+ = \hat{x}_k^- + K_k \cdot (z_k - H_k \cdot \hat{x}_k^-)$$

$$P_k^+ = (I - K_k \cdot H_k) \cdot P_k^- \quad (0.14)$$

The first two lines of 0.14 serve to time-update the state vector and the error propagation for each new epoch. The last three lines of 0.14 serve to update the measurements for each new epoch.

The first line of 0.14 produces a state vector for the current epoch k by updating the state vector for the previous epoch with the state transition matrix $\Phi_{k-1}$ of the previous epoch k−1 (which in turn takes account of the time constant of the time-correlated noise).

The second line of 0.14 produces an error propagation $P_k^-$ matrix (variance-covariance matrix of the state) for the current epoch k by updating the error progagation for the previous epoch k−1 with the state transition matrix $\Phi_{k-1}$ of the previous epoch k−1 (which in turn takes account of the time constant of the time-correlated noise) and the system driving noise matrix $Q_{k-1}$ for the previous epoch k−1 (which in turn takes account of the variance of the time-correlated noise).

The third line of 0.14 indicates how the Kalman gain $K_k$ for the current epoch k is related to the error propagation matrix $P_k^-$ (which is in turn a function of the time-correlated noise and its time constant as discussed above) and to the measurement noise matrix $R_k$ describing the variance of the uncorrelated noise. The Kalman gain $K_k$ may be regarded as a "blending factor" between time updates of old information and new measurement observations.

The fourth line of 0.14 indicates how the updated state estimate for the current epoch k is related to the time-updated state vector for the current epoch, the Kalman gain $K_k$ for the current epoch, and the carrier-phase measurement observed for the current epoch k.

The fifth line of 0.14 is an error propagation matrix $P_k^+$ (variance-covariance matrix of the state) for the current epoch k.

The Kalman filter may be implemented using the Bierman UD-Filter (see G. BIERMAN, *Factorization Methods for Discrete Sequential Estimation*, Academic Press, 1977) or any other numerically-stabilized implementation of the Kalman filter algorithm.

Alternate Formulation

In case of uncorrelated errors that are very small compared to the correlated errors, a simpler filter can be applied in accordance with embodiments of the invention. See the "whitening of noise" approach in G. BIERMAN, *Factorization Methods for Discrete Sequential Estimation*, Academic Press, 1977, and the "differencing approach" in A. GELB, (ed.), *Applied Optimal Estimation*, The M.I.T. Press, 1977, pp. 133-136. This applies to the ionosphere and Quintessence filter banks.

Filter Initialization:

$a_1 = 0$ $q_1 = 0$ $\hat{x}_1^+ = (\phi_1)$ $P_1^+ = (\sigma c_1^2)$ (0.15)

Filter Algorithm ($1 < k \leq ne$):

$$cor_k = e^{-\frac{t_k - t_{k-1}}{tc_k}}$$

$$c_k = cor_k \cdot \frac{\sigma c_k}{\sigma c_{k-1}}$$

$$l_k = \phi_k - \phi_{k-1} \cdot c_k$$

$$v_k = (1 - cor_k^2) \cdot \sigma c_k^2$$

$$a_k = a_{k-1} + l_k \cdot \frac{(1-c_k)}{v_k}$$

$$q_k = q_{k-1} + \frac{(1-c_k)^2}{v_k}$$

$$\hat{x}_k^+ = \frac{a_k}{q_k}$$

$$P_k^+ = \frac{1}{q_k}$$

(0.16)

Where $c_k$ is a modified correlation coefficient, $l_k$ is a modified variance (uncertainty), $v_k$ is the uncertainty in the measurement, $a_k$ is accumulated weighted information, $q_k$ is an indicator of certainty with each new epoch (accumulated weights, the inverse of variance), the term $a_k/q_k$ is the ambiguity, and the inverse of $q_k$ is the variance of ambiguity.

Banks of Filters

Geometry-free filters are implemented as banks of ns filters, one filter per satellite tracked.

The result of a geometry-free filter is determined by differencing to a specified reference satellite, usually highest elevation or lowest error. See discussion of reference satellite above. The choice of reference satellite does not influence the results. The results are given as double differences to the chosen reference satellite. See discussion of double difference operator below.

Ionosphere Filter

The ionosphere filters, such as in ionosphere filter bank 835, are geometry-free filters using the minimum error ionospheric carrier-phase combination $\vec{a}_{iono}$. See discussion of minimum-error ionospheric carrier-phase combination below.

Quintessence Filters

For nf frequencies, nf–2 geometry-free Quintessence filters, such as in Quintessence filter banks 840(1) . . . 840(nf–2), are implemented using the Quintessence carrier phase combinations $\vec{a}_{Q_k}$. See discussion of Quintessence carrier-phase combinations below.

Code Filters

For nf frequencies, nf geometry-free code filters, such as in code filter banks 845(1), 845(2) . . . 845(nf), are implemented using the code-carrier combinations $\vec{a}_{\Pi_k}$. See discussion of code/carrier combinations below.

Double Difference Operator

Results of the geometry-free filters are given as single differences between measurements taken at the user (e.g., a rover) and measurements taken at a reference receiver. To convert the single differences into double differences, a double difference operator is applied before the filter results are combined, e.g., before the results are supplied to combiner 850. A double-difference operator $M_{dif}$ is for example:

$$M_{dif} = \begin{pmatrix} -1 & 1 & 0 & 0 & \cdots & 0 & 0 \\ -1 & 0 & 1 & 0 & \cdots & 0 & 0 \\ \vdots & \vdots & \vdots & 0 & \ddots & \vdots & \vdots \\ -1 & 0 & 0 & 0 & \cdots & 0 & 1 \end{pmatrix}$$ (0.17)

in which the number of columns is the number of satellites and the number of rows is one less than the number of satellites. In this example it is assumed that the first satellite is the reference satellite and that measurements for the other satellites are subtracted from the measurements for the reference satellite.

The floating-value double-difference ambiguity state estimate is the product of the double-difference operator $M_{dif}$ and the single-differences:

$$\vec{x}_{dif} = M_{dif} \cdot \vec{x}_{sd}$$ (0.18)

The double-difference variance-covariance matrix of the result $Q_{dif}$ is the product of the single-difference variance-covariance matrix $Q_{sd}$ and the double-difference operator and the transposition of the double-difference operator:

$$Q_{dif} = M_{dif} \cdot Q_{sd} \cdot M_{dif}^T$$ (0.19)

Statistical values, used to validate results as discussed below, are identical for the double differences and the single differences:

$$\chi_{dif}^2 = \chi_{sd}^2$$ (0.20)

Another statistical value, degrees of freedom for the geometry filter, can also be used in validation, e.g., to compute probability that the best solution found is the correct solution:

$$df_{dif} = df_{sd} + 1$$ (0.21)

Similarly, degrees of freedom for geometry-free filters is given as $$df_{dif} = df_{sd} + 1 - ne$$ (0.22)

in which ne is the number of epochs.

Coefficient Determination

The following sections describe how to derive the different code and carrier combination coefficients $\vec{a}_f$ for the individual filters.

Properties of the Combinations

The measurement combinations presented in the following have the properties:

- Minimum-error geometric, minimum-error ionospheric and Quintessence combinations are pair-wise uncorrelated;
- Correlation of the code combinations to the minimum-error geometric, minimum-error ionospheric and Quintessence combinations can be neglected as the code multipath is two to three orders of magnitude higher than the carrier-phase multipath.

Error Models for the Combinations

For every combination $\vec{a}_f$ presented, the error characteristics of uncorrelated noise $\sigma u_{\vec{a}_f}^2$, of correlated noise $\sigma c_{\vec{a}_f}^2$ and time constant $tc_{\vec{a}_f}$ can be computed using the following formulas:

$$\sigma_{\phi_{\vec{a}_f}}^2 = \vec{a}_f^T \cdot \begin{pmatrix} \sigma\phi_1^2 & \cdots & 0 \\ \vdots & \ddots & \vdots \\ 0 & \cdots & \sigma\phi_{nf}^2 \end{pmatrix} \cdot \vec{a}_f \quad (0.23)$$

wherein the diagonal matrix carries individual variances per frequency, and $$tc_f = \frac{\begin{pmatrix} |a_{\phi_{a_{f,1}}}| \\ \vdots \\ |a_{\phi_{a_{f,nf}}}| \end{pmatrix}^T \cdot \begin{pmatrix} tc_{\phi_1} \\ \vdots \\ tc_{\phi_{nf}} \end{pmatrix}}{\sqrt{\begin{pmatrix} a_{\phi_{a_{f,1}}} \\ \vdots \\ a_{\phi_{a_{f,nf}}} \end{pmatrix}^T \cdot \begin{pmatrix} a_{\phi_{a_{f,1}}} \\ \vdots \\ a_{\phi_{a_{f,nf}}} \end{pmatrix}}} \quad (0.24)$$

For the code-carrier combinations, the error characteristics are practically identical to the error characteristics of the code measurement used.

Minimum-Error Geometric Carrier Phase Combination

See the general discussion of the geometry filter above. The minimum-error carrier-phase combination is used in the geometric float-solution filter. The carrier-phase combination used there is defined as:

$$\varphi_{geo} = \vec{a}_{geo} \cdot \begin{pmatrix} \phi_1 \\ \vdots \\ \phi_{nf} \end{pmatrix} = \begin{pmatrix} a_{geo,1} \\ \vdots \\ a_{geo,nf} \end{pmatrix}^T \cdot \begin{pmatrix} \phi_1 \\ \vdots \\ \phi_{nf} \end{pmatrix} \quad (0.25)$$

wherein $\psi_{geo}$ is the linear combination of carrier phases, $a_{geo,1} \ldots a_{geo,f}$ are coefficients (defined below), and $\phi_1 \ldots \phi_{nf}$ are the original measurements at respective carrier frequencies 1 through n.

With the following notations:

$$\vec{B}_{geo} = -\lambda_1 \cdot \begin{pmatrix} 1 \\ \frac{1}{\lambda_2} \\ \vdots \\ \frac{1}{\lambda_{nf}} \end{pmatrix} \quad (0.26)$$

where $\lambda_1, \lambda_2 \ldots \lambda_{nf}$ are the wavelengths of the respective carrier frequencies 1 through n, $$Q_{geo} = \begin{pmatrix} \sigma\phi_2^2 & \cdots & 0 \\ \vdots & \ddots & \vdots \\ 0 & \cdots & \sigma\phi_{nf}^2 \end{pmatrix} \quad (0.27)$$

where $\sigma\phi_2$ through $\sigma\phi_{nf}$ are the standard deviations of the measurements for carrier frequencies 2 through n, in cycles, and $$\vec{R}_{geo} = \frac{1}{\lambda_1} \vec{B}_{geo} + \begin{pmatrix} \frac{\lambda_2}{\lambda_1^2} \\ \vdots \\ \frac{\lambda_{nf}}{\lambda_1^2} \end{pmatrix} \quad (0.28)$$

The coefficients are defined by:

$$\begin{pmatrix} a_{geo,2} \\ \vdots \\ a_{geo,nf} \end{pmatrix} = -\left(\sigma\phi_1^2 \cdot \vec{B}_{geo} \cdot \vec{B}_{geo}^T + Q_{geo} + \sigma_{io}^2 \cdot \vec{R}_{geo} \cdot \vec{R}_{geo}^T\right)^{-1} \cdot \left(\sigma\phi_1^2 \cdot \lambda_1 \cdot \vec{B}_{geo} + \sigma_{io}^2 \cdot \vec{R}_{geo}\right) \quad (0.29)$$

for carrier frequencies 2 through n, and by:

$$a_{geo,1} = \lambda_1 + \vec{B}_{geo}^T \cdot \begin{pmatrix} a_{geo,2} \\ \vdots \\ a_{geo,nf} \end{pmatrix} \quad (0.30)$$

for carrier frequency 1.

Minimum-Error Ionospheric Carrier-Phase Combination

The minimum-error ionospheric carrier-phase combination is used in the ionosphere filters.

The combination is defined as:

$$\varphi_{iono} = \vec{a}_{iono} \cdot \begin{pmatrix} \phi_1 \\ \vdots \\ \phi_{nf} \end{pmatrix} = \begin{pmatrix} a_{iono,1} \\ \vdots \\ a_{iono,nf} \end{pmatrix}^T \cdot \begin{pmatrix} \phi_1 \\ \vdots \\ \phi_{nf} \end{pmatrix} \quad (0.31)$$

wherein $\psi_{iono}$ is the linear combination of carrier phases, $a_{iono,1} \ldots a_{iono,f}$ are coefficients (defined below), and $\phi_1 \ldots \phi_{nf}$ are the original measurements at respective carrier frequencies 1 through n.

With the following notations:

$$\vec{A}_{iono} = \begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} 0 \\ 1 \end{pmatrix} \quad (0.32)$$

$$B_{iono} = -\begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} \frac{1}{\lambda_3} & \cdots & \frac{1}{\lambda_{nf}} \\ -\frac{\lambda_3}{\lambda_1^2} & \cdots & -\frac{\lambda_{nf}}{\lambda_1^2} \end{pmatrix} \quad (0.33)$$

$$Q1_{iono} = \begin{pmatrix} \sigma\phi_1^2 & 0 \\ 0 & \sigma\phi_2^2 \end{pmatrix} \quad (0.34)$$

$$Q2_{iono} = \begin{pmatrix} \sigma\phi_3^2 & \cdots & 0 \\ \vdots & \ddots & \vdots \\ 0 & \cdots & \sigma\phi_{nf}^2 \end{pmatrix} \quad (0.35)$$

in which the coefficients are defined by:

$$\begin{pmatrix} a_{iono,3} \\ \vdots \\ a_{iono,nf} \end{pmatrix} = -(B_{iono}^T \cdot Q1_{iono} \cdot B_{iono} + Q2_{iono})^{-1} \cdot \quad (0.36)$$

$$B_{iono}^T \cdot Q1_{iono} \cdot \vec{A}_{iono}$$

$$\begin{pmatrix} a_{iono,1} \\ a_{iono,2} \end{pmatrix} = \vec{A}_{iono} + B_{iono} \cdot \begin{pmatrix} a_{iono,3} \\ \vdots \\ a_{iono,nf} \end{pmatrix} \quad (0.37)$$

Quintessence Carrier-Phase Combinations

The Quintessence carrier-phase combinations are used in the Quintessence filters. For nf carrier frequencies, k=1, ..., nf−2 Quintessence carrier phase combinations are defined by:

$$\varphi_{Q_k} = \vec{a}_{Q_k}^T \cdot \begin{pmatrix} \phi_1 \\ \vdots \\ \phi_{nf} \end{pmatrix} = \begin{pmatrix} a_{Q_k,1} \\ \vdots \\ a_{Q_k,nf} \end{pmatrix}^T \cdot \begin{pmatrix} \phi_1 \\ \vdots \\ \phi_{nf} \end{pmatrix} \quad (0.38)$$

With the following notations:

$$\vec{A}_{Q_k} = \begin{pmatrix} \frac{1}{\lambda_1} & \cdots & \frac{1}{\lambda_{2+k}} \\ -\frac{\lambda_1}{\lambda_1^2} & \cdots & -\frac{\lambda_{2+k}}{\lambda_1^2} \\ 1 & \cdots & 1 \\ a_{Q_1,1} \cdot \sigma\phi_1^2 & \cdots & a_{Q_1,2+k} \cdot \sigma\phi_{2+k}^2 \\ \vdots & \ddots & \vdots \\ a_{Q_{k-1},1} \cdot \sigma\phi_1^2 & \cdots & a_{Q_{k-1},2+k} \cdot \sigma\phi_{2+k}^2 \end{pmatrix}^{-1} \cdot \begin{pmatrix} 0 \\ 0 \\ 1 \\ 0 \\ \vdots \\ 0 \end{pmatrix} \quad (0.39)$$

in which the coefficients are defined by:

$$\begin{pmatrix} a_{Q_k,1} \\ \vdots \\ a_{Q_k,2+k} \end{pmatrix} = \vec{A}_{Q_k} \quad (0.40)$$

$$\begin{pmatrix} a_{Q_k,3+k} \\ \vdots \\ a_{Q_k,nf} \end{pmatrix} = \begin{pmatrix} 0 \\ \vdots \\ 0 \end{pmatrix} \quad (0.41)$$

Code-Carrier Combinations

Code-carrier combinations are used in the code filters. For every frequency k one combination is defined by:

$$\Pi_k = \vec{a}_{\Pi_k} \cdot \begin{pmatrix} \phi_1 \\ \vdots \\ \phi_{nf} \end{pmatrix} - \rho_k = \begin{pmatrix} a_{\Pi_k,1} \\ \vdots \\ a_{\Pi_k,nf} \end{pmatrix}^T \cdot \begin{pmatrix} \phi_1 \\ \vdots \\ \phi_{nf} \end{pmatrix} - \rho_k \quad (0.42)$$

With the following notations:

$$\vec{A}_{\Pi_k} = \begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} 1 \\ \frac{\lambda_k^2}{\lambda_1^2} \end{pmatrix} \quad (0.43)$$

$$B_{\Pi_k} = -\begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} \frac{1}{\lambda_3} & \cdots & \frac{1}{\lambda_{nf}} \\ -\frac{\lambda_3}{\lambda_1^2} & \cdots & -\frac{\lambda_{nf}}{\lambda_1^2} \end{pmatrix} \quad (0.44)$$

$$Q1_{\Pi_k} = \begin{pmatrix} \sigma\phi_1^2 & 0 \\ 0 & \sigma\phi_2^2 \end{pmatrix} \quad (0.45)$$

$$Q2_{\Pi_k} = \begin{pmatrix} \sigma\phi_3^2 & \cdots & 0 \\ \vdots & \ddots & \vdots \\ 0 & \cdots & \sigma\phi_n^2 \end{pmatrix} \quad (0.46)$$

in which the coefficients are defined by:

$$\begin{pmatrix} a_{\Pi_k,3} \\ \vdots \\ a_{\Pi_k,n} \end{pmatrix} = -(B_{\Pi_k}^T \cdot Q1_{\Pi_k} \cdot B_{\Pi_k} + Q2_{\Pi_k})^{-1} \cdot B_{\Pi_k}^T \cdot Q1_{\Pi_k} \cdot \vec{A}_{\Pi_k} \quad (0.47)$$

$$\begin{pmatrix} a_{\Pi_k,1} \\ a_{\Pi_k,2} \end{pmatrix} = \vec{A}_{\Pi_k} + B_{\Pi_k} \cdot \begin{pmatrix} a_{\Pi_k,3} \\ \vdots \\ a_{\Pi_k,n} \end{pmatrix} \quad (0.48)$$

The discussion above is directed to the general case in which measurements are made for n carrier frequencies. Examples are provided below for the simpler cases of 3 carrier frequencies and 4 carrier frequencies.

Coefficient Example: 3 Frequencies

The following example specifies the coefficients for the three-carrier case.

Minimum-Error Geometric Carrier-Phase Combination

The minimum-error carrier-phase combination is used in the geometric float solution filter. The carrier phase combination used there is defined as:

$$\varphi_{geo} = \vec{a}_{geo}^T \cdot \begin{pmatrix} \phi_1 \\ \phi_2 \\ \phi_3 \end{pmatrix} = \begin{pmatrix} a_{geo,1} \\ a_{geo,2} \\ a_{geo,3} \end{pmatrix}^T \cdot \begin{pmatrix} \phi_1 \\ \phi_2 \\ \phi_3 \end{pmatrix} \quad (0.49)$$

With the following notations:

$$\vec{B}_{geo} = -\lambda_1 \cdot \begin{pmatrix} \frac{1}{\lambda_2} \\ \frac{1}{\lambda_3} \end{pmatrix} \quad (0.50)$$

$$Q_{geo} = \begin{pmatrix} \sigma\phi_2^2 & 0 \\ 0 & \sigma\phi_3^2 \end{pmatrix} \quad (0.51)$$

$$\vec{R}_{geo} = \frac{1}{\lambda_1} \cdot \vec{B}_{geo} + \begin{pmatrix} \frac{\lambda_2}{\lambda_1^2} \\ \frac{\lambda_3}{\lambda_1^2} \end{pmatrix} \quad (0.52)$$

in which the coefficients are defined by:

$$\begin{pmatrix} a_{geo,2} \\ a_{geo,3} \end{pmatrix} = -\left(\sigma\phi_1^2 \cdot \vec{B}_{geo} \cdot \vec{B}_{geo}^T + Q_{geo} + \sigma_{io}^2 \cdot \vec{R}_{geo} \cdot \vec{R}_{geo}^T\right)^{-1} \cdot \quad (0.53)$$

$$\left(\sigma\phi_1^2 \cdot \lambda_1 \cdot \vec{B}_{geo} + \sigma_{io}^2 \cdot \vec{R}_{geo}\right)$$

$$a_{geo,1} = \lambda_1 + \vec{B}_{geo}^T \cdot \begin{pmatrix} a_{geo,2} \\ a_{geo,3} \end{pmatrix} \quad (0.54)$$

Minimum-Error Ionospheric Carrier-Phase Combination

The minimum-error ionospheric carrier-phase combination is used in the ionosphere filters. The combination is defined as:

$$\varphi_{iono} = \vec{a}_{iono}^T \cdot \begin{pmatrix} \phi_1 \\ \phi_2 \\ \phi_3 \end{pmatrix} = \begin{pmatrix} a_{iono,1} \\ a_{iono,2} \\ a_{iono,3} \end{pmatrix}^T \cdot \begin{pmatrix} \phi_1 \\ \phi_2 \\ \phi_3 \end{pmatrix} \quad (0.55)$$

With the following notations:

$$\vec{A}_{iono} = \begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} 0 \\ 1 \end{pmatrix} \quad (0.56)$$

$$B_{iono} = -\begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} \frac{1}{\lambda_3} \\ -\frac{\lambda_3}{\lambda_1^2} \end{pmatrix} \quad (0.57)$$

$$Q1_{iono} = \begin{pmatrix} \sigma\phi_1^2 & 0 \\ 0 & \sigma\phi_2^2 \end{pmatrix} \quad (0.58)$$

$$Q2_{iono} = \sigma\phi_3^2 \quad (0.59)$$

in which the coefficients are defined by:

$$a_{iono,3} = -(B_{iono}^T \cdot Q1_{iono} \cdot B_{iono} + Q2_{iono})^{-1} \cdot \quad (0.60)$$

$$B_{iono}^T \cdot Q1_{iono} \cdot \vec{A}_{iono}$$

$$\begin{pmatrix} a_{iono,1} \\ a_{iono,2} \end{pmatrix} = \vec{A}_{iono} + B_{iono} \cdot a_{iono,3} \quad (0.61)$$

Quintessence Carrier-Phase Combination $$\varphi_{Q_1} = \vec{a}_{Q_1}^T \cdot \begin{pmatrix} \phi_1 \\ \phi_2 \\ \phi_3 \end{pmatrix} = \begin{pmatrix} a_{Q_1,1} \\ a_{Q_1,2} \\ a_{Q_1,3} \end{pmatrix}^T \cdot \begin{pmatrix} \phi_1 \\ \phi_2 \\ \phi_3 \end{pmatrix} \quad (0.62)$$

the coefficients are defined by:

$$\begin{pmatrix} a_{Q_1,1} \\ a_{Q_1,2} \\ a_{Q_1,3} \end{pmatrix} = \begin{pmatrix} \frac{1}{\lambda_1} & \frac{1}{\lambda_2} & \frac{1}{\lambda_3} \\ -\frac{\lambda_1}{\lambda_1^2} & -\frac{\lambda_2}{\lambda_1^2} & -\frac{\lambda_3}{\lambda_1^2} \\ 1 & 1 & 1 \end{pmatrix}^{-1} \cdot \begin{pmatrix} 0 \\ 0 \\ 1 \end{pmatrix} \quad (0.63)$$

Code-Carrier Combinations

Code-carrier combinations are used in the code filters. For each frequency k=1, ..., o3 ne combination is defined by:

$$\Pi_k = \vec{a}_{\Pi_k}^T \cdot \begin{pmatrix} \phi_1 \\ \phi_2 \\ \phi_3 \end{pmatrix} - \rho_k = \begin{pmatrix} a_{\Pi_k,1} \\ a_{\Pi_k,2} \\ a_{\Pi_k,3} \end{pmatrix}^T \cdot \begin{pmatrix} \phi_1 \\ \phi_2 \\ \phi_3 \end{pmatrix} - \rho_k \quad (0.64)$$

With the following notations:

$$\vec{A}_{\Pi_k} = \begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} 1 \\ \frac{\lambda_k^2}{\lambda_1^2} \end{pmatrix} \quad (0.65)$$

$$B_{\Pi_k} = -\begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} \frac{1}{\lambda_3} \\ -\frac{\lambda_3}{\lambda_1^2} \end{pmatrix} \quad (0.66)$$

$$Q1_{\Pi_k} = \begin{pmatrix} \sigma\phi_1^2 & 0 \\ 0 & \sigma\phi_2^2 \end{pmatrix} \quad (0.67)$$

$$Q2_{\Pi_k} = \sigma\phi_3^2 \quad (0.68)$$

in which the coefficients are defined by:

$$a_{\Pi_k,3} = -(B_{\Pi_k}^T \cdot Q1_{\Pi_k} \cdot B_{\Pi_k} + Q2_{\Pi_k})^{-1} \cdot B_{\Pi_k}^T \cdot Q1_{\Pi_k} \cdot \vec{A}_{\Pi_k} \quad (0.69)$$

$$\begin{pmatrix} a_{\Pi_k,1} \\ a_{\Pi_k,2} \end{pmatrix} = \vec{A}_{\Pi_k} + B_{\Pi_k} \cdot a_{\Pi_k,3} \qquad (0.70)$$

Coefficient Example: 4 Frequencies

The following example specifies the coefficients for the four-carrier case.

Minimum-Error Geometric Carrier-Phase Combination

The minimum-error carrier-phase combination is used in the geometric float-solution filter. The carrier-phase combination used there is defined as:

$$\varphi_{geo} = \vec{a}_{geo}^T \cdot \begin{pmatrix} \phi_1 \\ \phi_2 \\ \phi_3 \\ \phi_4 \end{pmatrix} = \begin{pmatrix} a_{geo,1} \\ a_{geo,2} \\ a_{geo,3} \\ a_{geo,4} \end{pmatrix}^T \cdot \begin{pmatrix} \phi_1 \\ \phi_2 \\ \phi_3 \\ \phi_4 \end{pmatrix} \qquad (0.71)$$

With the following notations:

$$\vec{B}_{geo} = -\lambda_1 \cdot \begin{pmatrix} \frac{1}{\lambda_2} \\ \frac{1}{\lambda_3} \\ \frac{1}{\lambda_4} \end{pmatrix} \qquad (0.72)$$

$$Q_{geo} = \begin{pmatrix} \sigma\phi_2^2 & 0 & 0 \\ 0 & \sigma\phi_3^2 & 0 \\ 0 & 0 & \sigma\phi_4^2 \end{pmatrix} \qquad (0.73)$$

$$\vec{R}_{geo} = \frac{1}{\lambda_1} \cdot \vec{B}_{geo} + \begin{pmatrix} \frac{\lambda_2}{\lambda_1^2} \\ \frac{\lambda_3}{\lambda_1^2} \\ \frac{\lambda_4}{\lambda_1^2} \end{pmatrix} \qquad (0.74)$$

in which the coefficients are defined by:

$$\begin{pmatrix} a_{geo,2} \\ a_{geo,3} \\ a_{geo,4} \end{pmatrix} = -(\sigma\phi_1^2 \cdot \vec{B}_{geo} \cdot \vec{B}_{geo}^T + Q_{geo} + \sigma_{io}^2 \cdot \vec{R}_{geo} \cdot \vec{R}_{geo}^T)^{-1} \cdot \qquad (0.75)$$
$$(\sigma\phi_1^2 \cdot \lambda_1 \cdot \vec{B}_{geo} + \sigma_{io}^2 \cdot \vec{R}_{geo})$$

$$a_{geo,1} = \lambda_1 + \vec{B}_{geo}^T \cdot \begin{pmatrix} a_{geo,2} \\ a_{geo,3} \\ a_{geo,4} \end{pmatrix} \qquad (0.76)$$

Minimum-Error Ionospheric Carrier-Phase Combination

The minimum-error ionospheric carrier-phase combination is used in the ionosphere filters. The combination is defined as:

$$\varphi_{iono} = \vec{a}_{iono}^T \cdot \begin{pmatrix} \phi_1 \\ \phi_2 \\ \phi_3 \\ \phi_4 \end{pmatrix} = \begin{pmatrix} a_{iono,1} \\ a_{iono,2} \\ a_{iono,3} \\ a_{iono,4} \end{pmatrix}^T \cdot \begin{pmatrix} \phi_1 \\ \phi_2 \\ \phi_3 \\ \phi_4 \end{pmatrix} \qquad (0.77)$$

With the following notations:

$$\vec{A}_{iono} = \begin{pmatrix} \frac{1}{\lambda_1} & \frac{1}{\lambda_2} \\ -\frac{\lambda_1}{\lambda_1^2} & \frac{\lambda_2}{\lambda_1^2} \end{pmatrix}^{-1} \cdot \begin{pmatrix} 0 \\ 1 \end{pmatrix} \qquad (0.78)$$

$$B_{iono} = -\begin{pmatrix} \frac{1}{\lambda_1} & \frac{1}{\lambda_2} \\ \frac{\lambda_1}{\lambda_1^2} & -\frac{\lambda_2}{\lambda_1^2} \end{pmatrix}^{-1} \cdot \begin{pmatrix} \frac{1}{\lambda_3} & \frac{1}{\lambda_4} \\ -\frac{\lambda_3}{\lambda_1^2} & -\frac{\lambda_4}{\lambda_1^2} \end{pmatrix} \qquad (0.79)$$

$$Q1_{iono} = \begin{pmatrix} \sigma\phi_1^2 & 0 \\ 0 & \sigma\phi_2^2 \end{pmatrix} \qquad (0.80)$$

$$Q2_{iono} = \begin{pmatrix} \sigma\phi_3^2 & 0 \\ 0 & \sigma\phi_4^2 \end{pmatrix} \qquad (0.81)$$

in which the coefficients are defined by:

$$\begin{pmatrix} a_{iono,3} \\ a_{iono,4} \end{pmatrix} = -(B_{iono}^T \cdot Q1_{iono} \cdot B_{iono} + Q2_{iono})^{-1} \cdot \qquad (0.82)$$
$$B_{iono}^T \cdot Q1_{iono} \cdot \vec{A}_{iono}$$

$$\begin{pmatrix} a_{iono,1} \\ a_{iono,2} \end{pmatrix} = \vec{A}_{iono} + B_{iono} \cdot \begin{pmatrix} a_{iono,3} \\ a_{iono,4} \end{pmatrix} \qquad (0.83)$$

Quintessence Carrier-Phase Combinations

For $k = 1$:

$$\varphi_{Q_1} = \vec{a}_{Q_1}^T \cdot \begin{pmatrix} \phi_1 \\ \phi_2 \\ \phi_3 \\ \phi_4 \end{pmatrix} = \begin{pmatrix} a_{Q_1,1} \\ a_{Q_1,2} \\ a_{Q_1,3} \\ a_{Q_1,4} \end{pmatrix}^T \cdot \begin{pmatrix} \phi_1 \\ \phi_2 \\ \phi_3 \\ \phi_4 \end{pmatrix} \qquad (0.84)$$

the coefficients are defined by:

$$\begin{pmatrix} a_{Q_1,1} \\ a_{Q_1,2} \\ a_{Q_1,3} \end{pmatrix} = \begin{pmatrix} \frac{1}{\lambda_1} & \frac{1}{\lambda_2} & \frac{1}{\lambda_3} \\ -\frac{\lambda_1}{\lambda_1^2} & -\frac{\lambda_2}{\lambda_1^2} & -\frac{\lambda_3}{\lambda_1^2} \\ 1 & 1 & 1 \end{pmatrix} \cdot \begin{pmatrix} 0 \\ 0 \\ 1 \end{pmatrix} \qquad (0.85)$$

$$a_{Q_1,4} = 0 \qquad (0.86)$$

For $k = 2$:

-continued $$\varphi_{Q_2} = \vec{a}_{Q_2}^T \cdot \begin{pmatrix} \phi_1 \\ \phi_2 \\ \phi_3 \\ \phi_4 \end{pmatrix} = \begin{pmatrix} a_{Q_2,1} \\ a_{Q_2,2} \\ a_{Q_2,3} \\ a_{Q_2,4} \end{pmatrix}^T \cdot \begin{pmatrix} \phi_1 \\ \phi_2 \\ \phi_3 \\ \phi_4 \end{pmatrix}$$ (0.87)

the coefficients are defined by:

$$\begin{pmatrix} a_{Q_2,1} \\ a_{Q_2,2} \\ a_{Q_2,3} \\ a_{Q_2,4} \end{pmatrix} =$$ (0.88)

$$\begin{pmatrix} \frac{1}{\lambda_1} & \frac{1}{\lambda_2} & \frac{1}{\lambda_3} & \frac{1}{\lambda_4} \\ -\frac{\lambda_1}{\lambda_1^2} & -\frac{\lambda_2}{\lambda_1^2} & -\frac{\lambda_3}{\lambda_1^2} & -\frac{\lambda_4}{\lambda_1^2} \\ 1 & 1 & 1 & 1 \\ a_{Q_1,1} \cdot \sigma\phi_1^2 & a_{Q_1,2} \cdot \sigma\phi_2^2 & a_{Q_1,3} \cdot \sigma\phi_3^2 & a_{Q_1,4} \cdot \sigma\phi_4^2 \end{pmatrix}^{-1} \cdot \begin{pmatrix} 0 \\ 0 \\ 1 \\ 0 \end{pmatrix}.$$

Code-Carrier Combinations

Code-carrier combinations are used in the code filters. For every frequency $k = 1, \ldots, 4$ one combination is defined by:

$$\Pi_k = \vec{a}_{\Pi_k}^T \cdot \begin{pmatrix} \phi_1 \\ \phi_2 \\ \phi_3 \\ \phi_4 \end{pmatrix} - \rho_k = \begin{pmatrix} a_{\Pi_k,1} \\ a_{\Pi_k,2} \\ a_{\Pi_k,3} \\ a_{\Pi_k,4} \end{pmatrix}^T \cdot \begin{pmatrix} \phi_1 \\ \phi_2 \\ \phi_3 \\ \phi_4 \end{pmatrix} - \rho_k.$$ (0.89)

With the following notations:

$$\vec{A}_{\Pi_k} = \begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} 1 \\ \frac{\lambda_k^2}{\lambda_1^2} \end{pmatrix}$$ (0.90)

$$B_{\Pi_k} = -\begin{pmatrix} \frac{1}{\lambda_1} & \frac{1}{\lambda_2} \\ -\frac{\lambda_1}{\lambda_1^2} & -\frac{\lambda_2}{\lambda_1^2} \end{pmatrix}^{-1} \cdot \begin{pmatrix} \frac{1}{\lambda_3} & \frac{1}{\lambda_4} \\ -\frac{\lambda_3}{\lambda_1^2} & -\frac{\lambda_4}{\lambda_1^2} \end{pmatrix}$$ (0.91)

$$Q1_{\Pi_k} = \begin{pmatrix} \sigma\phi_1^2 & 0 \\ 0 & \sigma\phi_2^2 \end{pmatrix}$$ (0.92)

$$Q2_{\Pi_k} = \begin{pmatrix} \sigma\phi_3^2 & 0 \\ 0 & \sigma\phi_4^2 \end{pmatrix}$$ (0.93)

the coefficients are defined by:

$$\begin{pmatrix} a_{\Pi_k,3} \\ a_{\Pi_k,4} \end{pmatrix} = -\left(B_{\Pi_k}^T \cdot Q1_{\Pi_k} \cdot B_{\Pi_k} + Q2_{\Pi_k}\right)^{-1} \cdot B_{\Pi_k}^T \cdot Q1_{\Pi_k} \cdot \vec{A}_{\Pi_k}$$ (0.94)

$$\begin{pmatrix} a_{\Pi_k,1} \\ a_{\Pi_k,2} \end{pmatrix} = \vec{A}_{\Pi_k} + B_{\Pi_k} \cdot \begin{pmatrix} a_{\Pi_k,3} \\ a_{\Pi_k,4} \end{pmatrix}$$ (0.95)

Combination of Filter Output Arrays

The combination operation, such as in combiner 850, computes the complete floating solution for all satellites and all frequencies from the individual filter results. The complete floating solution consists of the variance/covariance matrix, the float solution vector, the $\chi^2$ statistics and the overdetermination statistics.

Solution Vector

The solution vector contains the floating-value integer ambiguities for nf frequencies and ns satellites (giving ns−1 satellite double-differences) in the following form:

$$\vec{x} = \begin{pmatrix} N_{1,1} \\ \vdots \\ N_{1,nf} \\ \vdots \\ N_{ns-1,1} \\ \vdots \\ N_{ns-1,nf} \end{pmatrix}$$ (0.96)

Augmented Coefficient Vectors

The coefficient vectors are given for each individual satellite respective individual double differences. The coefficient vectors for the full set of satellites are defined as:

$$\vec{\vec{a}} = \begin{pmatrix} a_1 & 0 & \ldots & 0 \\ \vdots & \vdots & \ddots & \vdots \\ a_{nf} & 0 & \ldots & 0 \\ 0 & a_1 & 0 & 0 \\ \vdots & \vdots & \vdots & \vdots \\ 0 & a_{nf} & \ldots & 0 \\ \vdots & 0 & \vdots & \vdots \\ 0 & \ldots & 0 & 0 \\ 0 & \ddots & 0 & 0 \\ 0 & \ldots & 0 & a_1 \\ \vdots & \ddots & \vdots & \vdots \\ 0 & \ldots & 0 & a_{nf} \end{pmatrix}$$ (0.97)

E.g. for three frequencies and four satellites/three double differences:

$$\vec{\vec{a}} = \begin{pmatrix} a_1 & 0 & 0 \\ a_2 & 0 & 0 \\ a_3 & 0 & 0 \\ 0 & a_1 & 0 \\ 0 & a_2 & 0 \\ 0 & a_3 & 0 \\ 0 & 0 & a_1 \\ 0 & 0 & a_2 \\ 0 & 0 & a_3 \end{pmatrix}$$ (0.98)

The matrix $\vec{a}$ is a nf row vector and $\vec{\vec{a}}$ nf·(ns−1)×(ns−1) matrix. In the following, $\vec{a}$ denotes the augmented coefficient vector $\vec{\vec{a}}$.

Variance/Covariance Matrix

The combined variance/covariance matrix is:

$$Q_{comb} = \left( \vec{a}_{geo} \cdot Q_{geo}^{-1} \cdot \vec{a}_{geo}^T + \vec{a}_{iono} \cdot Q_{iono}^{-1} \cdot \vec{a}_{iono}^T + \sum_{k=1}^{nf} \vec{a}_{\Pi_k} \cdot Q_{\Pi_k}^{-1} \cdot \vec{a}_{\Pi_k}^T + \sum_{k=1}^{nf-2} \vec{a}_{Q_k} \cdot Q_{Q_k}^{-1} \cdot \vec{a}_{Q_k}^T \right)^{-1} \quad (0.99)$$

the inverse of the sum of the estimates from the geometry filter, ionospheric filter, Quintessence filter and code filter.

Float Solution Vector

The combined vector of floating ambiguities is:

$$\vec{x}_{comb} = Q_{comb} \cdot \left( \vec{a}_{geo} \cdot Q_{geo}^{-1} \cdot \vec{x}_{geo}^T + \vec{a}_{iono} \cdot Q_{iono}^{-1} \cdot \vec{x}_{iono}^T + \sum_{k=1}^{nf} \vec{a}_{\Pi_k} \cdot Q_{\Pi_k}^{-1} \cdot \vec{x}_{\Pi_k}^T + \sum_{k=1}^{nf-2} \vec{a}_{Q_k} \cdot Q_{Q_k}^{-1} \cdot \vec{x}_{Q_k}^T \right)^{-1} \quad (0.100)$$

$\chi^2$ Statistics

The $\chi^2$ statistics of the combined solution is:

$$\chi^2_{comb} = \left( \chi^2_{geo} + \chi^2_{iono} + \sum_{k=1}^{nf} \chi^2_{\Pi_k} + \sum_{k=1}^{nf-2} \chi^2_{Q_k} \right) + \left( \vec{x}_{geo}^T \cdot Q_{geo}^{-1} \cdot \vec{x}_{geo} + \vec{x}_{iono}^T \cdot Q_{iono}^{-1} \cdot \vec{x}_{iono} + \sum_{k=1}^{nf} \vec{x}_{\Pi_k}^T \cdot Q_{\Pi_k}^{-1} \cdot \vec{x}_{\Pi_k} + \sum_{k=1}^{nf-2} \vec{x}_{Q_k}^T \cdot Q_{Q_k}^{-1} \cdot \vec{x}_{Q_k} \right) - \left( \vec{a}_{geo}^T \cdot Q_{geo}^{-1} \cdot \vec{x}_{geo} + \vec{a}_{iono}^T \cdot Q_{iono}^{-1} \cdot \vec{x}_{iono} + \sum_{k=1}^{nf} \vec{a}_{\Pi_k}^T \cdot Q_{\Pi_k}^{-1} \cdot \vec{x}_{\Pi_k} + \sum_{k=1}^{nf-2} \vec{a}_{Q_k}^T \cdot Q_{Q_k}^{-1} \cdot \vec{x}_{Q_k} \right) \cdot \vec{x}_{comb} \quad (0.101)$$

The $\chi^2$ statistics provide a measure of how well the estimates fit together. Overdetermination produces a discrepancy between the estimates and the model. The $\chi^2$ statistics are a weighted sum of all discrepancies between the actual measurements and the final model.

Overdetermination Statistics

The overdetermination statistics, also known as degrees-of-freedom, is computed as:

$$df_{comb} = df_{geo} + df_{iono} + \sum_{k=1}^{nf} df_{\Pi_k} + \sum_{k=1}^{nf-2} df_{Q_k} + ns - 1 \quad (0.102)$$

Integer Least Squares

Integer Least Squares denotes a family of well-known algorithms to derive the set of integer ambiguities $\vec{x}_{opt}$ that minimizes the function $$F(\vec{x}) = (\vec{x} - \vec{x}_{comb})^T \cdot Q_{comb}^{-1} \cdot (\vec{x} - \vec{x}_{comb}) \quad (0.103)$$

based on the differences between a candidate integer solution and the combined vector of floating ambiguities (see 0.99 above).

This optimum set of integer ambiguities is used as the ambiguity resolution result. Validation is carried out as explained in the next paragraph.

In one embodiment, the LAMBDA algorithm is used for best computational speed and efficiency. See P. JOOSTEN et al., *GNSS Three Carrier Phase Ambiguity Resolution using the LAMBDA-method*, PROCEEDINGS OF THE GNSS 1999. Other algorithms are also applicable and may be used if desired, such as Hatch, FARA, etc. A survey of ambiguity resolution techniques is found, for example, in P. MISRA et al., GLOBAL POSITIONING SYSTEM: SIGNALS, MEASUREMENTS, AND PERFORMANCE, Ganja-Jamuna Press, 2001, Chapter 6, pp. 209-254, and in B. HOFMANN-WELLENHOF et al., GPS THEORY AND PRACTICE, Springer-Verlag, Fifth Edition, 2001, pp. 213-248.

Validation

Validation assures that the optimum set of integer ambiguities $\vec{x}_{opt}$ is the correct solution with a sufficient confidence. The literature gives several statistical tests that provide the probability of the correctness of the solution. A discussion of ambiguity validation techniques is found, for example, at B. HOFMANN-WELLENHOF et al., GPS THEORY AND PRACTICE, Springer-Verlag, Fifth Edition, 2001, pp. 247-248.

Curtin University Discrimination Test

This test makes use of the difference between the best and the second best solution of the integer-least-squares problem as well as the variance/covariance matrix. See J. WANG et al., *A discrimination test procedure for ambiguity resolution on-the-fly*, JOURNAL OF GEODESY (1998) 72, pp. 644-653.

Ratio Test/Fisher Test

This test uses the ratio of the second best to the best solution. Either this ratio must exceed a predefined value (e.g. 2, or 5, or some other chosen value) or an additional statistical test (Fisher Test) is applied. See J. Wang et al., *A discrimination test procedure for ambiguity resolution on-the-fly*, Journal of Geodesy (1998) 72, pp. 644-653.

ADOP Test

This test is exclusively based on the variance/covariance matrix. The probability of the correctness of the solution is computed without inspecting the actual solution. See P. G. TEUNISSEN et al., *Ambiguity dilution of precision: Definition, Properties and Application*, PROCEEDINGS OF THE ION GPS-97, 16-19 September 1997, Kansas City, USA, pp. 891-899.

Computational Advantages

Processing advantages for embodiments of the invention are given for very simple estimators (not modeling correlated errors) as well as for sophisticated estimators using state augmentation techniques. The Kalman filter with n states has a computational burden proportional to $n^3$. A notation for this is: the n-state Kalman filter has a computational load of $O(n^3)$.

Simple Case

The following comparison is based on embodiments of the invention in which time-correlated effects are not modeled. Though these are not optimum operating modes, the comparison is given here to show a worst-case scenario for improvements offered by embodiments of the invention. All filters are set-up for double-differencing, which is also inferior with respect to the flexibility of the implementation.

Full Filter of the Prior Art
  The prior-art full filter approach uses the following states:
  3 position states
  nf·(ns−1) ambiguity states
  The resulting order of computational load is $$O([3+nf \cdot (ns-1)]^3) \qquad (0.104)$$

Filters in Accordance with Embodiments of the Invention
  Filters and filtering methods in accordance with embodiments of the invention have the following computational burden:

Geometry Filter
  3 position states
  ns−1 ambiguity states $$O([2+ns]^3) \qquad (0.105)$$

Ionosphere Filters
  If the differencing technique filter is used the ionosphere filter bank consists of ns−1 separate 1-state Kalman filters.

$$O((ns-1) \cdot [1]^3) \qquad (0.106)$$

Quintessence Filters
  If the differencing technique filter is used, one Quintessence filter bank consists of ns−1 separate 1-state Kalman filters and nf−2 banks of Quintessence filters are used:

$$O((nf-2) \cdot (ns-1) \cdot [1]^3) \qquad (0.107)$$

Code Filters
  The simple code filters use an ambiguity state only.

$$O((ns-1) \cdot [1]^3) \qquad (0.108)$$

Overall Computational load
  Overall, the total computational load of the geometry filter, ionosphere filters, Quintessence filters and code filters for the simple case (not modeling correlated errors) is:

$$O([2+ns]^3+(ns-1)\cdot[1]^3+(nf-2)\cdot(ns-1)\cdot[1]^3+(ns-1)\cdot[1]^3)=O([2+ns]^3+(ns-1)\cdot nf) \qquad (0.109)$$

Comparison
  The following table gives some examples of the computational load and the improvement factor of the simple case in accordance with embodiments of the invention over the full filter formulation of the prior art.

| No. Satellites | Improvement 2 freq | Improvement 3 freq | Improvement 4 freq |
|---|---|---|---|
| 5 | 3.8 | 9.5 | 19.0 |
| 6 | 4.2 | 11.0 | 22.8 |
| 7 | 4.6 | 12.4 | 26.1 |
| 8 | 4.8 | 13.5 | 28.9 |
| 9 | 5.1 | 14.5 | 31.4 |
| 10 | 5.3 | 15.4 | 33.6 |

Complete Modeling Case
  The following comparison is based on embodiments of the invention in which time-correlated effects are modeled and using single differences.

Full Filter
  The full filter approach uses the following states:
  3 position states
  1 receiver clock error state
  nf·ns ambiguity states
  nf·ns code multipath states
  nf·ns carrier multipath states
  nf·ns ionosphere states
  The resulting order of computational load is $$O([4+4 \cdot nf \cdot ns]^3) \qquad (0.110)$$

Filters in Accordance with Embodiments of the Invention
  Filters and filtering methods in accordance with embodiments of the invention have the following computational burden:

Geometry Filter
  3 position states
  1 receiver clock error state
  ns ambiguity states
  ns multipath states $$O([4+2 \cdot ns]^3) \qquad (0.111)$$

Ionosphere Filters
  If the differencing technique filter is used the ionosphere filter bank consists of ns separate 1-state Kalman filters.

$$O(ns \cdot [1]^3) \qquad (0.112)$$

Quintessence Filters
  If the differencing technique filter is used, one Quintessence filter bank consists of ns separate 1-state Kalman filters and nf−2 banks of Quintessence filters are used:

$$O((nf-2) \cdot ns \cdot [1]^3) \qquad (0.113)$$

Code Filters
  For best results, the code filters use an ambiguity state and a multipath state to model noise and correlated errors simultaneously.

$$O(ns \cdot [2]^3) \qquad (0.114)$$

Overall Computational load
  Overall, the total computational load of the geometry filter, ionosphere filter, Quintessence filters and code filters for embodiments of the invention in which time-correlated effects are modeled and using single differences is:

$$O([4+2 \cdot ns]^3+ns \cdot [1]^3+(nf-2) \cdot ns \cdot [1]^3+ns \cdot [2]^3)=O([4+2 \cdot ns]^3+ns \cdot (nf+7)) \qquad (0.115)$$

Comparison
  The following table gives some examples of the load and the improvement factor of full modeling in accordance with embodiments of the invention over the prior-art full filter formulation.

| No. Satellites | Improvement 2 freq | Improvement 3 freq | Improvement 4 freq |
|---|---|---|---|
| 5 | 31 | 94 | 212 |
| 6 | 34 | 106 | 240 |
| 7 | 37 | 115 | 264 |
| 8 | 39 | 124 | 284 |
| 9 | 41 | 131 | 302 |
| 10 | 43 | 137 | 317 |

Mixed Comparison
  Processing in accordance with embodiments of the invention offer an advantage for three or more carrier frequencies even when comparing full-modeling embodiments in accordance with the invention with the simple-modeling case for the prior-art full filters. That is, embodiments in accordance with the invention can offer improved processing (full-modeling vs. simple-modeling) while presenting a reduced computational burden over the prior-art full filters for three or more carrier frequencies.

| No. Satellites | Improvement 2 freq | Improvement 3 freq | Improvement 4 freq |
|---|---|---|---|
| 5 | 0.5 | 1.2 | 2.5 |
| 6 | 0.5 | 1.4 | 2.9 |
| 7 | 0.6 | 1.6 | 3.3 |
| 8 | 0.6 | 1.7 | 3.7 |
| 9 | 0.6 | 1.8 | 4.0 |
| 10 | 0.7 | 1.9 | 4.3 |

For two frequencies, the transition to full modeling has only a small impact when carried out using techniques in accordance with embodiments of the invention as compared with the simple-modeling full filter approach of the prior art. For three and four frequencies, there is even a speed improvement.

Multiple GNSS Processing

The methods presented are applicable to data from multiple GNSS. For example, a GPS data set and a Galileo data set may be processed in accordance with embodiments of the invention. The frequencies and therefore the combinations are determined separately for each satellite navigation system. In addition, a reference satellite is chosen for each GNSS, having a double difference operator application for each system. The performance of a combined satellite navigation system is significantly improved compared to the individual GNSS. This provides for availability, reliability and accuracy of the positions computed.

Figure 22:
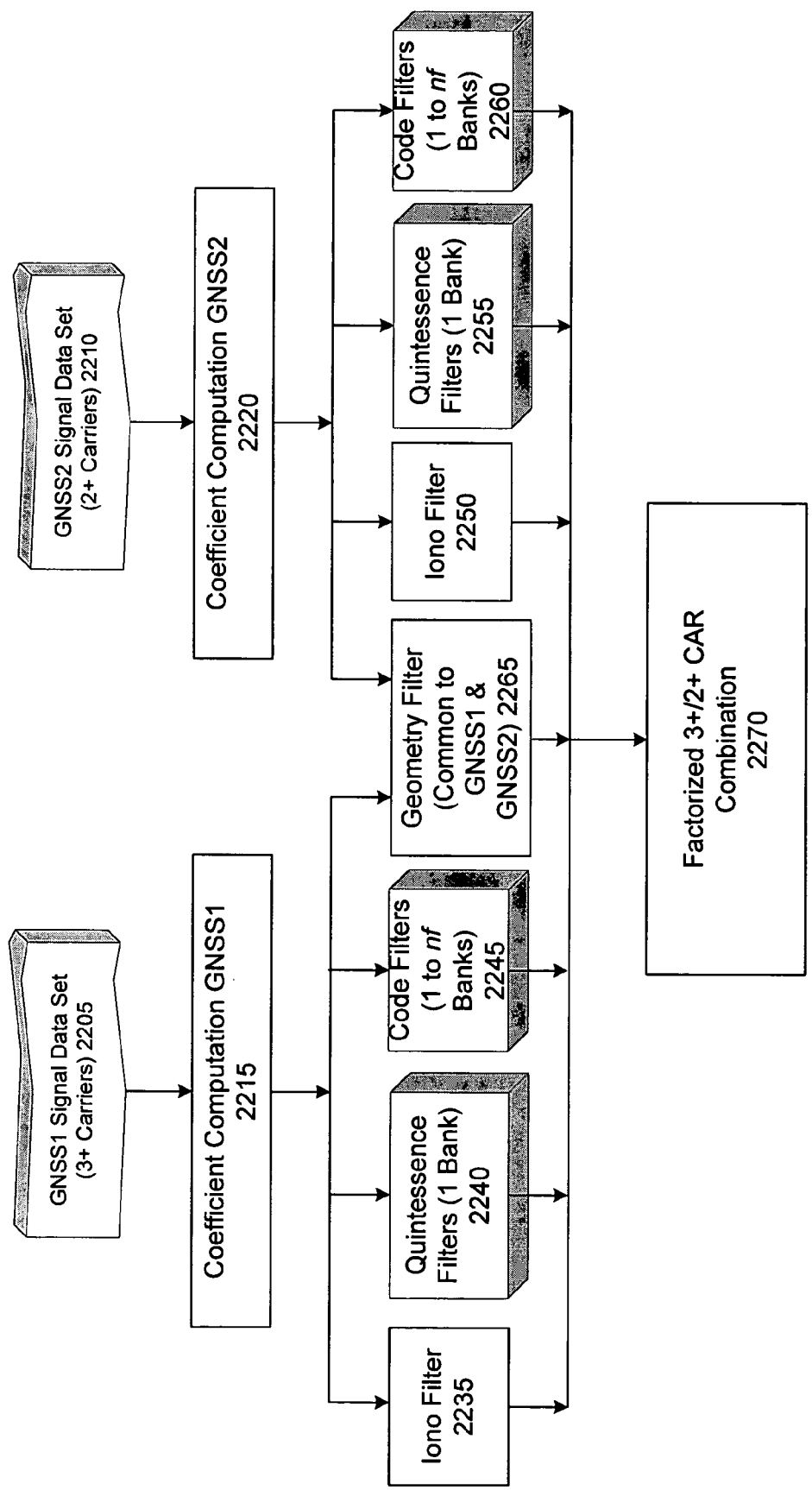
FIG. 22 shows an example of a filtering architecture in accordance with embodiments of the invention.

FIG. 22 shows an example of a filtering architecture in accordance with embodiments of the invention. A GNSS signal data set 2205 for three or more carrier frequencies from a first GNSS (e.g., a Galileo data set or a modernized GPS data set) is obtained from a suitable GNSS receiver. A GNSS signal data set 2210 for two or more carrier frequencies from a second GNSS (e.g., a two-frequency or three-frequency GPS data set, a two-frequency Glonass data set, or a three- or four frequency Galileo data set) is obtained from a suitable GNSS receiver. An optional coefficient computation element 2215 computes coefficients for the filters of the first GNSS.

GNSS data set 2205 and coefficients from element 2215, if provided, are supplied to a geometry-free ionosphere filter 2235, to one or more banks 2240 of Quintessence filters having one filter per tracked satellite of the first GNSS, and one to nf banks of code filters 2245. The number of Quintessence filter banks 2240 is two less than the number of carrier frequencies of the first GNSS. GNSS data set 2210 and coefficients from element 2220, if provided, are supplied to a geometry-free ionosphere filter 2250, to a bank 2255 of Quintessence filters having one filter per tracked satellite of the first GNSS, and one to nf banks of code filters 2245. The number of Quintessence filter banks 2255 is two less than the number of carrier frequencies of the second GNSS; if the second GNSS has only two carrier frequencies, no Quintessence filter bank 2255 is provided.

In the embodiment of FIG. 22, a single geometry filter 2265 is common to the first GNSS and second GNSS as they determine the same antenna position. That is, GNSS data set 2205 and coefficients from element 2215, if provided, are supplied to geometry filter 2265, and GNSS data set 2210 and coefficients from element 2220, if provided, are supplied to geometry filter 2265.

Figure 23:
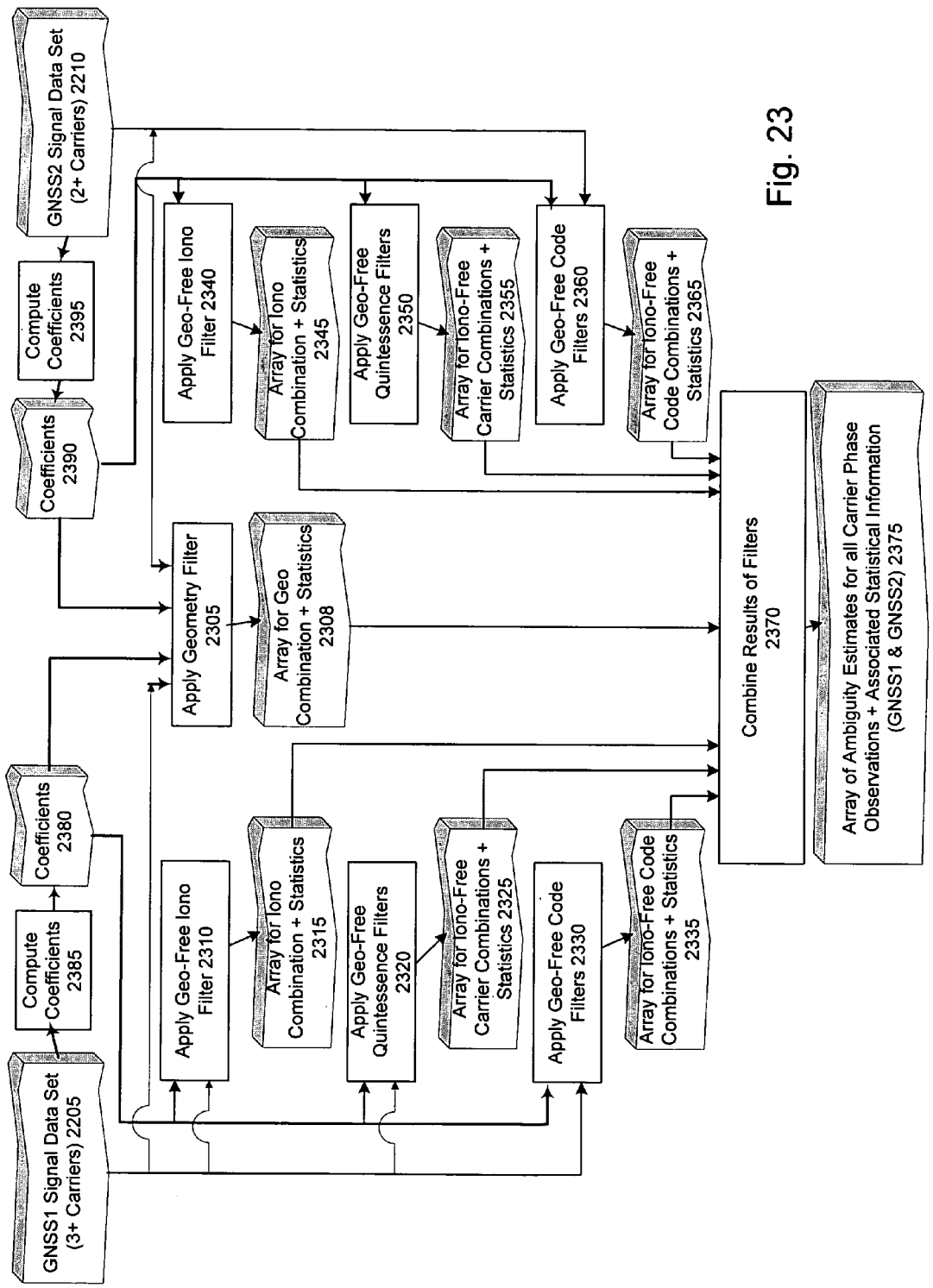
FIG. 23 illustrates a method corresponding to the architecture of FIG. 22.

FIG. 23 illustrates a method corresponding to the architecture of FIG. 22. At 2305 geometry filter 2265 is applied to data set 2205 of the first GNSS and to data set 2210 of the second GNSS using a geometry carrier-phase combination to obtain an array 2308 of ambiguity estimates for the geometry carrier-phase combination and associated statistical information. At 2310 bank 2240 of ionosphere filters is applied to data set 2205 of the first GNSS using a geometry-free ionosphere carrier-phase combination to obtain an array 2315 of ambiguity estimates for the ionosphere carrier-phase combination and associated statistical information. At 2320 bank or banks 2240 of Quintessence filters are applied to data set 2205 of the the first GNSS using a geometry-free and ionosphere-free carrier-phase combination to obtain an array 2325 of ambiguity estimates for the geometry-free and ionosphere-free carrier-phase combination and associated statistical information. At 2330 code filter or filters 2245 are applied to data set 2205 of the first GNSS using a plurality of geometry-free and ionosphere-free code-carrier combinations to obtain an array 2335 of ambiguity estimates for the code-carrier combinations and associated statistical information for the plurality of transmitters.

At 2340 bank 2250 of ionosphere filters is applied to data set 2210 of the second GNSS using a geometry-free ionosphere carrier-phase combination to obtain an array 2345 of ambiguity estimates for the ionosphere carrier-phase combination and associated statistical information. At 2350 bank or banks 2255 of Quintessence filters, if provided, are applied to data set 2210 of the the second GNSS using a geometry-free and ionosphere-free carrier-phase combination to obtain an array 2355 of ambiguity estimates for the geometry-free and ionosphere-free carrier-phase combination and associated statistical information. At 2360 code filter or filters 2260 are applied to data set 2210 of the second GNSS using a plurality of geometry-free and ionosphere-free code-carrier combinations to obtain an array 2365 of ambiguity estimates for the code-carrier combinations and associated statistical information for the plurality of transmitters.

The collection of arrays is combined at 2370 by element 2270 to produce a combined array 2375 of ambiguity estimates for all carrier phase observations of the first GNSS and the second GNSS and associated statistical information. For computational efficiency, coefficients 2380 may be computed at 2385 for data set 2205 and coefficients 2390 may be computed at 2390 for data set 2210. If separately computed as shown, coefficients 2380 and 2390 are supplied to the filters as indicated.

Figure 24:
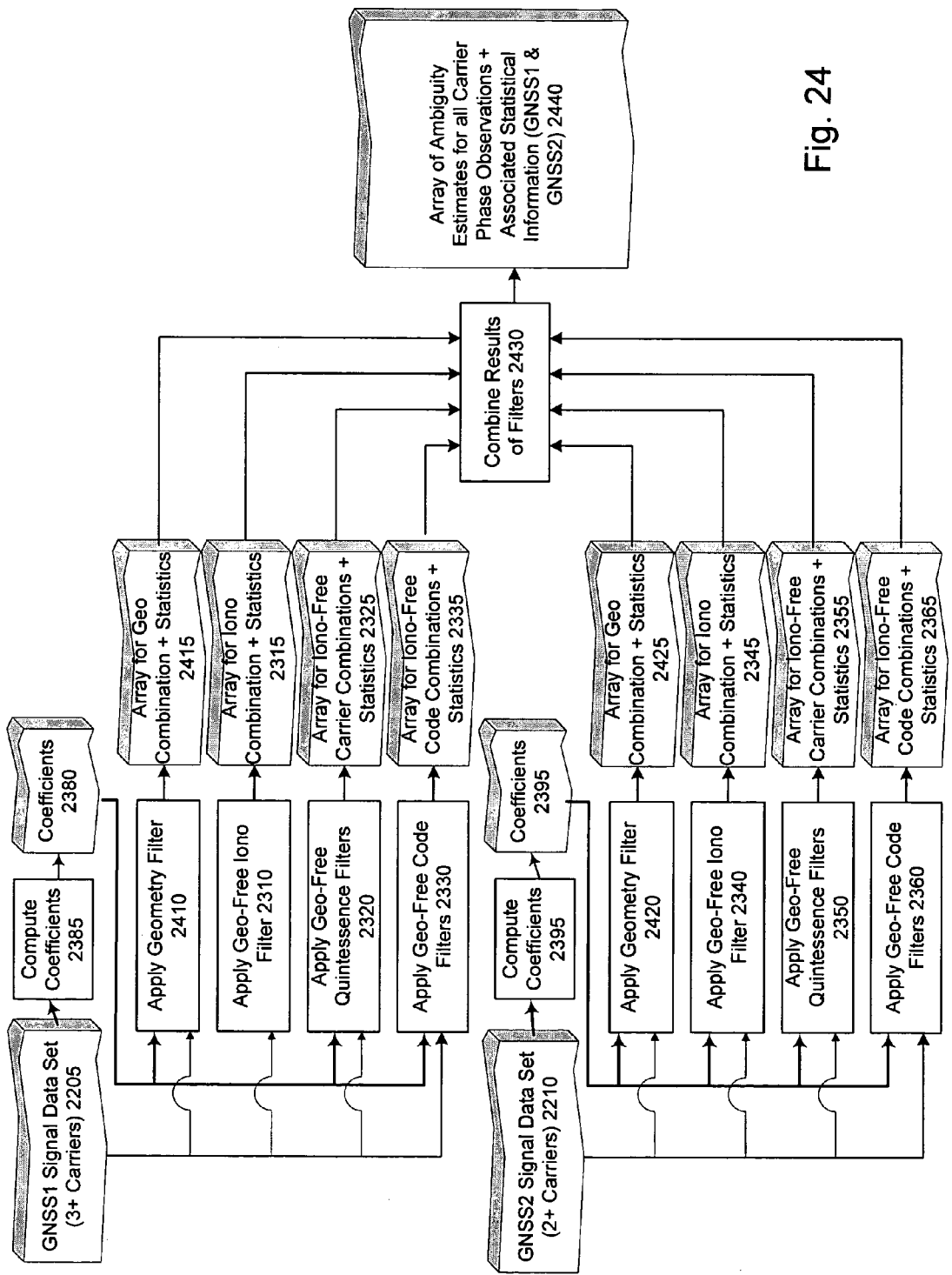
FIG. 24 illustrates a further method for in accordance with embodiments of the invention.

While the architecture of FIG. 22 employs a single geometry filter 2265 common to the first GNSS and the second GNSS, separate geometry filters may be employed for the first GNSS and the second GNSS if desired. FIG. 24 illustrates a method in which separate geometry filters are employed. Items in FIGS. 22, 23 and 24 with like reference numerals indicate like data and processes. As shown in FIG. 24, geometry filter 2410 is applied to data set 2205 of the first GNSS using a geometry carrier-phase combination to obtain an array 2415 of ambiguity estimates for the geometry carrier-phase combination and associated statistical information. Similarly, geometry filter 2420 is applied to data set 2205 of the second GNSS using a geometry carrier-phase combination to obtain an array 2425 of ambiguity estimates for the geometry carrier-phase combination and associated statistical information. Arrays 2315, 2325, 2335, 2345, 2355, 2365, 2415 and 2425 are combined at 2430 to produce a combined array 2440 of ambiguity estimates for all carrier phase observations of the first GNSS and the second GNSS and associated statistical information.

Mixed Numbers of Frequencies

Embodiments in accordance with the invention can be applied to GNSS consisting of satellites transmitting different numbers of frequencies, e.g. several satellites transmit two, the rest three frequencies. This can be due to the capabilities of the satellites or due to limitations from the current transmission/reception situation.

To process mixed numbers of frequencies, the coefficients are prepared for the lowest number of frequencies available. The additional information from the satellites transmitting more frequencies is taken into account by the Quintessence-filter combinations, which are available for at least three frequencies and are not dependent on the total number of frequencies. Also, the reference satellite is chosen from the satellites with the maximum number of frequencies available.

A motivation for this is that the Galileo System will provide three or four frequencies from the very beginning, while GPS modernization, leading eventually to three carriers (not four) will be introduced over many years during which some satellites will be upgraded to three frequencies while others will have only two frequencies available. Using two GPS carriers and three or four Galileo carriers will be common in the near future, while using three GPS and three or four Galileo frequencies is a future option.

Static Processing

Methods and apparatus in accordance with embodiments of the invention are applicable for static positioning. For static positioning, the geometric float solution models one position coordinate set instead of one position per epoch.

Networked GNSS Positioning

For processing data using multiple reference stations, the ambiguities are extended to model all double differences from the user receiver to every reference receiver.

Multi-Reference Station Processing

The computational efficiency of the approach presented opens up another important innovation—multi-reference-station processing. RTK products on the market today only process a data stream from a single reference station at once. Enabling the processing of more than one reference station data stream simultaneously in accordance with embodiments of the invention offer one or more advantages:

1. Accuracy—error sources that are local to a single reference station tend to average out when multiple reference stations are processed at once,
2. Integrity—the results obtained from a single reference station can be cross-checked via results from a different reference station. Today, the switching from one reference station to another is manual.
3. Improved ambiguity resolution performance—the reliability and speed with which carrier phase ambiguities can be resolved is improved when spatial error sources are well modeled. If multiple reference stations are used to process GPS observations at a rover station, the atmospheric error sources can be better modeled than with a single reference.

Multiple Rover Processing

Processing for multiple rovers is implemented adding all ambiguities to all rovers. This allows embodiments of the invention to be employed in multi-rover applications such as determination of blade orientation of an earth-moving machine, e.g., in which a rover is mounted at each end of the blade.

Precise Point Positioning

Precise point positioning uses raw data respective differences between satellites for one receiver only.

Network Correction Processing

Network correction processing uses ambiguity resolution for a multitude of reference stations. The ambiguities between all stations are resolved. This can be done efficiently using embodiments of the invention. All positions are predetermined and do not have to be modeled; as the positions of the reference stations are all known, the float solution does not contain position states.

Post-Processing

Although embodiments presented are defined for real-time operation, alternate embodiments in accordance with the invention can also be applied by collecting the data in real-time, then processing all data collected in batch (post-processing). This applies to all processing modes described above.

Instantaneous Ambiguity Resolution

Embodiments of the invention described above are defined for multiple epochs of data used in the filters. Still, embodiment of the invention work for only one epoch of data (instantaneous). If the validation is successful, the precise positions can directly be computed from one epoch of data. This approach has the advantage of not being sensitive to cycle slips or loss of lock when tracking the satellites. The modified flow chart for instantaneous ambiguity resolution is described above with reference to FIG. 17.

Receiver Architecture

Figure 25:
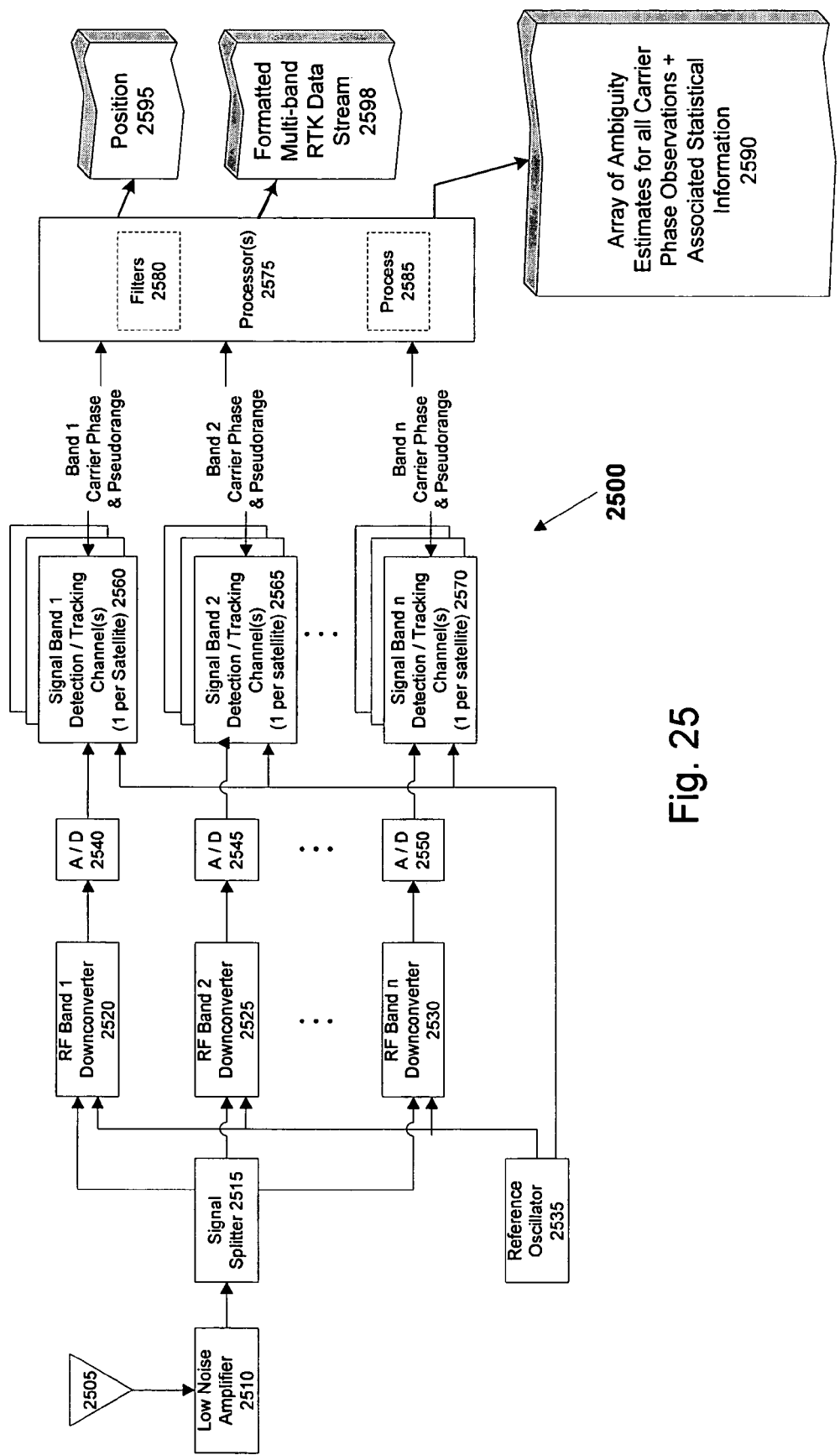
FIG. 25 shows the architecture of a GNSS receiver in accordance with embodiments of the invention.

FIG. 25 shows the architecture of a GNSS receiver 2500 in accordance with an embodiment of the invention. An antenna 2505 receives GNSS signals having more than two carrier frequencies, such as Galileo signals having three or four carrier frequencies or modernized GPS signals having three carrier frequencies. The received signal passes through a low-noise amplifier 2510 and the amplified signal is passed by a signal splitter 2515 to a plurality of radio-frequency-band downconverters 2520, 2525, . . . 2530. The downconverters are supplied with a frequency reference from a reference oscillator 2535.

Downconverter 2520 reduces a first band of the GNSS signal to a lower-frequency signal which is digitized by an analog-to-digital converter 2540. Downconverter 2525 reduces a second band of the GNSS signal to a lower-frequency signal which is digitized by an analog-to-digital converter 2545. Downconverter 2530 reduces an nth band of the GNSS signal to a lower-frequency signal which is digitized by an analog-to-digital converter 2550.

The digitized GNSS signal of the first band is processed by a bank of detection and tracking channels 2560 having one channel per GNSS satellite or pseudolite tracked by receiver 2500. The resulting carrier-phase and pseudorange measurements for the first band are supplied to one or more processors 2575. The digitized GNSS signal of the second band is processed by a bank of detection and tracking channels 2565 having one channel per GNSS satellite or pseudolite tracked by receiver 2500. The resulting carrier-phase and pseudorange measurements for the second band are supplied to one or more processors 2575. The digitized GNSS signal of the nth band is processed by a bank of detection and tracking channels 2570 having one channel per GNSS satellite or pseudolite tracked by receiver 2500. The resulting carrier-phase and pseudorange measurements for the nth band are supplied to one or more processors 2575. A respective downconverter, analog-to-digital converter and bank of detection and tracking channels is provided for each carrier-frequency band of the GNSS signals; for convenience of illustration only three of each are shown in FIG. 25.

Within the one or more processors 2575 is a factorized 3+ carrier filter architecture 2580 which, in operation, runs a process 2585. Process 2585 processes the GNSS signal data comprising carrier-phase and pseudorange measurements for each of the three or more GNSS signal bands for each of the transmitters being tracked by receiver 2500. Filter architecture 2580 comprises a factorized filter architecture in accordance with one or more embodiments of the present invention, as described for example with reference to FIGS. 8-14. Process 2585 comprises a factorized processing method in accordance with one or more embodiments of the invention as described for example with reference to FIGS. 6-7 and 15-21. The one or more processors 2575 may be implemented as a single processor or as multiple processors, and may be programmed general-purpose processors and/or special-purpose processors.

Process 2585 results in one or more types of output data such as: a combined array 2590 of ambiguity estimates for all carrier phase observations and associated statistical information; a position 2595; and/or a formatted multi-band real-time-kinematic (RTK) data stream 2598. Combined array 2590 corresponds, for example, to one of arrays 625, 725, 855, 1865 as described above. Position 2595 corresponds, for example, to one of positions 635, 735, 1920, 2020 as described above. Data stream 2598 may be in any format suitable for use in RTK positioning equipment.

Figure 26:
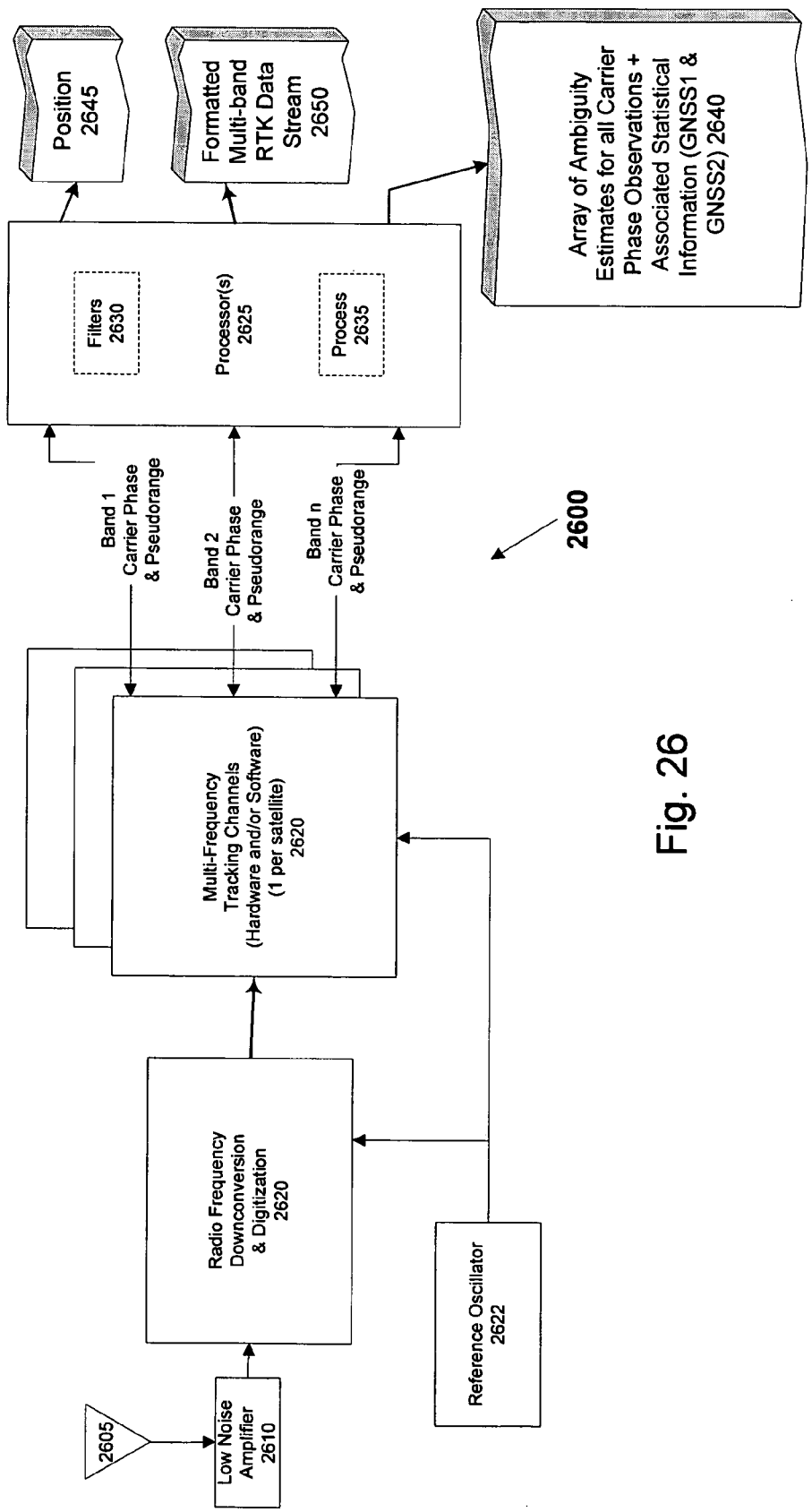
FIG. 26 shows the architecture of a GNSS receiver in accordance with embodiments of the invention.

FIG. 26 shows the architecture of a GNSS receiver 2600 in accordance with an embodiment of the invention. An antenna 2605 receives GNSS signals having more than two carrier frequencies, such as Galileo signals having three or four carrier frequencies or modernized GPS signals having three carrier frequencies. The received signal passes through a low-noise amplifier 2610 and the amplified signal is passed to a module 2615 which performs downconversion from radio frequency and digitization of the multi-band signal.

The digitized multi-band signal is processed by a bank of detection and tracking channels 2620 having one channel per GNSS satellite or pseudolite tracked by receiver 2600. The resulting carrier-phase and pseudorange measurements for each band are supplied to one or more processors 2625. Reference oscillator 2622 provides a frequency reference for downconversion and tracking.

Within the one or more processors 2625 is a factorized 3+ carrier filter architecture 2630 which, in operation, runs a process 2635. Process 2635 processes the GNSS signal data comprising carrier-phase and pseudorange measurements for each of the three or more GNSS signal bands for each of the transmitters being tracked by receiver 2600. Filter architecture 2630 comprises a factorized filter architecture in accordance with one or more embodiments of the present invention, as described for example with reference to FIGS. 8-14. Process 2635 comprises a factorized processing method in accordance with one or more embodiments of the invention as described for example with reference to FIGS. 6-7 and 15-21. The one or more processors 2625 may be implemented as a single processor or as multiple processors, and may be programmed general-purpose processors and/or special-purpose processors.

Process 2635 results in one or more types of output data such as: a combined array 2640 of ambiguity estimates for all carrier phase observations and associated statistical information; a position 2645; and/or a formatted multi-band real-time-kinematic (RTK) data stream 2650. Combined array 2640 corresponds, for example, to one of arrays 625, 725, 855, 1865 as described above. Position 2645 corresponds, for example, to one of positions 635, 735, 1920, 2020 as described above. Data stream 2650 may be in any format suitable for use in RTK positioning equipment.

Figure 27:
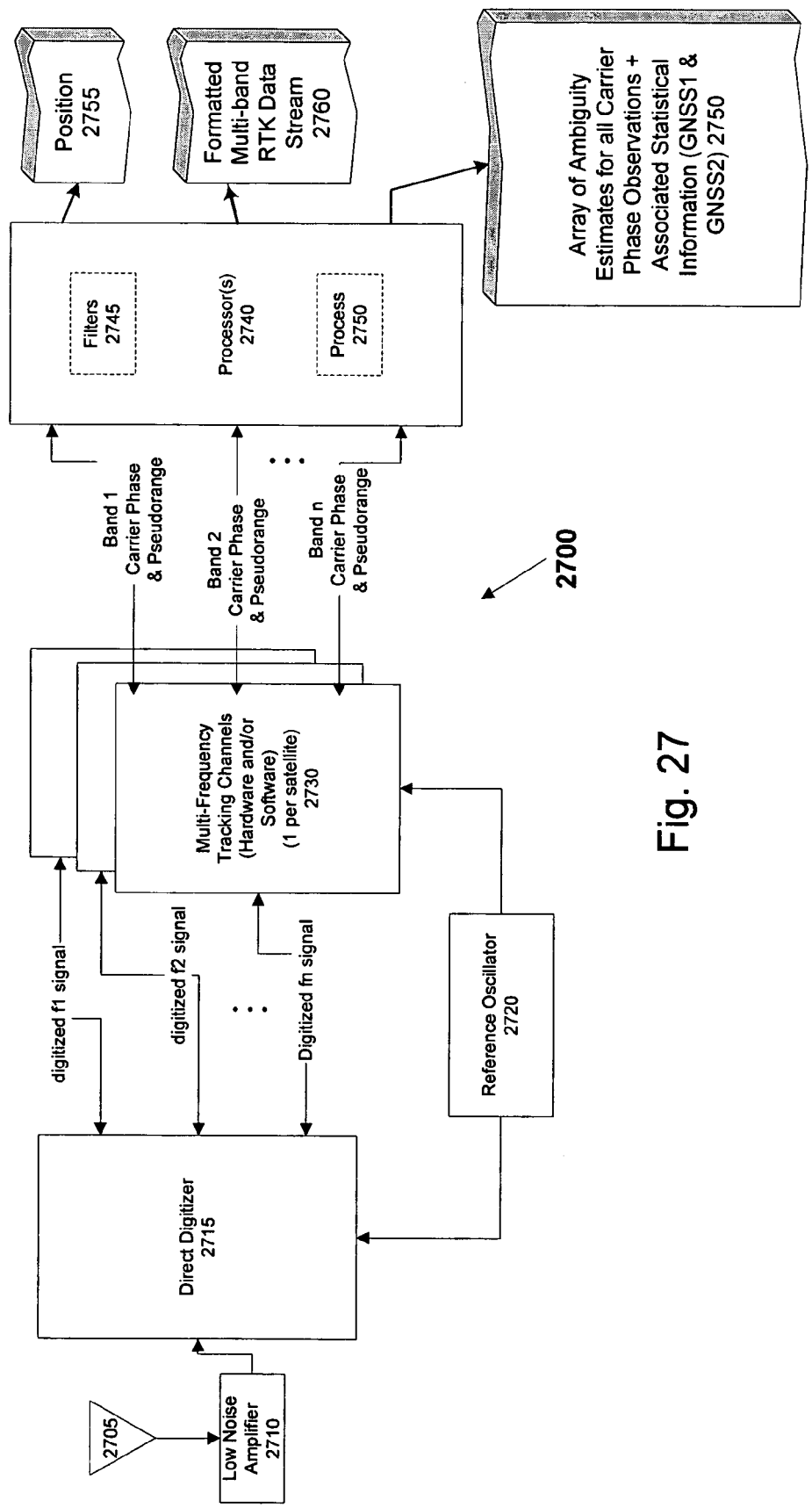
FIG. 27 shows the architecture of a GNSS receiver in accordance with embodiments of the invention.

FIG. 27 shows the architecture of a GNSS receiver 2700 in accordance with an embodiment of the invention. An antenna 2705 receives GNSS signals having more than two carrier frequencies, such as Galileo signals having three or four carrier frequencies or modernized GPS signals having three carrier frequencies. The received signal passes through a low-noise amplifier 2710 and the amplified signal is passed to a module 2715 which directly digitizes the multi-band signal.

The digitized signals are processed by a bank of detection and tracking channels 2730 having one channel per GNSS satellite or pseudolite tracked by receiver 2700. The resulting carrier-phase and pseudorange measurements for each band are supplied to one or more processors 2740. Reference oscillator 2720 provides a frequency reference for downconversion and tracking.

Within the one or more processors 2740 is a factorized 3+ carrier filter architecture 2745 which, in operation, runs a process 2750. Process 2750 processes the GNSS signal data comprising carrier-phase and pseudorange measurements for each of the three or more GNSS signal bands for each of the transmitters being tracked by receiver 2700. Filter architecture 2745 comprises a factorized filter architecture in accordance with one or more embodiments of the present invention, as described for example with reference to FIGS. 8-14. Process 2750 comprises a factorized processing method in accordance with one or more embodiments of the invention as described for example with reference to FIGS. 6-7 and 15-21. The one or more processors 2740 may be implemented as a single processor or as multiple processors, and may be programmed general-purpose processors and/or special-purpose processors.

Process 2750 results in one or more types of output data such as: a combined array 2750 of ambiguity estimates for all carrier phase observations and associated statistical information; a position 2755; and/or a formatted multi-band real-time-kinematic (RTK) data stream 2760. Combined array 2750 corresponds, for example, to one of arrays 625, 725, 855, 1865 as described above. Position 2755 corresponds, for example, to one of positions 635, 735, 1920, 2020 as described above. Data stream 2760 may be in any format suitable for use in RTK positioning equipment.

Figure 28:
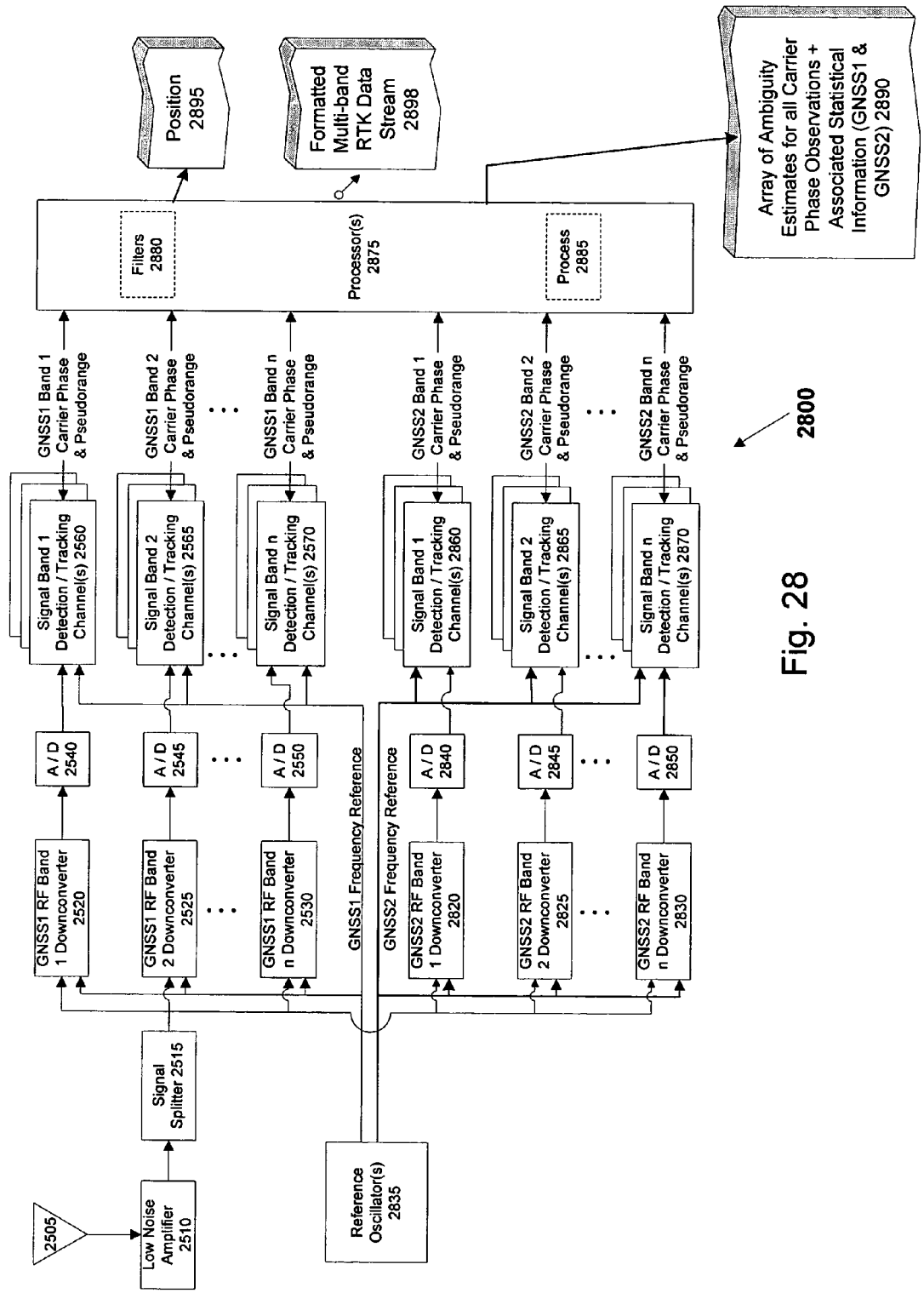
FIG. 28 shows the architecture of a dual-system GNSS receiver in accordance with embodiments of the invention.

FIG. 28 shows the architecture of a GNSS receiver 2800 in accordance with an embodiment of the invention. Receiver 2800 is similar in structure to that of FIG. 25, with additional channels for receiving and processing signals of a second GNSS. An antenna 2805 receives signals of a first GNSS having more than two carrier frequencies, such as Galileo signals having three or four carrier frequencies or modernized GPS signals having three carrier frequencies, and signals of a second GNSS having at least two carrier frequencies, such as GPS, modernized GPS or Glonass signals. The received signals pass through a low-noise amplifier 2510 and the amplified signals are passed by a signal splitter 2815 to a plurality of radio-frequency-band downconverters 2520, 2525, . . . 2530 for the first GNSS and to a plurality of radio-frequency-band downcoverters 2820, 2825, . . . 2830 for the second GNSS. The downconverters are supplied with a frequency reference from reference oscillators 2835. Downconverter 2520 reduces a first band of the first GNSS signal to a lower-frequency signal which is digitized by an analog-to-digital converter 2540. Downconverter 2525 reduces a second band of the first GNSS signal to a lower-frequency signal which is digitized by an analog-to-digital converter 2545. Downconverter 2530 reduces an nth band of the first GNSS signal to a lower-frequency signal which is digitized by an analog-to-digital converter 2550. Downconverter 2820 reduces a first band of the second GNSS signal to a lower-frequency signal which is digitized by an analog-to-digital converter 2840. Downconverter 2825 reduces a second band of the second GNSS signal to a lower-frequency signal which is digitized by an analog-to-digital converter 2845. Downconverter 2830 reduces an nth band of the second GNSS signal to a lower-frequency signal which is digitized by an analog-to-digital converter 2850, provided the second GNSS signal has more than two bands.

The digitized signal of the first band of the first GNSS signal is processed by a bank of detection and tracking channels 2560 having one channel per GNSS satellite or pseudolite tracked by receiver 2800. The resulting carrier-phase and pseudorange measurements for the first band of the first GNSS signal are supplied to one or more processors 2875. The digitized signal of the second band of the first GNSS signal is processed by a bank of detection and tracking channels 2565 having one channel per GNSS satellite or pseudolite tracked by receiver 2800. The resulting carrier-phase and pseudorange measurements for the second band of the first GNSS signal are supplied to one or more processors 2875. The digitized signal of the nth band of the first GNSS is processed by a bank of detection and tracking channels 2570 having one channel per GNSS satellite or pseudolite tracked by receiver 2800. The resulting carrier-phase and pseudorange measurements for the nth band are supplied to one or more processors 2875. A respective downconverter, analog-to-digital converter and bank of detection and tracking channels is provided for each carrier-frequency band of the signals of the first GNSS; for convenience of illustration only three of each are shown in FIG. 28.

The digitized signal of the first band of the second GNSS signal is processed by a bank of detection and tracking channels 2860 having one channel per GNSS satellite or pseudolite tracked by receiver 2800. The resulting carrier-phase and pseudorange measurements for the first band of the second GNSS signal are supplied to one or more processors 2875. The digitized signal of the second band of the second GNSS signal is processed by a bank of detection and tracking channels 2865 having one channel per GNSS satellite or pseudolite tracked by receiver 2800. The resulting carrier-phase and pseudorange measurements for the second band of the second GNSS signal are supplied to one or more processors 2875. The digitized signal of the nth band of the second GNSS signal is processed by a bank of detection and tracking channels 2870 having one channel per GNSS satellite or pseudolite tracked by receiver 2800. The resulting carrier-phase and pseudorange measurements for the nth band are supplied to one or more processors 2875. A respective downconverter, analog-to-digital converter and bank of detection and tracking channels is provided for each carrier-frequency band of the signals of the second GNSS; though three of each are shown in FIG. 28 only two are provided if the second GNSS has only two carrier bands.

Within the one or more processors 2575 is a factorized 3+ carrier filter architecture 2880 which, in operation, runs a process 2885. Process 2585 processes the signal data comprising carrier-phase and pseudorange measurements for each of the three or more first-GNSS-signal bands and for each of the two or more second-GNSS-signal bands for each of the transmitters being tracked by receiver 2500. Filter architecture 2880 comprises a factorized filter architecture in accordance with one or more embodiments of the present invention, as described for example with reference to FIG. 22.

Process 2885 comprises a factorized processing method in accordance with one or more embodiments of the invention as described for example with reference to FIGS. 23 and 24. The one or more processors 2875 may be implemented as a single processor or as multiple processors, and may be programmed general-purpose processors and/or special-purpose processors.

Process 2885 results in one or more types of output data such as: a combined array 2890 of ambiguity estimates for all carrier phase observations and associated statistical information; a position 2895; and/or a formatted multi-band real-time-kinematic (RTK) data stream 2898. Combined array 2890 corresponds, for example, to one of arrays 2375 or 2440 as described above. Data stream 2898 may be in any format suitable for use in RTK positioning equipment.

RTK Applications

Figure 29:
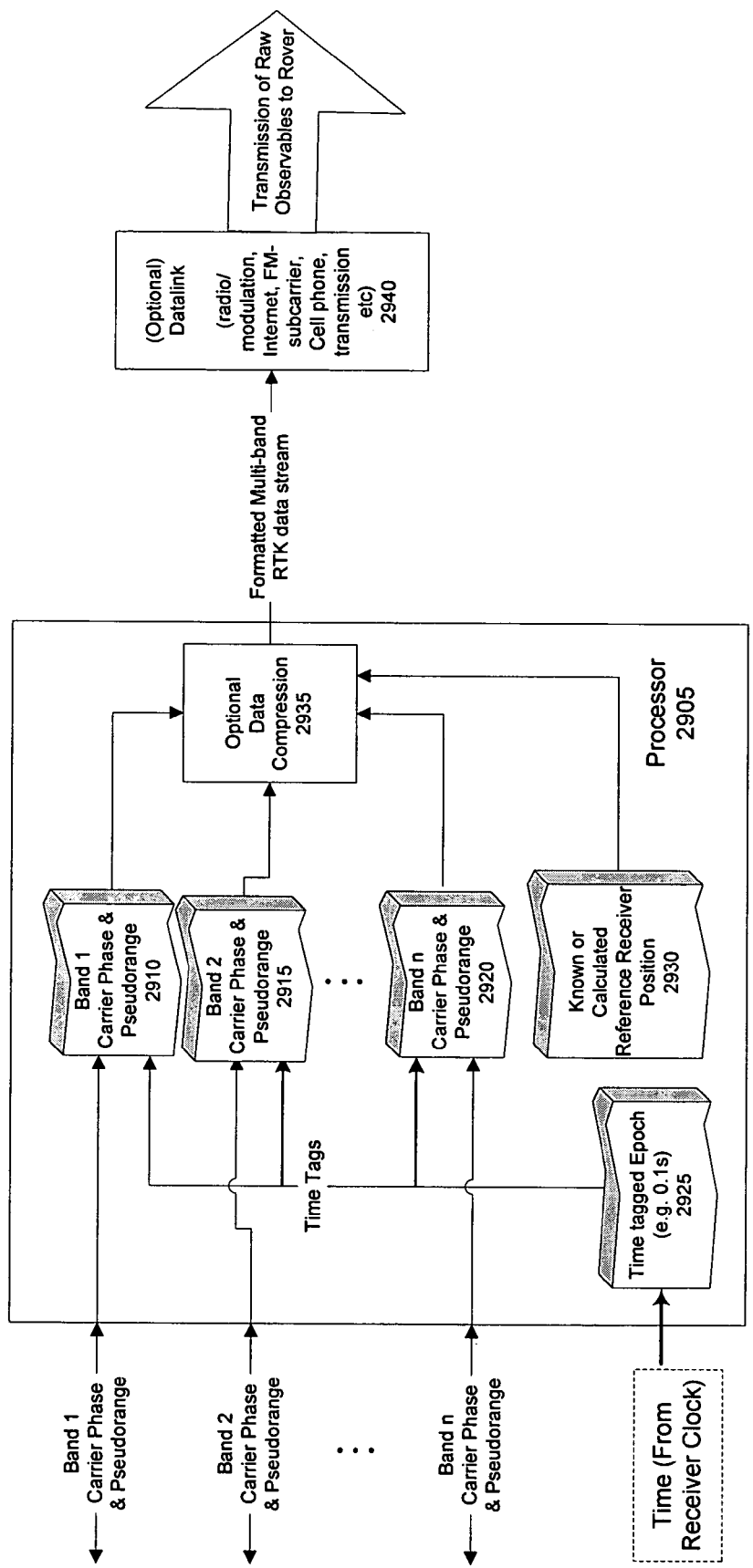
FIG. 29 illustrates an embodiment of a reference receiver processor for preparing a formatted multi-band RTK data stream.

Embodiments of methods and apparatus in accordance with the invention may be used to advantage in RTK applications. FIG. 29 illustrates an embodiment of a reference receiver processor 2905 for preparing a formatted multi-band RTK data stream, e.g., as indicated in FIGS. 25-28. Carrier-phase and pseudorange measurements for each of GNSS bands 1, 2, ... n are collected, e.g., in memory blocks 2910, 2915, ... 2920. The reference receiver clock supplies a time signal to a block 2925 which provides time time tags for each epoch of measurement data, e.g., in intervals of 0.1 second. A data set per epoch is supplied by memory blocks 2910, 2915, ... 2920 to an optional data compression element 2935.

Also supplied to data compression element 2935 is a known or calculated position 2930 of the reference receiver, which is used in RTK positioning to calculate a vector from the reference receiver to the rover. Data compression enables transmission overhead (time and/or cost) to be minimized, or enables the data rate to be optimized for minimum bandwidth. Data compression element 2935 supplies a formatted multi-band RTK data stream. An optional data link 2940, such as a radio link, Internet connection, FM-subcarrier modulation, cell phone link or other transmission link, transmits raw observables of the reference receiver to the rover in the formatted multi-band RTK data stream. Raw observables of the reference receiver are processed at the rover using factorized 3+ carrier ambiguity resolution filters in accordance with embodiments of the invention for example as described above.

Figure 30:
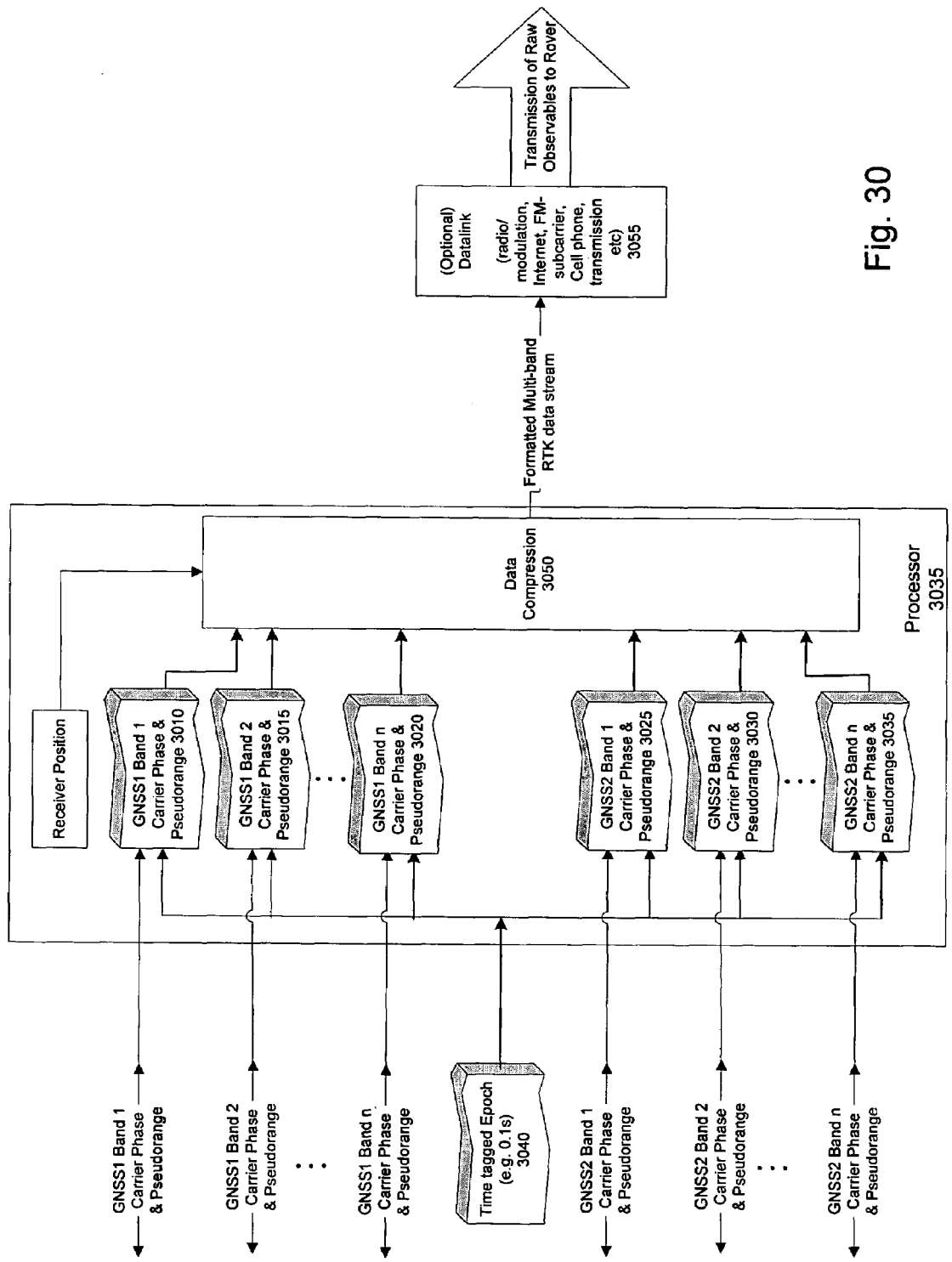
FIG. 30 illustrates an embodiment of a multi-GNSS reference receiver processor for preparing a formatted multi-band RTK data stream.

FIG. 30 illustrates an embodiment of a reference receiver processor 3005 for preparing a formatted multi-band, multi-GNSS RTK data stream, e.g., as indicated in FIG. 28. Carrier-phase and pseudorange measurements for each of bands 1, 2, ... n of a first GNSS are collected, e.g., in memory blocks 3010, 3015, ... 3020. Carrier-phase and pseudorange measurements for each of bands 1, 2, ... n of a second GNSS are collected, e.g., in memory blocks 3025, 3030, ... 3035. The reference receiver clock supplies a time signal to a block 3040 which provides time time tags for each epoch of measurement data, e.g., in intervals of 0.1 second. A data set per epoch is supplied by memory blocks 3010, 3015, ... 3020 for the first GNSS and by memory blocks 3025, 3030, ... 3035 for the second GNSS to an optional data compression element 3050.

Also supplied to data compression element 3050 is a known or calculated position 3045 of the reference receiver, which is used in RTK positioning to calculate a vector from the reference receiver to the rover. Data compression enables transmission overhead (time and/or cost) to be minimized, or enables the data rate to be optimized for minimum bandwidth. Data compression element 3050 supplies a formatted multi-band RTK data stream for the first GNSS and the second GNSS. Data compression element 3050 supplies a formatted multi-band RTK data stream. An optional radio link, Internet connection, FM-subcarrier modulation, cell phone link or other transmission link, transmits raw observables of the reference receiver to the rover in the formatted multi-band RTK data stream. Raw observables of the reference receiver are processed at the rover using factorized 3+ carrier ambiguity resolution filters in accordance with embodiments of the invention for example as described above.

Figure 31:
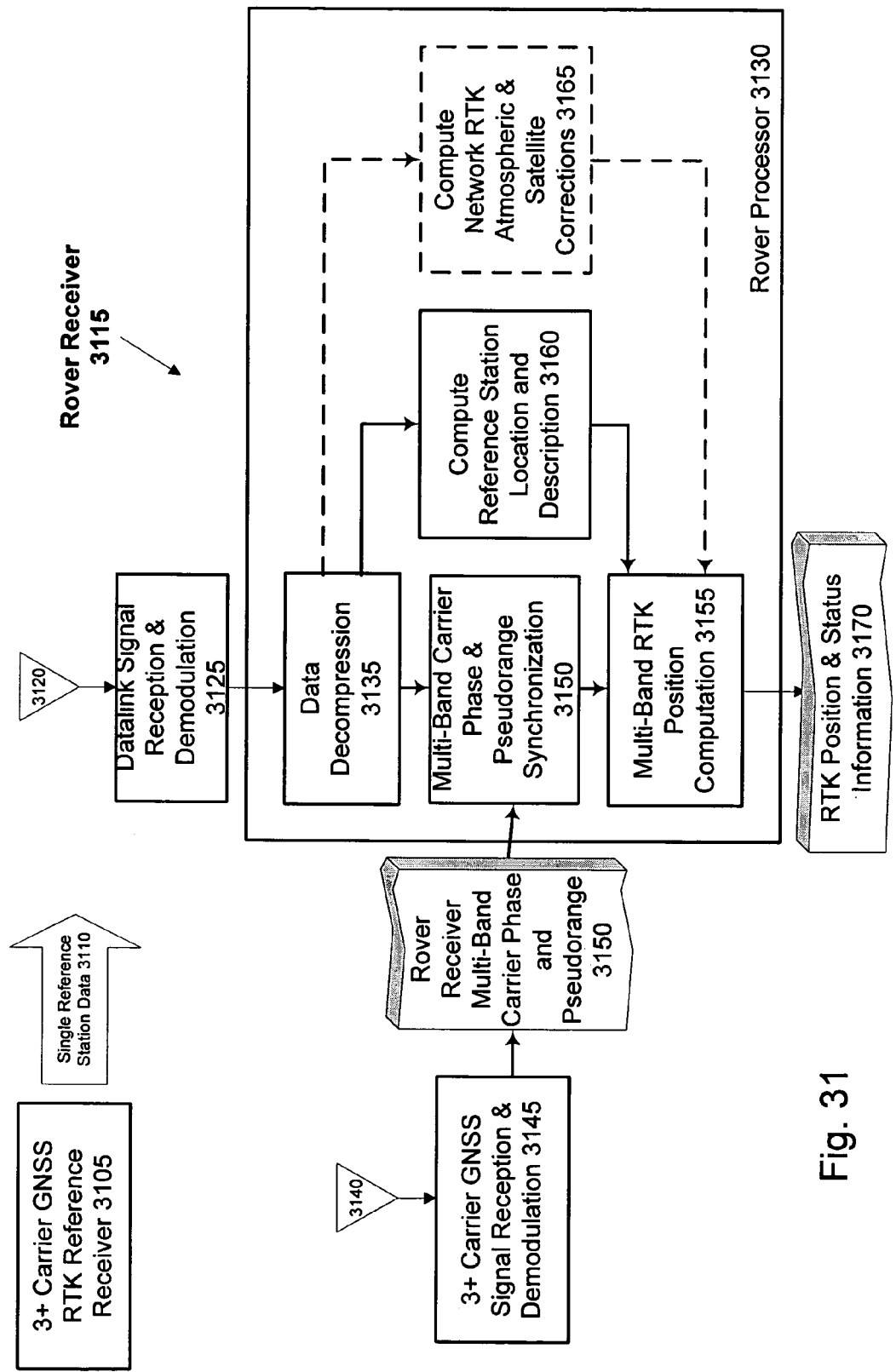
FIG. 31 shows a mode of operation in accordance with embodiments of the invention in which a single reference station is employed.

FIG. 31 shows a mode of operation in accordance with embodiments of the invention in which a single reference station is employed. A reference receiver 3105 supplies reference-station data 3110, for example a formatted multi-band RTK data stream as provided by processor 2905 in FIG. 29 or processor 2035 in FIG. 30. Reference-station data are provided for example via a suitable data link. A rover receiver 3115 comprises suitable elements for receiving reference-station data 3110, such as a data link antenna 3120 and datalink signal reception and demodulation electronics 3125, and supplying reference-station data 3110 to a rover processor 3130. If reference-station data 3105 are compressed for efficient transmission via the data link, a data decompression element 3125 within rover receiver 3115 decompresses the reference-station data for use by one or more further processing elements within processor 3130.

Rover receiver 3115 further includes an antenna 3140 for receiving GNSS signals having three or more carrier frequencies and suitable signal reception and demodulation electronics 3145 for producing rover-reciever 3+ carrier phase and pseudorange data 3145 for use in rover processor 3130. Rover processor 3130 includes a multi-band carrier-phase and pseudorange synchronization element 3150 which synchronizes rover-receiver data 3145 with reference-station data 3110 for use in a multi-band RTK position computation element 3155. A computation element 3160 uses reference-station data 3110 to compute the reference-station position and provide this with reference-station description to position computation element 3155. An optional computation element 3165 computes atmospheric and satellite corrections for used by position computation element 3155. Computation element 3155 computes RTK position fixes of rover receiver 3115 and supplies as output data RTK position and status information 3170.

Figure 32:
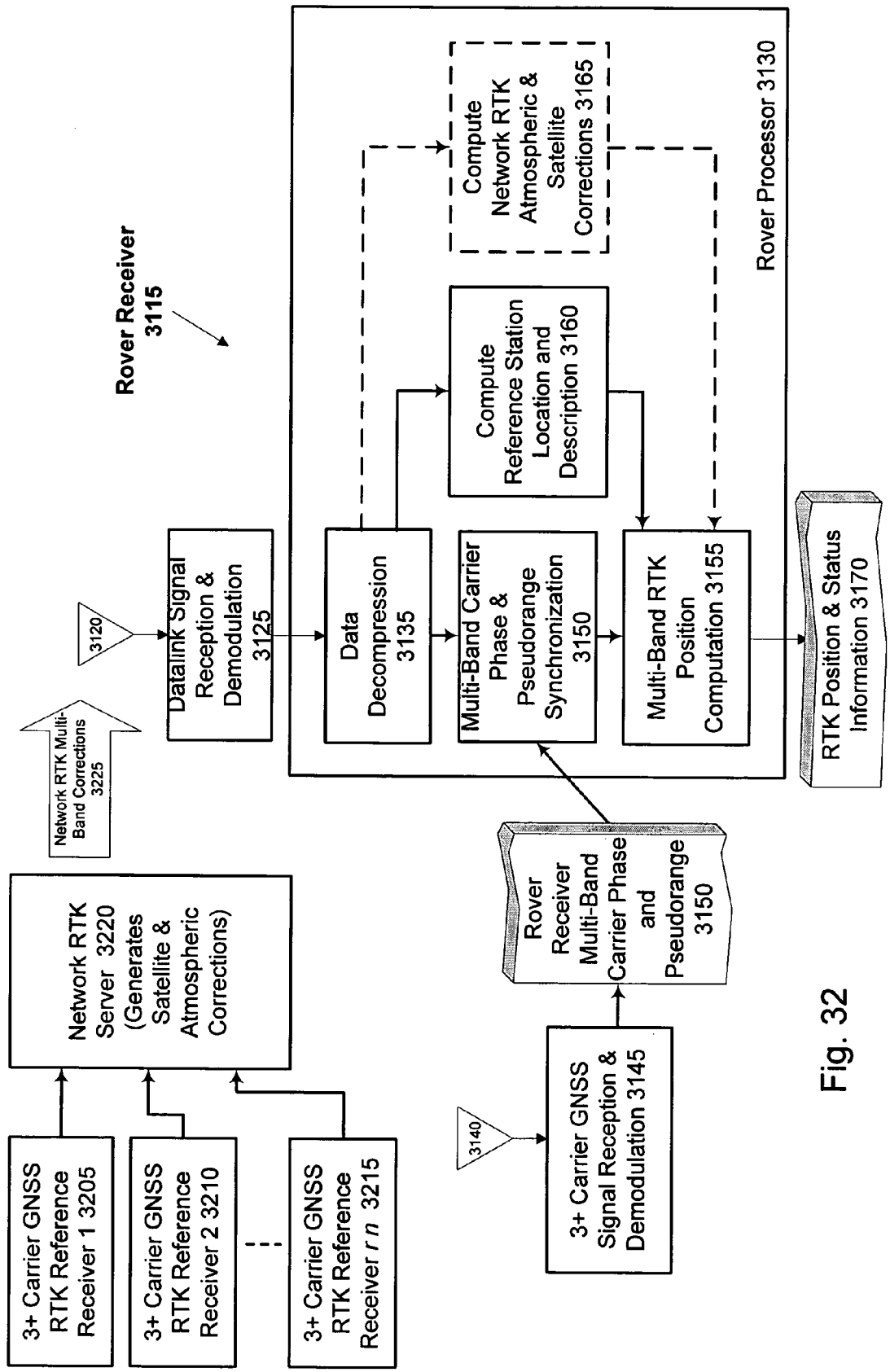
FIG. 32 shows a mode of operation in accordance with embodiments of the invention in which a plurality of reference stations is employed in a network.

FIG. 32 shows a mode of operation in accordance with embodiments of the invention in which a plurality of reference stations is employed in a network. Reference receivers 3205, 3210, 3215 each supply reference-station data, for example a formatted multi-band RTK data stream as provided by processor 2905 in FIG. 29 or processor 2035 in FIG. 30, to a network RTK server 3220. Network RTK server 3220 generates satellite and atmospheric corrections and supplies these with the reference-station data for example as a stream of network RTK multi- and corrections 3225 for use by one or more rover receivers such as rover receiver 3115. Network RTK multi-band corrections 3225 are provided for example for use in a virtual-reference-station mode or in a broadcast mode. The virtual-reference-station mode is comparable to the mode of FIG. 31 as the reference-station data is combined by network RTK server 3220 to produce a set of data simulating a reference station (e.g., simulating single reference-station data 3110 from reference receiver 3105) for a declared location such as the location of rover receiver 3115. The broadcast mode supplies reference-station data from each of reference receivers 3205, 3210, 3215 for processing in rover processor 3130. In either mode, corrections 3225 optionally include error models such as ionosphere and troposphere models calculated from the reference-station data.

Figure 33:
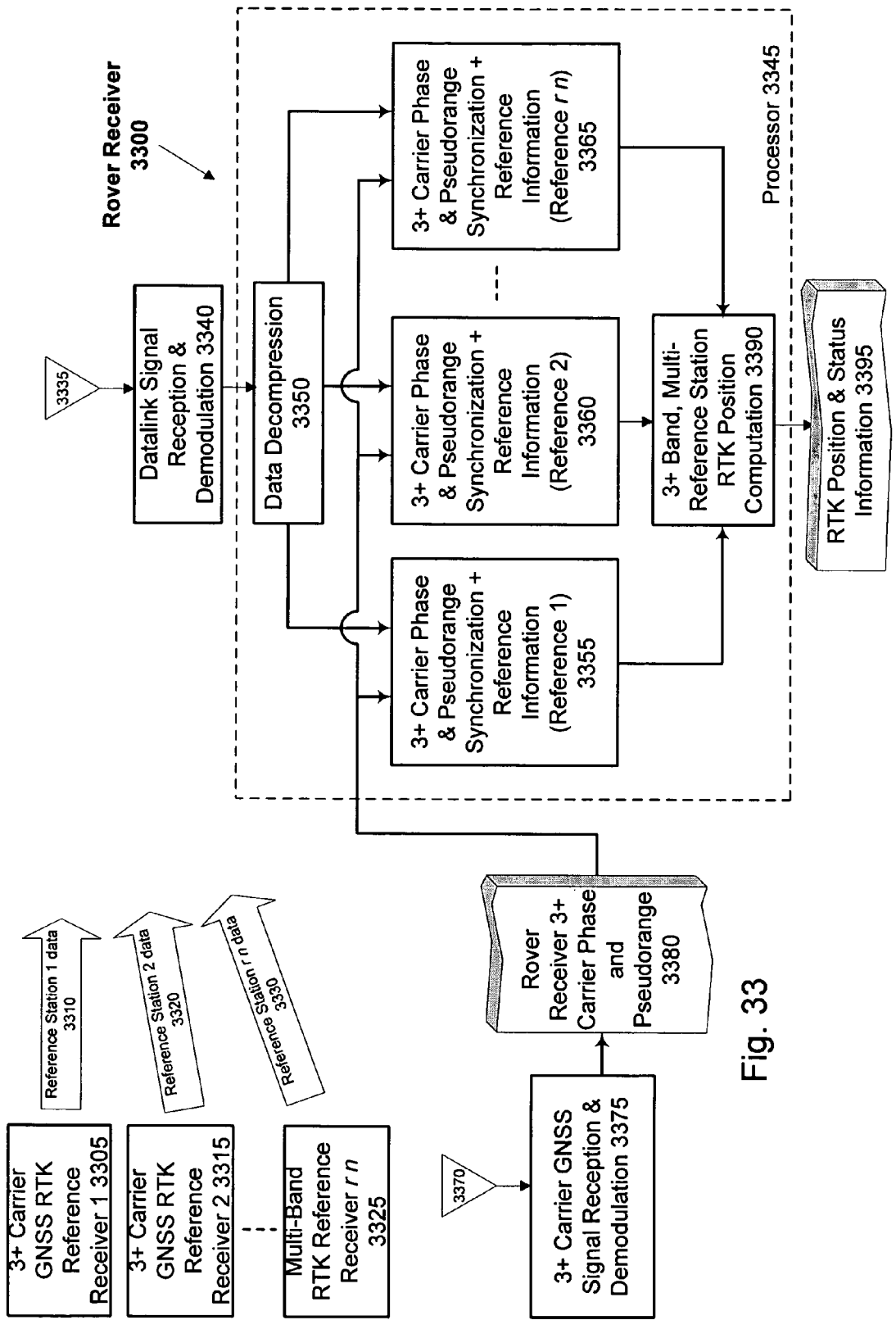
FIG. 33 shows a mode of operation in accordance with embodiments of the invention in which a plurality of individual reference stations is employed.

FIG. 33 shows a mode of operation in accordance with embodiments of the invention in which a plurality of individual reference stations is employed. Reference receivers 3305, 3315, 3325 supply respective reference station data 3310, 3320, 3330 to a rover receiver 3300. The data are provided for example via a suitable data link. Rover receiver 3300 includes suitable elements for receiving the reference-station data, such as a data link antenna 3335 and datalink signal reception and demodulation electronics 3340, and supplying the reference-station data to a rover processor 3345. If the reference-station data are compressed for efficient transmission via the data link, a data decompression element 3350 within rover receiver 3345 decompresses the reference-station data for use by one or more further processing elements within processor 3345.

Rover receiver 3300 further includes an antenna 3370 for receiving GNSS signals having three or more carrier frequencies and suitable signal reception and demodulation electronics 3375 for producing rover-reciever 3+ carrier phase and pseudorange data 3380 for use in rover processor 3345. Rover processor 3345 includes a respective multi-band carrier-phase and pseudorange synchronization and reference information element 3355, 3360, 3365 for each of the reference stations. Elements 3355, 3360, 3365 synchronize rover-receiver data 3380 with reference-station data for use in a multi-band RTK position computation element 3390. Computation element 3390 computes RTK position fixes of rover receiver 3300 and supplies as output data RTK position and status information 3395.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versons of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Methods and apparatus in accordance with embodiments of the invention include but are not limited to:

1. A method of processing a set of GNSS signal data derived from signals having at least three carriers, comprising:
   a. Applying to the set of GNSS signal data a geometry filter using a geometry carrier-phase combination to obtain an array of ambiguity estimates for the geometry carrier-phase combination and associated statistical information;
   b. Applying to the set of GNSS signal data a bank of ionosphere filters using a geometry-free ionosphere carrier-phase combination to obtain an array of ambiguity estimates for the ionosphere carrier-phase combination and associated statistical information;
   c. Applying to the set of GNSS signal data at least one bank of Quintessence filters using a geometry-free and ionosphere-free carrier-phase combination to obtain an array of ambiguity estimates for the geometry-free and ionosphere-free carrier-phase combination and associated statistical information;
   d. Applying to the set of GNSS signal data at least one code filter using a plurality of geometry-free code-carrier combinations to obtain an array of ambiguity estimates for the code-carrier combinations and associated statistical information; and
   e. Combining the arrays of a., b., c. and d. to obtain a combined array of ambiguity estimates for all carrier phase observations and associated statistical information.
2. The method of 1, further comprising computing a user position from the combined array.
3. The method of 1 or 2, wherein the set of GNSS signal data comprises GNSS signal data of a single epoch.
4. The method of any of 1-3, further comprising computing a user position from the combined array with a combination of float ambiguities and fixed ambiguities by applying an integer-least-squares procedure and a validation procedure.
5. The method of any of 1-3, further comprising computing a user position from the combined array with float ambiguities, and computing a user position from the combined array with a combination of float ambiguities and fixed ambiguities by applying an integer-least-squares procedure and a validation procedure.
6. The method of any of 1-5, wherein applying to the set of GNSS signal data at least one code filter comprises applying to the set of GNSS signal data at least one code filter using a plurality of geometry-free and ionosphere-free code-carrier combinations to obtain an array of ambiguity estimates for the code-carrier combinations and associated statistical information.
7. The method of any of 1-5, wherein applying to the set of GNSS signal data at least one code filter comprises applying to the set of GNSS signal data one code filter for each carrier using a plurality of geometry-free and ionosphere-free code-carrier combinations to obtain an array of ambiguity estimates for the code-carrier combinations and associated statistical information.
8. The method of 7, wherein the code filters are mutually orthogonal.
9. The method of any one of 1-8, wherein the set of GNSS signal data is derived from signals received from transmitters of a first navigation system, the method further comprising processing a second set of GNSS signal data derived from signals having at least two carriers and received from transmitters of a second navigation system by:
   f. Applying to the second set of GNSS signal data a geometry filter using a geometry carrier-phase combination to obtain an array of ambiguity estimates for the geometry carrier phase combination and associated statistical information;
   g. Applying to the second set of GNSS signal data a bank of ionosphere filters using a geometry-free ionosphere carrier-phase combination to obtain an array of ambiguity estimates for the ionosphere carrier-phase combination and associated statistical information;
   h. Applying to the second set of GNSS signal data at least one bank of Quintessence filters using a geometry-free carrier phase combination to obtain an array of ambiguity estimates for said carrier phase combination and associated statistical information;
   i. Applying to the second set of GNSS signal data at least one code filter using a plurality of geometry-free and ionosphere-free code-carrier combinations to obtain an array of ambiguity estimates for the code-carrier combinations and associated statistical information; and
   wherein d. further comprises combining the arrays of f., g., h. and i. with the arrays of a., b., c. and d. to obtain a combined array of ambiguity estimates for all carrier phase observations and associated statistical information.
10. The method of 9, wherein a. and f. are carried out by applying the first-mentioned set of GNSS signal data and the second set of GNSS signal data to a single geometry filter to obtain a single array of ambiguity estimates for the geometry carrier-phase combination and associated statistical information.
11. The method of 9 or 10, wherein the first navigation system has a first number of carrier frequencies and observables and the second navigation system has a second number of carrier frequencies and observables which differs from the first number of carrier frequencies and observables.
12. The method of any of 9-11, wherein applying to the second set of GNSS signal data at least one code filter comprises applying to the second set of GNSS signal data at least one code filter using a plurality of geometry-free and ionosphere-free code-carrier combinations to obtain an array of ambiguity estimates for the code-carrier combinations and associated statistical information.

13. The method of any of 9-11, wherein applying to the set of GNSS signal data at least one code filter comprises applying to the set of GNSS signal data one code filter for each carrier using a plurality of geometry-free and ionosphere-free code-carrier combinations to obtain an array of ambiguity estimates for the code-carrier combinations and associated statistical information.

14. The method of 13, wherein the code filters of h. are mutually orthogonal.

15. The method of any of 1-14, wherein the GNSS signal data comprises data collected at a plurality of reference receivers.

16. The method of any of 1-15, wherein the GNSS signal data comprises data collected at a plurality of roving receivers.

17. The method of any of 1-16, wherein the GNSS signal data comprises data generated from a network of reference stations.

18. The method of 17, wherein the data generated from a network of reference stations comprises at least one error model.

19. Apparatus for carrying out the method of any of 1-18.

20. Apparatus for processing a set of GNSS signal data derived from signals having at least three carriers, comprising:
   a. A geometry filter using a geometry carrier-phase combination to obtain from the set of GNSS signal data an array of ambiguity estimates for the geometry carrier-phase combination and associated statistical information;
   b. A bank of ionosphere filters using a geometry-free ionosphere carrier-phase combination to obtain from the set of GNSS signal data an array of ambiguity estimates for the ionosphere carrier-phase combination and associated statistical information;
   c. At least one bank of Quintessence filters using a geometry-free and ionosphere-free carrier-phase combination to obtain from the set of GNSS signal data an array of ambiguity estimates for the geometry-free and ionosphere-free carrier-phase combination and associated statistical information;
   d. At least one code filter using a plurality of geometry-free code-carrier combinations to obtain from the set of GNSS data an array of ambiguity estimates for the code-carrier combinations and associated statistical information; and
   e. A combiner to produce from the arrays obtained by the filters of a., b., c. and d. a combined array of ambiguity estimates for all carrier phase observations and associated statistical information.

21. The apparatus of 20, further comprising a position-computation element to compute a user position from the combined array.

22. The apparatus of 20 or 21, wherein the set of GNSS signal data comprises GNSS signal data of a single epoch.

23. The apparatus of any of 20-22, further comprising a position-computation element to compute a user position from the combined array with a combination of float ambiguities and fixed ambiguities by applying an integer-least-squares procedure and a validation procedure.

24. The apparatus of any of 20-22, further comprising a position-computation element to compute a user position from the combined array with float ambiguities, and computing a user position from the combined array with a combination of float ambiguities and fixed ambiguities by applying an integer-least-squares procedure and a validation procedure.

25. The apparatus of any of 20-24, wherein said at least one code filter uses a plurality of geometry-free and ionosphere-free code-carrier combinations to obtain an array of ambiguity estimates for the code-carrier combinations and associated statistical information.

26. The apparatus of any of 20-24, wherein said at least one code filter uses a plurality of geometry-free and ionosphere-free code-carrier combinations to obtain an array of ambiguity estimates for the code-carrier combinations and associated statistical information.

27. The apparatus of 26, wherein the code filters are mutually orthogonal.

28. The apparatus of any of 20-27, wherein the set of GNSS signal data is derived from signals received from transmitters of a first navigation system, the apparatus further comprising the following elements for processing a second set of GNSS signal data derived from signals having at least two carriers and received from transmitters of a second navigation system:
   e. A geometry filter using a geometry carrier-phase combination to obtain from the second set of GNSS signal data an array of ambiguity estimates for the geometry carrier phase combination and associated statistical information;
   f. A bank of ionosphere filters using a geometry-free ionosphere carrier-phase combination to obtain from the second set of GNSS signal data an array of ambiguity estimates for the ionosphere carrier-phase combination and associated statistical information;
   g. At least one bank of Quintessence filters using a geometry-free carrier phase combination to obtain from the second set of GNSS signal data an array of ambiguity estimates for said carrier phase combination and associated statistical information;
   h. At least one code filter using a plurality of geometry-free and ionosphere-free code-carrier combinations to obtain from the second set of GNSS signal data an array of ambiguity estimates for the code-carrier combinations and associated statistical information; and wherein said combiner produces from the arrays obtained by the filters of e., f., g. and h. and the arrays obtained by the filters of a., b., and c. a combined array of ambiguity estimates for all carrier phase observations and associated statistical information.

29. The apparatus of any of 20-27, wherein the set of GNSS signal data is derived from signals received from transmitters of a first navigation system, the apparatus further comprising the following elements for processing a second set of GNSS signal data derived from signals having at least two carriers and received from transmitters of a second navigation system:
   f. A bank of ionosphere filters using a geometry-free ionosphere carrier-phase combination to obtain from the second set of GNSS signal data an array of ambiguity estimates for the ionosphere carrier-phase combination and associated statistical information;
   g. At least one bank of Quintessence filters using a geometry-free carrier phase combination to obtain from the second set of GNSS signal data an array of ambiguity estimates for said carrier phase combination and associated statistical information;

h. At least one code filter using a plurality of geometry-free and ionosphere-free code-carrier combinations to obtain from the second set of GNSS signal data an array of ambiguity estimates for the code-carrier combinations and associated statistical information; and wherein the geometry filter uses a geometry carrier-phase combination to obtain from the first-mentioned set of GNSS signal data and from the second set of GNSS signal data an array of ambiguity estimates for the geometry carrier phase combination and associated statistical information, and wherein said combiner produces from the arrays obtained by the filters of f., g. and h. and the arrays obtained by the filters of a., b., c. and d. a combined array of ambiguity estimates for all carrier phase observations and associated statistical information.

30. The apparatus of 28 or 29, wherein the first navigation system has a first number of carrier frequencies and observables and the second navigation system has a second number of carrier frequencies and observables which differs from the first number of carrier frequencies and observables.

31. The apparatus of any of 28-30, wherein said at least one code filter of h. uses a plurality of geometry-free and ionosphere-free code-carrier combinations to obtain from the second set of GNSS signal data an array of ambiguity estimates for the code-carrier combinations and associated statistical information.

32. The apparatus of any of 28-31, wherein said at least one code filter of h. uses a plurality of geometry-free and ionosphere-free code-carrier combinations to obtain from the second set of GNSS signal data an array of ambiguity estimates for the code-carrier combinations and associated statistical information.

33. The apparatus of 32, wherein the code filters of h. are mutually orthogonal.

34. The apparatus of any of 1-33, wherein the GNSS signal data comprises data collected at a plurality of reference receivers.

35. The apparatus of any of 1-34, wherein the GNSS signal data comprises data collected at a plurality of roving receivers.

36. The apparatus of any of 1-25, wherein the GNSS signal data comprises data generated from a network of reference stations.

37. The apparatus of claim 36, wherein the data generated from a network of reference stations comprises at least one error model.

While embodiments and applications of the present invention have been shown and described, it will be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of processing a set of GNSS signal data derived from signals having at least three carriers, comprising:
   a. Applying to the set of GNSS signal data a geometry filter using a geometry carrier-phase combination to obtain an array of ambiguity estimates for the geometry carrier-phase combination and associated statistical information;
   b. Applying to the set of GNSS signal data a bank of ionosphere filters using a geometry-free ionosphere carrier-phase combination to obtain an array of ambiguity estimates for the ionosphere carrier-phase combination and associated statistical information;
   c. Applying to the set of GNSS signal data at least one bank of Quintessence filters using a geometry-free and ionosphere-free carrier-phase combination to obtain an array of ambiguity estimates for the geometry-free and ionosphere-free carrier-phase combination and associated statistical information;
   d. Applying to the set of GNSS signal data at least one code filter using a plurality of geometry-free code-carrier combinations to obtain an array of ambiguity estimates for the code-carrier combinations and associated statistical information; and
   e. Combining the arrays of a., b., c. and d. to obtain a combined array of ambiguity estimates for all carrier phase observations and associated statistical information.

2. The method of claim 1, further comprising computing a user position from the combined array.

3. The method of claim 2, wherein the set of GNSS signal data comprises GNSS signal data of a single epoch.

4. The method of claim 1, further comprising computing a user position from the combined array with a combination of float ambiguities and fixed ambiguities by applying an integer-least-squares procedure and a validation procedure.

5. The method of claim 4, wherein the set of GNSS signal data comprises GNSS signal data of a single epoch.

6. The method of claim 1, further comprising computing a user position from the combined array with float ambiguities, and computing a user position from the combined array with a combination of float ambiguities and fixed ambiguities by applying an integer-least-squares procedure and a validation procedure.

7. The method of claim 6, wherein the set of GNSS signal data comprises GNSS signal data of a single epoch.

8. The method of claim 1, wherein applying to the set of GNSS signal data at least one code filter comprises applying to the set of GNSS signal data at least one code filter using a plurality of geometry-free and ionosphere-free code-carrier combinations to obtain an array of ambiguity estimates for the code-carrier combinations and associated statistical information.

9. The method of claim 1, wherein applying to the set of GNSS signal data at least one code filter comprises applying to the set of GNSS signal data one code filter for each carrier using a plurality of geometry-free and ionosphere-free code-carrier combinations to obtain an array of ambiguity estimates for the code-carrier combinations and associated statistical information.

10. The method of claim 9, wherein the code filters are mutually orthogonal.

11. The method of claim 1, wherein the set of GNSS signal data is derived from signals received from transmitters of a first navigation system, the method further comprising processing a second set of GNSS signal data derived from signals having at least two carriers and received from transmitters of a second navigation system by:
   f. Applying to the second set of GNSS signal data a geometry filter using a geometry carrier-phase combination to obtain an array of ambiguity estimates for the geometry carrier phase combination and associated statistical information;
   g. Applying to the second set of GNSS signal data a bank of ionosphere filters using a geometry-free ionosphere carrier-phase combination to obtain an array of ambiguity estimates for the ionosphere carrier-phase combination and associated statistical information;

h. Applying to the second set of GNSS signal data at least one bank of Quintessence filters using a geometry-free carrier phase combination to obtain an array of ambiguity estimates for said carrier phase combination and associated statistical information;

i. Applying to the second set of GNSS signal data at least one code filter using a plurality of geometry-free and ionosphere-free code-carrier combinations to obtain an array of ambiguity estimates for the code-carrier combinations and associated statistical information; and wherein d. further comprises combining the arrays of f., g., h. and i. with the arrays of a., b., c. and d. to obtain a combined array of ambiguity estimates for all carrier phase observations and associated statistical information.

12. The method of claim 11, wherein a. and f. are carried out by applying the first-mentioned set of GNSS signal data and the second set of GNSS signal data to a single geometry filter to obtain a single array of ambiguity estimates for the geometry carrier-phase combination and associated statistical information.

13. The method of claim 11, wherein the first navigation system has a first number of carrier frequencies and observables and the second navigation system has a second number of carrier frequencies and observables which differs from the first number of carrier frequencies and observables.

14. The method of claim 11, wherein applying to the second set of GNSS signal data at least one code filter comprises applying to the second set of GNSS signal data at least one code filter using a plurality of geometry-free and ionosphere-free code-carrier combinations to obtain an array of ambiguity estimates for the code-carrier combinations and associated statistical information.

15. The method of claim 11, wherein applying to the set of GNSS signal data at least one code filter comprises applying to the set of GNSS signal data one code filter for each carrier using a plurality of geometry-free and ionosphere-free code-carrier combinations to obtain an array of ambiguity estimates for the code-carrier combinations and associated statistical information.

16. The method of claim 15, wherein the code filters applied to the second set of GNSS signal data are mutually orthogonal.

17. The method of claim 11, wherein the GNSS signal data comprises data collected at a plurality of reference receivers.

18. The method of claim 1, wherein the GNSS signal data comprises data collected at a plurality of reference receivers.

19. The method of claim 1, wherein the GNSS signal data comprises data collected at a plurality of roving receivers.

20. The method of claim 1, wherein the GNSS signal data comprises data collected at a plurality of roving receivers.

21. The method of claim 1, wherein the GNSS signal data comprises data generated from a network of reference stations.

22. The method of claim 21, wherein the data generated from a network of reference stations comprises at least one error model.

23. Apparatus for processing a set of GNSS signal data derived from signals having at least three carriers, comprising:

a. A geometry filter using a geometry carrier-phase combination to obtain from the set of GNSS signal data an array of ambiguity estimates for the geometry carrier-phase combination and associated statistical information;

b. A bank of ionosphere filters using a geometry-free ionosphere carrier-phase combination to obtain from the set of GNSS signal data an array of ambiguity estimates for the ionosphere carrier-phase combination and associated statistical information;

c. At least one bank of Quintessence filters using a geometry-free and ionosphere-free carrier-phase combination to obtain from the set of GNSS signal data an array of ambiguity estimates for the geometry-free and ionosphere-free carrier-phase combination and associated statistical information;

d. At least one code filter using a plurality of geometry-free code-carrier combinations to obtain from the set of GNSS data an array of ambiguity estimates for the code-carrier combinations and associated statistical information; and e. A combiner to produce from the arrays obtained by the filters of a., b., c. and d. a combined array of ambiguity estimates for all carrier phase observations and associated statistical information.

24. The apparatus of claim 23, further comprising a position-computation element to compute a user position from the combined array.

25. The apparatus of claim 24, wherein the set of GNSS signal data comprises GNSS signal data of a single epoch.

26. The apparatus of claim 23, further comprising a position-computation element to compute a user position from the combined array with a combination of float ambiguities and fixed ambiguities by applying an integer-least-squares procedure and a validation procedure.

27. The apparatus of claim 26, wherein the set of GNSS signal data comprises GNSS signal data of a single epoch.

28. The apparatus of claim 23, further comprising a position-computation element to compute a user position from the combined array with float ambiguities, and computing a user position from the combined array with a combination of float ambiguities and fixed ambiguities by applying an integer-least-squares procedure and a validation procedure.

29. The apparatus of claim 28, wherein the set of GNSS signal data comprises GNSS signal data of a single epoch.

30. The apparatus of claim 23, wherein said at least one code filter uses a plurality of geometry-free and ionosphere-free code-carrier combinations to obtain an array of ambiguity estimates for the code-carrier combinations and associated statistical information.

31. The apparatus of claim 23, wherein said at least one code filter uses a plurality of geometry-free and ionosphere-free code-carrier combinations to obtain an array of ambiguity estimates for the code-carrier combinations and associated statistical information.

32. The apparatus of claim 31, wherein the code filters are mutually orthogonal.

33. The apparatus of claim 23, wherein the set of GNSS signal data is derived from signals received from transmitters of a first navigation system, the apparatus further comprising the following elements for processing a second set of GNSS signal data derived from signals having at least two carriers and received from transmitters of a second navigation system:

f. A geometry filter using a geometry carrier-phase combination to obtain from the second set of GNSS signal data an array of ambiguity estimates for the geometry carrier phase combination and associated statistical information;

g. A bank of ionosphere filters using a geometry-free ionosphere carrier-phase combination to obtain from the second set of GNSS signal data an array of ambiguity estimates for the ionosphere carrier-phase combination and associated statistical information;

h. At least one bank of Quintessence filters using a geometry-free carrier phase combination to obtain from the second set of GNSS signal data an array of ambiguity estimates for said carrier phase combination and associated statistical information;

i. At least one code filter using a plurality of geometry-free and ionosphere-free code-carrier combinations to obtain from the second set of GNSS signal data an array of ambiguity estimates for the code-carrier combinations and associated statistical information; and wherein said combiner produces from the arrays obtained by the filters of f., g., h. and i. and the arrays obtained by the filters of a., b., c., and d. a combined array of ambiguity estimates for all carrier phase observations and associated statistical information.

34. The apparatus of claim 33, wherein the first navigation system has a first number of carrier frequencies and observables and the second navigation system has a second number of carrier frequencies and observables which differs from the first number of carrier frequencies and observables.

35. The apparatus of claim 33, wherein said at least one code filter of i. uses a plurality of geometry-free and ionosphere-free code-carrier combinations to obtain from the second set of GNSS signal data an array of ambiguity estimates for the code-carrier combinations and associated statistical information.

36. The apparatus of claim 33, wherein said at least one code filter of i. uses a plurality of geometry-free and ionosphere-free code-carrier combinations to obtain from the second set of GNSS signal data an array of ambiguity estimates for the code-carrier combinations and associated statistical information.

37. The apparatus of claim 36, wherein the code filters of i. are mutually orthogonal.

38. The apparatus of claim 23, wherein the set of GNSS signal data is derived from signals received from transmitters of a first navigation system, the apparatus further comprising the following elements for processing a second set of GNSS signal data derived from signals having at least two carriers and received from transmitters of a second navigation system:

f. A bank of ionosphere filters using a geometry-free ionosphere carrier-phase combination to obtain from the second set of GNSS signal data an array of ambiguity estimates for the ionosphere carrier-phase combination and associated statistical information;

g. At least one bank of Quintessence filters using a geometry-free carrier phase combination to obtain from the second set of GNSS signal data an array of ambiguity estimates for said carrier phase combination and associated statistical information;

h. At least one code filter using a plurality of geometry-free and ionosphere-free code-carrier combinations to obtain from the second set of GNSS signal data an array of ambiguity estimates for the code-carrier combinations and associated statistical information; and wherein the geometry filter uses a geometry carrier-phase combination to obtain from the first-mentioned set of GNSS signal data and from the second set of GNSS signal data an array of ambiguity estimates for the geometry carrier phase combination and associated statistical information, and wherein said combiner produces from the arrays obtained by the filters of f., g. and h. and the arrays obtained by the filters of a., b., c. and d. a combined array of ambiguity estimates for all carrier phase observations and associated statistical information.

39. The apparatus of claim 38, wherein the first navigation system has a first number of carrier frequencies and observables and the second navigation system has a second number of carrier frequencies and observables which differs from the first number of carrier frequencies and observables.

40. The apparatus of claim 38, wherein said at least one code filter of h. uses a plurality of geometry-free and ionosphere-free code-carrier combinations to obtain from the second set of GNSS signal data an array of ambiguity estimates for the code-carrier combinations and associated statistical information.

41. The apparatus of claim 38, wherein said at least one code filter of h. uses a plurality of geometry-free and ionosphere-free code-carrier combinations to obtain from the second set of GNSS signal data an array of ambiguity estimates for the code-carrier combinations and associated statistical information.

42. The apparatus of claim 41, wherein the code filters of h. are mutually orthogonal.

43. The apparatus of claim 23, wherein the GNSS signal data comprises data collected at a plurality of reference receivers.

44. The apparatus of claim 33, wherein the GNSS signal data comprises data collected at a plurality of reference receivers.

45. The apparatus of claim 38, wherein the GNSS signal data comprises data collected at a plurality of reference receivers.

46. The apparatus of claim 23, wherein the GNSS signal data comprises data collected at a plurality of roving receivers.

47. The apparatus of claim 23, wherein the GNSS signal data comprises data collected at a plurality of roving receivers.

48. The apparatus of claim 23, wherein the GNSS signal data comprises data generated from a network of reference stations.

49. The apparatus of claim 48, wherein the data generated from a network of reference stations comprises at least one error model.

* * * * *